United States Patent
Pragada et al.

(10) Patent No.: US 9,942,938 B2
(45) Date of Patent: Apr. 10, 2018

(54) REGISTRATION FOR DEVICE-TO-DEVICE (D2D) COMMUNICATIONS

(71) Applicant: INTERDIGITAL PATENT HOLDINGS, INC., Wilmington, DE (US)

(72) Inventors: Ravikumar V. Pragada, Collegeville, PA (US); Saad Ahmad, Montreal (CA); Balaji Raghothaman, Chester Springs, PA (US); Ulises Olvera-Hernandez, Kirkland (CA); Zhuorong Deng, Brooklyn, NY (US); Pascal M. Adjakple, Great Neck, NY (US); Gregory S. Sternberg, Mt. Laurel, NJ (US); Guanzhou Wang, Longueuil (CA); Alexander Reznik, Titusville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 844 days.

(21) Appl. No.: 13/871,837

(22) Filed: Apr. 26, 2013

(65) Prior Publication Data

US 2013/0287012 A1    Oct. 31, 2013

Related U.S. Application Data

(60) Provisional application No. 61/639,352, filed on Apr. 27, 2012, provisional application No. 61/645,335, (Continued)

(51) Int. Cl.
  H04W 76/04    (2009.01)
  H04W 76/02    (2009.01)
  H04W 68/00    (2009.01)

(52) U.S. Cl.
  CPC ....... *H04W 76/045* (2013.01); *H04W 76/023* (2013.01); *H04W 76/041* (2013.01);
  (Continued)

(58) Field of Classification Search
  CPC ... H04W 76/00; H04W 76/02; H04W 76/023; H04W 76/04; H04W 76/043; H04W 76/045
  See application file for complete search history.

(56) References Cited

U.S. PATENT DOCUMENTS

| | | | |
|---|---|---|---|
| 7,877,082 B2 | 1/2011 | Eagle et al. | |
| 9,299,255 B2 | 3/2016 | Yamold et al. | |

(Continued)

FOREIGN PATENT DOCUMENTS

| | | |
|---|---|---|
| WO | 04/080103 | 9/2004 |
| WO | 06/117652 | 11/2006 |

(Continued)

OTHER PUBLICATIONS

ARM Limited, "ARM Security Technology Building a Secure System using TrustZone Technology," available at: http://infocenter.arm.com/help/topic/com.arm.doc.prd29-genc-009492c/PRD29-GENC-009492C_trustzone_security_whitepaper.pdf (last visited Feb. 14, 2014).

(Continued)

*Primary Examiner* — Feben M Haile
(74) *Attorney, Agent, or Firm* — Volpe and Koenig, P.C.

(57) ABSTRACT

A dual-radio access technology (dual-RAT) wireless transmit/receive unit (WTRU) may transmit, over a cellular RAT, a registration message that includes a wireless local area network (WLAN) device identifier (ID) for a WLAN associated with the dual-RAT WTRU. A transceiver of the dual-RAT WTRU may receive, from the cellular network over the cellular RAT, assistance information that includes a security key for the WLAN. A processor of the dual-RAT WTRU may perform, over a WLAN RAT, device-to-device D2D direct discovery using the WLAN device ID and the security key for the WLAN.

6 Claims, 35 Drawing Sheets

Related U.S. Application Data filed on May 10, 2012, provisional application No. 61/645,282, filed on May 10, 2012, provisional application No. 61/653,769, filed on May 31, 2012, provisional application No. 61/720,640, filed on Oct. 31, 2012.

(52) U.S. Cl.
CPC .......... *H04W 68/00* (2013.01); *H04W 76/043* (2013.01); *H04W 76/048* (2013.01)

(56) References Cited

U.S. PATENT DOCUMENTS

| | | | |
|---|---|---|---|
| 2004/0156346 A1* | 8/2004 | O'Neill | H04L 29/06 370/338 |
| 2005/0049001 A1 | 3/2005 | Lazaridis | |
| 2005/0094558 A1 | 5/2005 | Lu | |
| 2009/0257400 A1 | 10/2009 | Perras | |
| 2009/0268635 A1 | 10/2009 | Gallagher et al. | |
| 2009/0270103 A1 | 10/2009 | Pani et al. | |
| 2010/0093364 A1 | 4/2010 | Ribeiro et al. | |
| 2011/0098043 A1 | 4/2011 | Yu et al. | |
| 2011/0103318 A1* | 5/2011 | Ekici | H04W 48/18 370/329 |
| 2011/0106952 A1 | 5/2011 | Doppler et al. | |
| 2011/0258313 A1 | 10/2011 | Mallik et al. | |
| 2011/0258327 A1* | 10/2011 | Phan | H04W 16/10 709/227 |
| 2012/0014334 A1 | 1/2012 | Oh et al. | |
| 2012/0179789 A1 | 7/2012 | Griot et al. | |
| 2012/0314660 A1 | 12/2012 | Leppanen et al. | |
| 2013/0065585 A1 | 3/2013 | Pelletier et al. | |
| 2013/0083684 A1 | 4/2013 | Yeh et al. | |
| 2013/0225130 A1 | 8/2013 | Rost et al. | |
| 2013/0272182 A1* | 10/2013 | Li | H04W 28/02 370/311 |
| 2013/0288668 A1 | 10/2013 | Pragada et al. | |
| 2013/0324114 A1 | 12/2013 | Raghothaman et al. | |
| 2013/0331031 A1 | 12/2013 | Palin et al. | |
| 2014/0064263 A1 | 3/2014 | Cheng et al. | |
| 2014/0106707 A1 | 4/2014 | Bontu et al. | |
| 2014/0112258 A1 | 4/2014 | Vanderveen | |
| 2014/0179330 A1 | 6/2014 | Du et al. | |
| 2014/0219261 A1 | 8/2014 | Johnsson | |
| 2014/0258434 A1 | 9/2014 | Hong et al. | |
| 2014/0328310 A1 | 11/2014 | Xu | |
| 2015/0063091 A1 | 3/2015 | Vesterinen et al. | |
| 2017/0105230 A1 | 4/2017 | Matsumoto et al. | |

FOREIGN PATENT DOCUMENTS

| | | |
|---|---|---|
| WO | 09/008615 | 1/2009 |
| WO | 10/039085 | 4/2010 |
| WO | 10/129930 | 11/2010 |
| WO | 11/052136 | 5/2011 |
| WO | 12/052911 A1 | 4/2012 |
| WO | 2013163634 A1 | 10/2013 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 9: Interworking with External Networks, IEEE Std. 802.11u-2011 (Feb. 25, 2011).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Melia et al., "Logical Interface Support for multi-mode IP Hosts," NETEXT WG, Internet-Draft (Oct. 24, 2010).
Rescorla et al., "Datagram Transport Layer Security Version 1.2," Internet Engineering Task Force (IETF), Request for Comments: 6347 (Jan. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.10.0 (Jun. 2013).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).
Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.2.0 (Feb. 2013).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Services and System Aspects; System Improvements for Machine-Type Communications; (Release 11)," 3GPP TR 23.888 V1.2.0 (Apr. 2011).
Third Generation Partnership Project, "Technical Specification Group Services and System Aspects; System Improvements for Machine-Type Communications (Release 11)," 3GPP TR 23.888 V1.6.1 (Feb. 2012).
Third Generation Partnership Project, "Technical Specification Group Services and System Aspects; System Improvements for Machine-Type Communications (MTC) (Release 11)," 3GPP TR 23.888 V11.0.0 (Sep. 2012).
Third Generation Partnership Project, "Technical Specification Group Services and System Aspects; Architecture enhancements to facilitate communications with packet data networks and applications (Release 11)," 3GPP TS 23.682 V11.0.0 (Mar. 2012).
Third Generation Partnership Project, "Technical Specification Group Services and System Aspects; Architecture enhancements to facilitate communications with packet data networks and applications (Release 11)," 3GPP TS 23.682 V11.3.0 (Dec. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.10.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.5.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).
Third Generation Partnership Project, "Technical Specification Group Services and System Aspects; Architecture enhancements for non-3GPP accesses (Release 8)," 3GPP TS 23.402 V8.10.0 (Mar. 2012).
Third Generation Partnership Project, "Technical Specification Group Services and System Aspects; Architecture enhancements for non-3GPP accesses (Release 10)," 3GPP TS 23.402 V10.7.0 (Mar. 2012).
Third Generation Partnership Project, "Technical Specification Group Services and System Aspects; Architecture enhancements for non-3GPP accesses (Release 11)," 3GPP TS 23.402 V11.2.0 (Mar. 2012).
Third Generation Partnership Project, "Technical Specification Group Services and System Aspects; Architecture enhancements for non-3GPP accesses (Release 9)," 3GPP TS 23.402 V9.12.0 (Mar. 2012).
Third Generation Partnership Project, "Technical Specification Group Services and System Aspects; Architecture enhancements for non-3GPP accesses (Release 10)," 3GPP TS 23.402 V10.8.0 (Sep. 2012).
Third Generation Partnership Project, "Technical Specification Group Core Network and Terminals; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.6.1 (Mar. 2012).

(56) References Cited

OTHER PUBLICATIONS

Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.9.0 (Mar. 2012).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.2.1 (Mar. 2012).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 12)," 3GPP TS 24.302 V12.0.0 (Mar. 2013).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.6.0 (Mar. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.8.0 (Mar. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Services and System Aspects; Architecture enhancements for non-3GPP accesses (Release 12)," 3GPP TS 23.402 V12.0.0 (Mar. 2013).
Third Generation Partnership Project, "Technical Specification Group Services and System Aspects; Architecture enhancements for non-3GPP accesses (Release 11)," 3GPP TS 23.402 V11.6.0 (Mar. 2013).
Third Generation Partnership Project, "Technical Specification Group Services and System Aspects; Functional stage 2 description of Location Services (LCS) (Release 10)," 3GPP TS 23.271 V10.4.0 (Mar. 2013).
Third Generation Partnership Project, "Technical Specification Group Services and System Aspects; Functional stage 2 description of Location Services (LCS) (Release 11)," 3GPP TS 23.271 V11.2.0 (Mar. 2013).
Third Generation Partnership Project, "Technical Specification Group Services and System Aspects; Functional stage 2 description of Location Services (LCS) (Release 10)," 3GPP TS 23.271 V10.2.0 (Mar. 2011).
Third Generation Partnership Project, "Technical Specification Group Services and System Aspects; Functional stage 2 description of Location Services (LCS) (Release 7)," 3GPP TS 23.271 V7.10.0 (Dec. 2009).
Third Generation Partnership Project, "Technical Specification Group Services and System Aspects; Functional stage 2 description of Location Services (LCS) (Release 9)," 3GPP TS 23.271 V9.8.0 (Mar. 2013).
Third Generation Partnership Project, "Technical Specification Group Services and System Aspects; Functional stage 2 description of Location Services (LCS) (Release 8)," 3GPP TS 23.271 V8.1.0 (Dec. 2009).
Third Generation Partnership Project, "Technical Specification Group Services and System Aspects; Functional stage 2 description of Location Services (LCS) (Release 9)," 3GPP TS 23.271 V9.6.0 (Mar. 2011).
Third Generation Partnership Project, "Technical Specification Group Services and System Aspects; Network architecture (Release 12)," 3GPP TS 23.002 V12.1.0 (Dec. 2012).
Third Generation Partnership Project, "Technical Specification Group Services and System Aspects; Network architecture (Release 9)," 3GPP TS 23.002 V9.6.0 (Sep. 2011).
Third Generation Partnership Project, "Technical Specification Group Services and System Aspects; Network architecture (Release 10)," 3GPP TS 23.002 V10.5.0 (Dec. 2012).
Third Generation Partnership Project, "Technical Specification Group Services and System Aspects; Network architecture (Release 11)," 3GPP TS 23.002 V11.2.0 (Mar. 2012).
Third Generation Partnership Project, "Technical Specification Group Services and System Aspects; Network architecture (Release 10)," 3GPP TS 23.002 V10.4.0 (Dec. 2011).
Third Generation Partnership Project, "Technical Specification Group Services and System Aspects; Network architecture (Release 7)," 3GPP TS 23.002 V7.6.0 (Dec. 2008).
Third Generation Partnership Project, "Technical Specification Group Services and System Aspects; Network architecture (Release 11)," 3GPP TS 23.002 V11.5.0 (Dec. 2012).
Third Generation Partnership Project, "Technical Specification Group Services and System Aspects; Network architecture (Release 8)," 3GPP TS 23.002 V8.7.0 (Dec. 2010).
Third Generation Partnership Project, "Technical Specification Group SA; Feasibility Study for Proximity Services (ProSe) (Release 12)," 3GPP TR 22.803 V0.2.0 (Feb. 2012).
Third Generation Partnership Project, "Technical Specification Group Services and System Aspects; Feasibility study for Proximity Services (ProSe) (Release 12)," 3GPP TR 22.803 V12.1.0 (Mar. 2013).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.0.0 (Mar. 2013).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.7.0 (Jun. 2013).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.11.0 (Mar. 2013).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.6.0 (Mar. 2013).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.10.0 (Mar. 2013).
Third Generation Partnership Project, "Technical Specification Group Core Network and Terminals; Access Network Discovery and Selection Function (ANDSF) Management Object (MO) (Release 11)," 3GPP TS 24.312 V11.2.0 (Mar. 2012).
Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).
Third Generation Partnership Project, "Technical Specification Group Core Network and Terminals; Access Network Discovery and Selection Function (ANDSF) Management Object (MO) (Release 10)," 3GPP TS 24.312 V10.5.0 (Mar. 2012).

(56) References Cited

OTHER PUBLICATIONS

Third Generation Partnership Project, "Technical Specification Group Core Network and Terminals; Access Network Discovery and Selection Function (ANDSF) Management Object (MO) (Release 12)," 3GPP TS 24.312 V12.0.0 (Mar. 2013).
Third Generation Partnership Project, "Technical Specification Group Core Network and Terminals; Access Network Discovery and Selection Function (ANDSF) Management Object (MO) (Release 11)," 3GPP TS 24.312 V11.6.0 (Mar. 2013).
Third Generation Partnership Project, "Technical Specification Group Core Network and Terminals; Access Network Discovery and Selection Function (ANDSF) Management Object (MO) (Release 9)," 3GPP TS 24.312 V9.2.0 (Sep. 2011).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Services and System Aspects; Generic Authentication Architecture (GAA); Generic bootstrapping architecture (Release 7)," 3GPP TS 33.220 V7.11.0 (Mar. 2008).
Third Generation Partnership Project, "Technical Specification Group Services and System Aspects; Generic Authentication Architecture (GAA); Generic Bootstrapping Architecture (GBA) (Release 11)," 3GPP TS 33.220 V11.4.0 (Sep. 2012).
Third Generation Partnership Project, "Technical Specification Group Services and System Aspects; Generic Authentication Architecture (GAA); Generic bootstrapping architecture (GBA) (Release 9)," 3GPP TS 33.220 V9.4.0 (Mar. 2012).
Third Generation Partnership Project, "Technical Specification Group Services and System Aspects; Generic Authentication Architecture (GAA); Generic bootstrapping architecture (GBA) (Release 8)," 3GPP TS 33.220 V8.9.0 (Mar. 2012).
Third Generation Partnership Project, "Technical Specification Group Services and System Aspects; Generic Authentication Architecture (GAA); Generic Bootstrapping Architecture (GBA) (Release 10)," 3GPP TS 33.220 V10.1.0 (Mar. 2012).
Third Generation Partnership Project, "Technical Specification Group Services and System Aspects; Generic Authentication Architecture (GAA); Generic Bootstrapping Architecture (GBA) (Release 11)," 3GPP TS 33.220 V11.2.0 (Mar. 2012).
Third Generation Partnership Project, "Technical Specification Group Services and System Aspects; Generic Authentication Architecture (GAA); Generic Bootstrapping Architecture (GBA) (Release 12)," 3GPP TS 33.220 V12.0.0 (Mar. 2013).
TSG SA WG1, "WID on Proposal for a study on Proximity-based Services," 3GPP TSG SA Plenary Meeting #53, SP-110638, Fukuoka, Japan (Sep. 19-21, 2011).
Sesia et al., "LTE—The UMTS Long Term Evolution: From Theory to Practice," John Wiley & Sons, Ltd., 2nd edition (2011).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 9)," 3GPP TS 23.334 V9.3.0 (Sep. 2010).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 10)," 3GPP TS 23.334 V10.3.0 (Dec. 2011).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 10)," 3GPP TS 23.334 V10.5.0 (Dec. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 11)," 3GPP TS 23.334 V11.0.0 (Mar. 2012).
Third Generation Partnership Project, "Technical Specification Group Core Network and Terminals; IP Multimedia Subsystem (IMS) Application Level Gateway (IMS-ALG)—IMS Access Gateway (IMS-AGW) interface: Procedures descriptions (Release 11)," 3GPP TS 23.334 V11.2.0 (Dec. 2012).
Third Generation Partnership Project, "Technical Specification Group Core Network; Cx and Dx interfaces based on the Diameter protocol; Protocol details (Release 5)," 3GPP TS 29.229 V5.13.0 (Sep. 2007).
Third Generation Partnership Project, "Technical Specification Group Core Network and Terminals; Cx and Dx interfaces based on the Diameter protocol; Protocol details (Release 6)," 3GPP TS 29.229 V6.11.0 (Sep. 2009).
Third Generation Partnership Project, "Technical Specification Group Core Network and Terminals; Cx and Dx interfaces based on the Diameter protocol; Protocol details (Release 7)," 3GPP TS 29.229 V7.11.0 (Jun. 2011).
Third Generation Partnership Project, "Technical Specification Group Core Network and Terminals; Cx and Dx interfaces based on the Diameter protocol; Protocol details (Release 7)," 3GPP TS 29.229 V7.12.0 (Mar. 2013).
Third Generation Partnership Project, "Technical Specification Group Core Network and Terminals; Cx and Dx interfaces based on the Diameter protocol; Protocol details (Release 8)," 3GPP TS 29.229 V8.13.0 (Dec. 2011).
Third Generation Partnership Project, "Technical Specification Group Core Network and Terminals; Cx and Dx interfaces based on the Diameter protocol; Protocol details (Release 8)," 3GPP TS 29.229 V8.15.0 (Mar. 2013).
Third Generation Partnership Project, "Technical Specification Group Core Network and Terminals; Cx and Dx interfaces based on the Diameter protocol; Protocol details (Release 9)," 3GPP TS 29.229 V9.5.0 (Dec. 2011).
Third Generation Partnership Project, "Technical Specification Group Core Network and Terminals; Cx and Dx interfaces based on the Diameter protocol; Protocol details (Release 9)," 3GPP TS 29.229 V9.7.0 (Mar. 2013).
Third Generation Partnership Project, "Technical Specification Group Core Network and Terminals; Cx and Dx interfaces based on the Diameter protocol; Protocol details (Release 10)," 3GPP TS 29.229 V10.3.0 (Dec. 2011).
Third Generation Partnership Project, "Technical Specification Group Core Network and Terminals; Cx and Dx interfaces based on the Diameter protocol; Protocol details (Release 10)," 3GPP TS 29.229 V10.5.0 (Mar. 2013).
Third Generation Partnership Project, "Technical Specification Group Core Network and Terminals; Cx and Dx interfaces based on the Diameter protocol; Protocol details (Release 11)," 3GPP TS 29.229 V11.0.0 (Dec. 2011).
Third Generation Partnership Project, "Technical Specification Group Core Network and Terminals; Cx and Dx interfaces based on the Diameter protocol; Protocol details (Release 11)," 3GPP TS 29.229 V11.3.0 (Mar. 2013).
IEEE P802.11ac/D2.0, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," (Jan. 2012).

(56) References Cited

OTHER PUBLICATIONS

IEEE P802.11ac/D4.2, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," (Jan. 2013).

IEEE Std 802.15.1-2005 (Revision of IEEE Std 802.15.1-2002), "IEEE Standard for Information Technology—Telecommunications and Information Exchange Between Systems—Local and Metropolitan Area Networks—Specific Requirements, Part 15.1: Wireless Medium Access Control (MAC) and Physical Layer (PHY) Specifications for Wireless Personal Area Networks (WPANs)," (Jun. 14, 2005).

\* cited by examiner

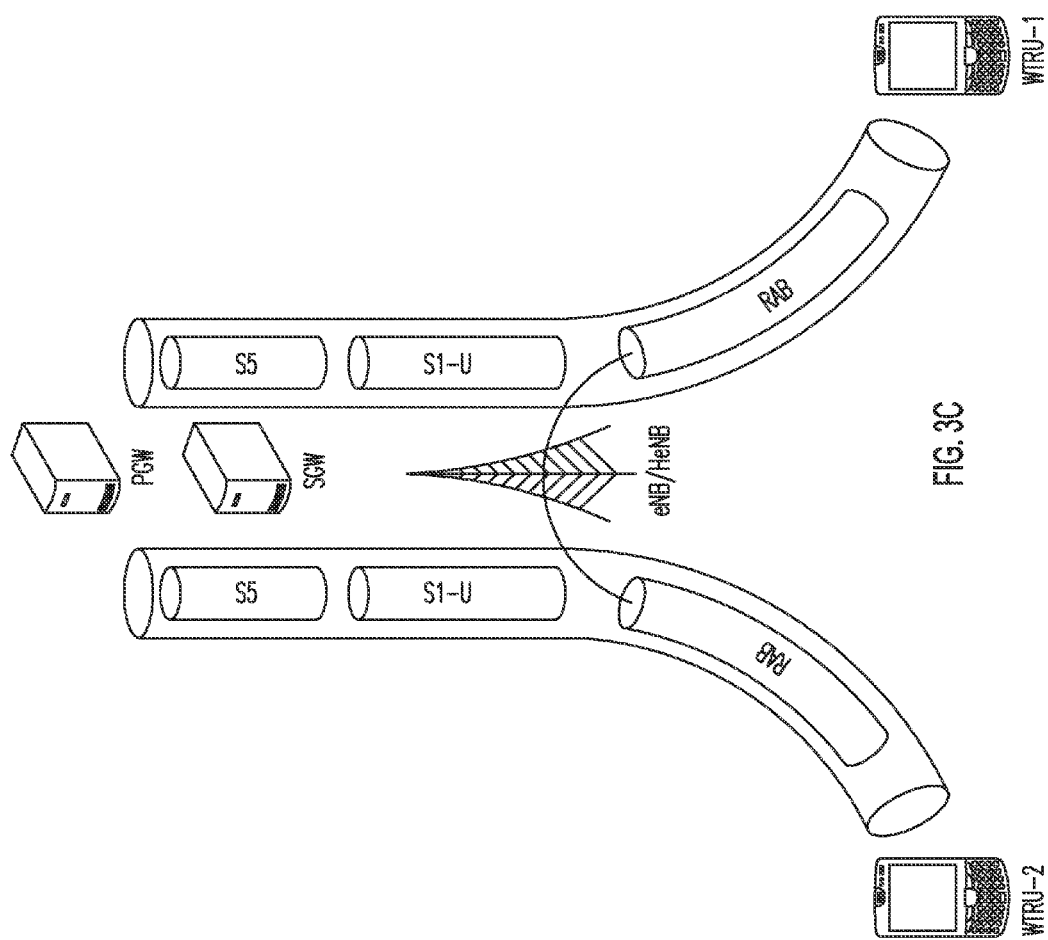

REGISTRATION FOR DEVICE-TO-DEVICE (D2D) COMMUNICATIONS

CROSS REFERENCE TO RELATED APPLICATIONS

This application claims the benefit of U.S. Provisional Application Ser. No. 61/639,352 filed Apr. 27, 2012, U.S. Provisional Application Ser. No. 61/645,335 filed May 10, 2012, U.S. Provisional Application Ser. No. 61/645,282 filed May 10, 2012, U.S. Provisional Application Ser. No. 61/653,769 filed May 31, 2012, and U.S. Provisional Application Ser. No. 61/720,640 filed Oct. 31, 2012, the contents of which are incorporated herein by reference in their entirety.

BACKGROUND

Device-to-device (D2D) communication between devices may take place after D2D-capable devices are made aware of the presence of other peer devices in their vicinity, and of the services that those devices offer and/or participate in. The discovery process may be viewed as distinct from the data communication process itself. From the radio perspective, it is possible that the device discovery may happen in a different frequency, as compared to the communication, (in this case, the judgment of the quality of the D2D link in the discovery frequency may have to be translated into a judgment of the corresponding D2D data link frequencies). One may envision discovery over a physical link between the devices, followed by communication over a local path that does not involve a direct physical D2D link.

Direct D2D communications are gaining importance lately. This requires a change in the current third generation partnership project (3GPP) architecture with the addition of new nodes and interfaces. An architecture that facilitates the coordination of D2D communication from within the operator network or by third party applications outside the 3GPP network is needed. Once service discovery is complete, procedures for call establishment and maintenance are needed for both unicast and multicast/broadcast D2D sessions. Service discovery and call establishment procedures are also needed to enable inter-operator D2D communications in order for D2D services to pick up momentum in the market.

SUMMARY

A method and apparatus are described for optimizing proximity data path setup. Various policies, rules and permissions at the non-access stratum (NAS) layer may be used to determine whether proximity services are allowed and, if so, which ones. Procedures may be implemented to determine how policies and permissions are configured in a network. Policies and permissions may be deployed across various network nodes.

NAS messages and procedures for triggering establishment of an optimized proximity data path are described. In addition, new data communication layer alternatives are described that may be used to enable the optimized proximity data path.

BRIEF DESCRIPTION OF THE DRAWINGS

A more detailed understanding may be had from the following description, given by way of example in conjunction with the accompanying drawings wherein:

FIG. 3C shows an example of establishing a WTRU-to-WTRU connection via an eNB or HeNB in the path using regular evolved packet system (EPS) bearers;

DETAILED DESCRIPTION

Figure 1A:
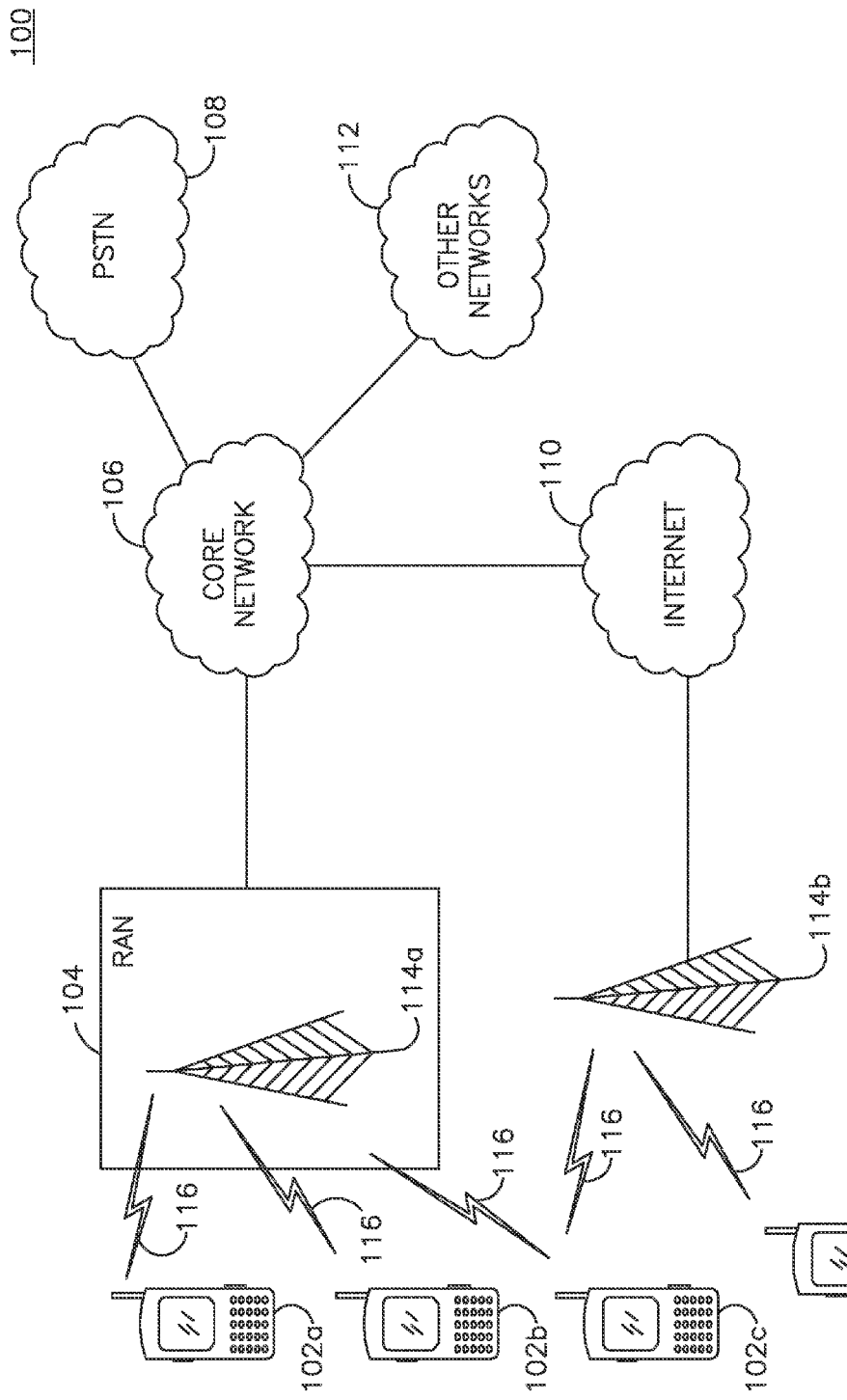
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
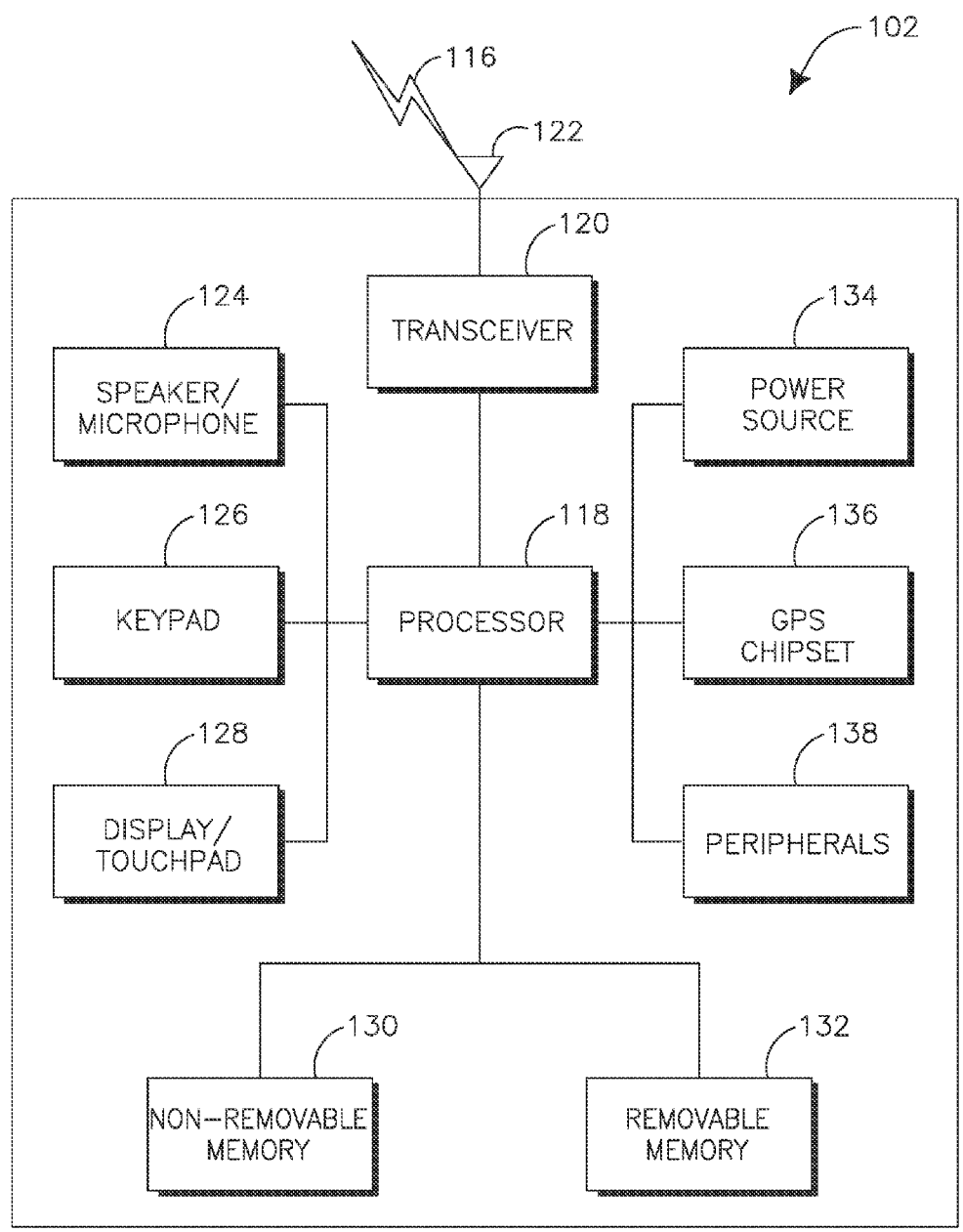
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
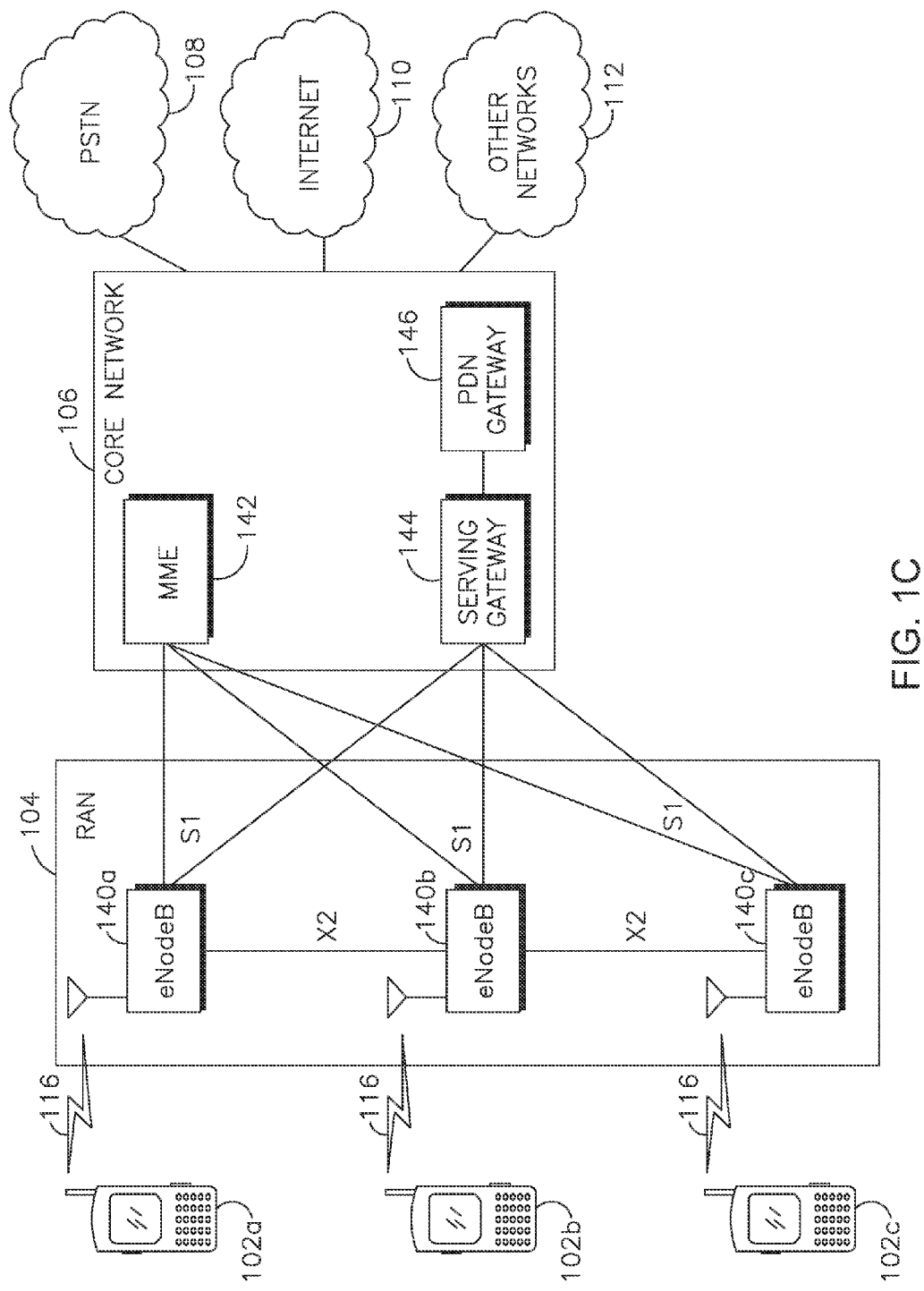
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

GPS technology and/or related standards have the opportunity to become the platform of choice to enable proximity-based discovery and communication between devices, and promote a vast array of future and more advanced proximity-based applications and services.

There has been a considerable interest in proximity-based services. Use cases are being studied and potential requirements and functionalities are being identified for operator network-controlled discovery and communications between devices that are in proximity, under continuous network control, and/or are under 3GPP LTE network coverage. 3GPP proximity-based service may be enabled for commercial/social use, network offloading, public safety, and integration of current infrastructure services, (to assure the consistency of the user experience including reachability and mobility aspects), and public safety, in case of the absence of evolved universal mobile telecommunications system terrestrial radio access network (EUTRAN) coverage, (subject to regional regulation and operator policy, and limited to specific public-safety designated frequency bands and terminals).

The general scenarios of these proximity-based services may involve the WTRU proximity discovery, the WTRU consent to being discoverable, contactable or conversational, the proximity WTRU-to-WTRU (i.e., end-to-end) communications, and the controllability and policies by the network or operators to the discovery, discoverability and the subsequent forms of communication.

Figure 2A:
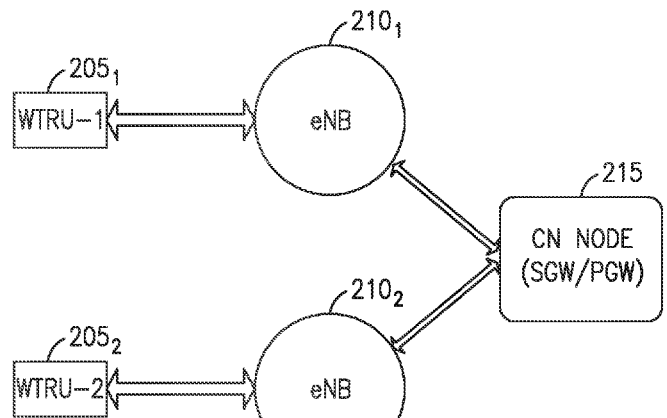
FIG. 2A shows an example of communications by two WTRUs in proximity of each other via respective evolved Node-Bs (eNBs) to a core network (CN) node, (e.g., serving gateway (SGW) or packet data network (PDN) gateway (PGW)

FIG. 2A shows an example of communications by two WTRUs $205_1$ and $205_2$ in proximity of each other via respective evolved Node-Bs (eNBs) $210_1$ and $210_2$ to a core network (CN) node 215, (e.g., a serving gateway (SGW) or a packet data network (PDN) gateway (PGW)). On a condition that the WTRUs 205 happen to be close to each other, then any communication between these WTRUs 205 may have to be routed via the CN node 215.

With the introduction of the proximity study item (SI), the communications between proximity WTRUs may be enhanced to take other paths, such as direct (e.g., direct radio path in licensed/unlicensed spectrum within certain distance), or indirect, (through network elements—intra/inter-cell or intra/inter-eNB or SGW and the like), which may be controlled by the network or by operators.

Figure 2B:
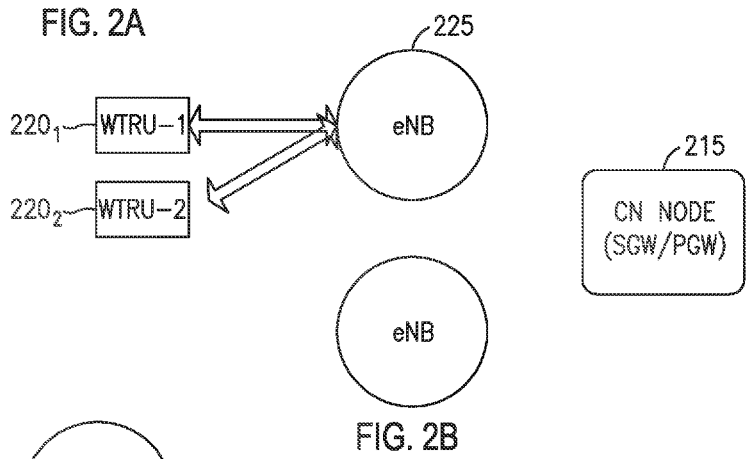
FIG. 2B shows an example of data paths for proximity communications between two WTRUs that are locally routed via an eNB.

FIG. 2B shows an example of data paths for proximity communications between two WTRUs $220_1$ and $220_2$ that are locally routed via an eNB 225.

Figure 2C:
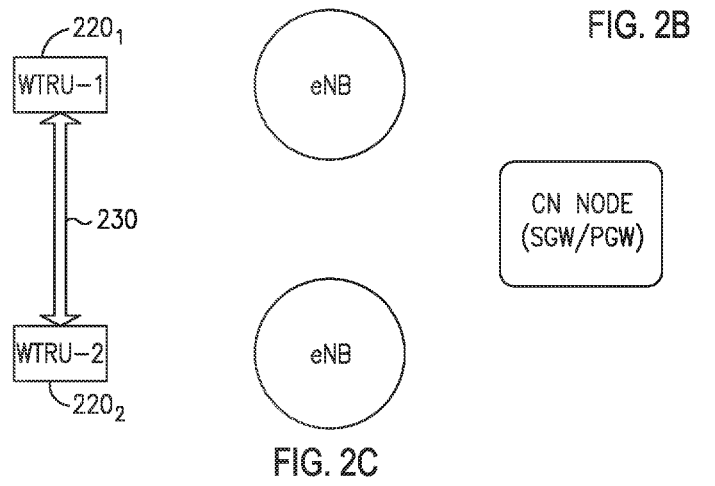
FIG. 2C shows an example of a direct WTRU-to-WTRU, (i.e., end-to-end), data path.

FIG. 2C shows an example of a direct WTRU-to-WTRU data path 230 directly over an air interface.

The proximity service data path selection, (direct or indirect over a certain path in the infrastructure), may be determined by the radio or network coverage, load conditions, or by policies set by network or operators. Proximity-based services may be supported in network sharing deployments.

Various techniques may be used to address one or more challenges to the enablement of WTRU-to-WTRU proximity service. For example, the paging procedure for a WTRU-to-WTRU connection or bearer may be different from the current S1 paging procedure. One of the WTRUs may need to somehow notify the MME that it has data for the other WTRU, which may be in idle mode and also may be under the coverage of another MME. Also, the current paging procedure may setup some or all the resources, (e.g., bring back all the existing evolved packet system (EPS) bearers between the WTRU and the network). However in case of a WTRU-to-WTRU connection, this may not be required, and the resources or resources needed for the direct communication may be setup, thus requiring that this procedure be modified. Further, the MME may page the WTRU to determine its location. Thus, a mechanism may be defined to bring a WTRU to a connected mode, perhaps just to determine the cell level location, and not establish a user plane.

Before the WTRU-to-WTRU communication starts, both of the WTRUs may discover each other and determine that they are close enough for the direct communication to be possible. This type of discovery may be possible at several levels or layers in the protocol stack. NAS methods may be implemented to discover WTRUs. Therefore, different NAS procedures may be defined to send discovery proximity related information to the network. The discovery procedure may be initiated by the network or the WTRU, and may be different for each case. Furthermore, this discovery may also be extended to case where a WTRU may discover a group of WTRUs or both WTRU may belong to different public land mobile networks (PLMNs). In both cases, methods may be defined for a WTRU to discover, join, or leave the group. Furthermore, a proximity group, (referred to hereinafter as a proximity service (ProSe) group), may be formed and dissolved dynamically. A determination may be made as to what the attributes of such groups are, how are such groups formed, who triggered the formation of the group, and when and how.

There may be rules and policies that may typically be listed for allowing certain services. Some or every service may have rules and conditions that may be verified by the CN to allow it to be used. Proximity may be another service that may require rules and policies to be defined, such that the network may control such a service and may be able to charge fees for its usage based on various criteria.

Relevant rules and policies may be required to allow proximity service needs to be listed. These rules may take into account different factors, (e.g., WTRU location, subscription, PLMN, priority user, and the like).

In case of an emergency proximity scenario, a separate set of rules and policies may apply for using proximity services to be delivered during an emergency situation or used for public services, (e.g., D2D communication for a police crew). There may be some abnormal actions, both at the WTRU and the network. Thus, abnormal rules and actions may be outlined.

These rules may be enforced at different nodes, (e.g., eNB, MME, WTRU, and the like). Also, there may be a mechanism to exchange these rules between the WTRU and the network, and thus it would be desirable to define a procedure for exchanging these rules.

Charging may be an important aspect, especially for operators as they require revenue for introducing this service. Thus, methods may be defined by which charging may be applied, depending on the method of communication, (e.g., direct, or via a RAN, or via nodes above RAN).

There may be different ways a direct WTRU-to-WTRU bearer or PDN connection may be setup. This bearer may start from one WTRU and may go all the way to the other WTRU. Depending on how the network establishes this WTRU-to-WTRU bearer, and the capabilities of the WTRUs involved, this bearer may be a direct bearer between two WTRUs, or there may be some intermediate RAN or CN nodes in the path of this bearer.

Figure 3A:
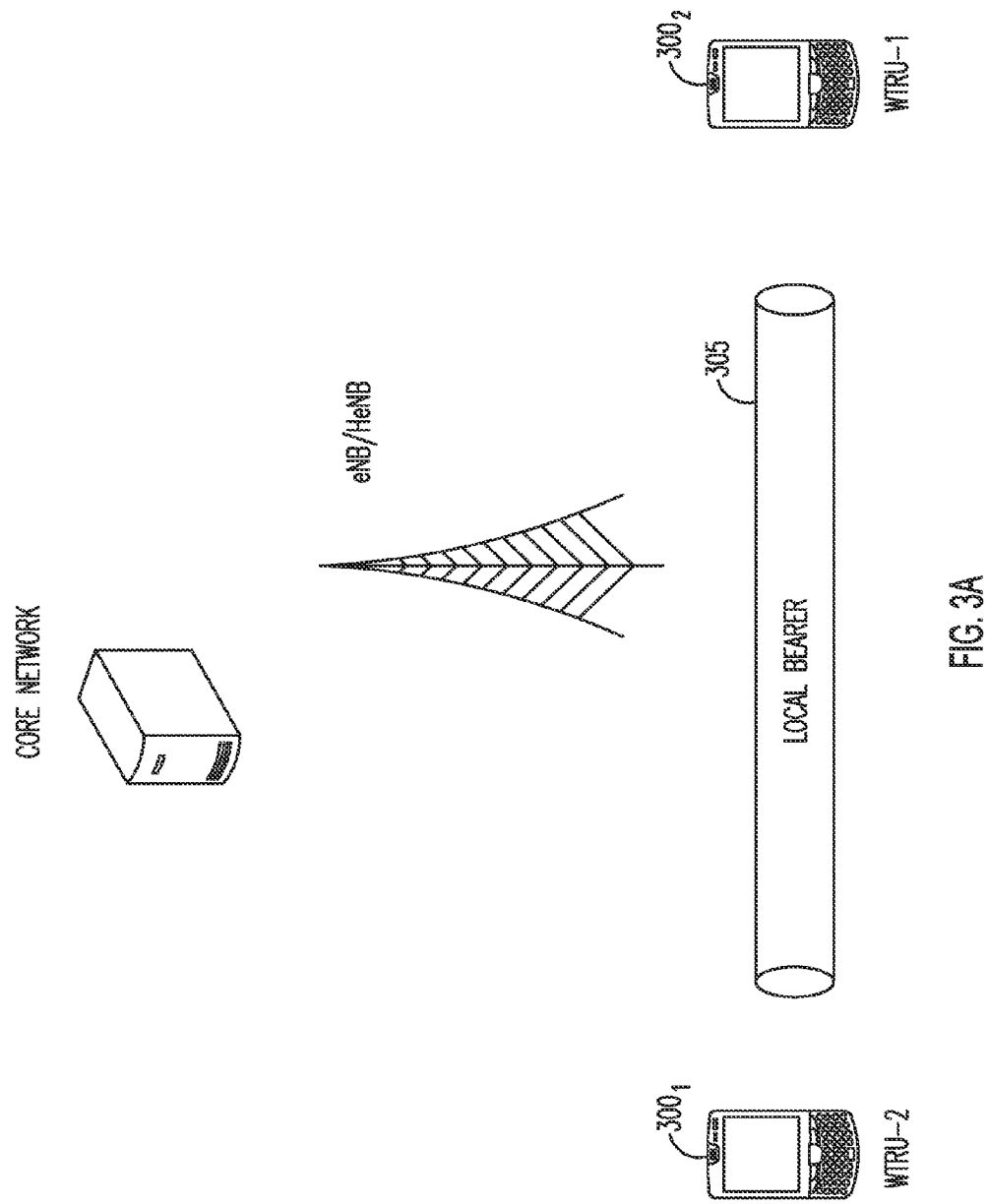
FIG. 3A shows an example of establishing a direct WTRU-to-WTRU bearer with no intermediate nodes involved.

FIG. 3A (Case 1) shows an example of establishing a direct WTRU-to-WTRU bearer, (i.e., end-to-end bearer) with no intermediate nodes involved. FIG. 3A shows that if both WTRUs $300_1$ and $300_2$ support direct WTRU-to-WTRU communication, a local bearer 305 may be established between the two WTRUs $300_1$ and $300_2$. This type of bearer may include a radio bearer between the two WTRUs $300_1$ and $300_2$, but it still may have bearer context at the NAS level in both of the WTRUs. Therefore, a NAS identifier (ID), similar to an EPS bearer ID in the current bearer setup case, may be assigned to this bearer. Alternatively or additionally, this new bearer may not have a NAS context and may start from the packet data convergence protocol (PDCP) layer of one of the WTRUs $300_1$, and may end at the PDCP layer of the other WTRU $300_2$, or vice versa. In this scenario, this bearer may be identified by a RAB ID.

Figure 3B:
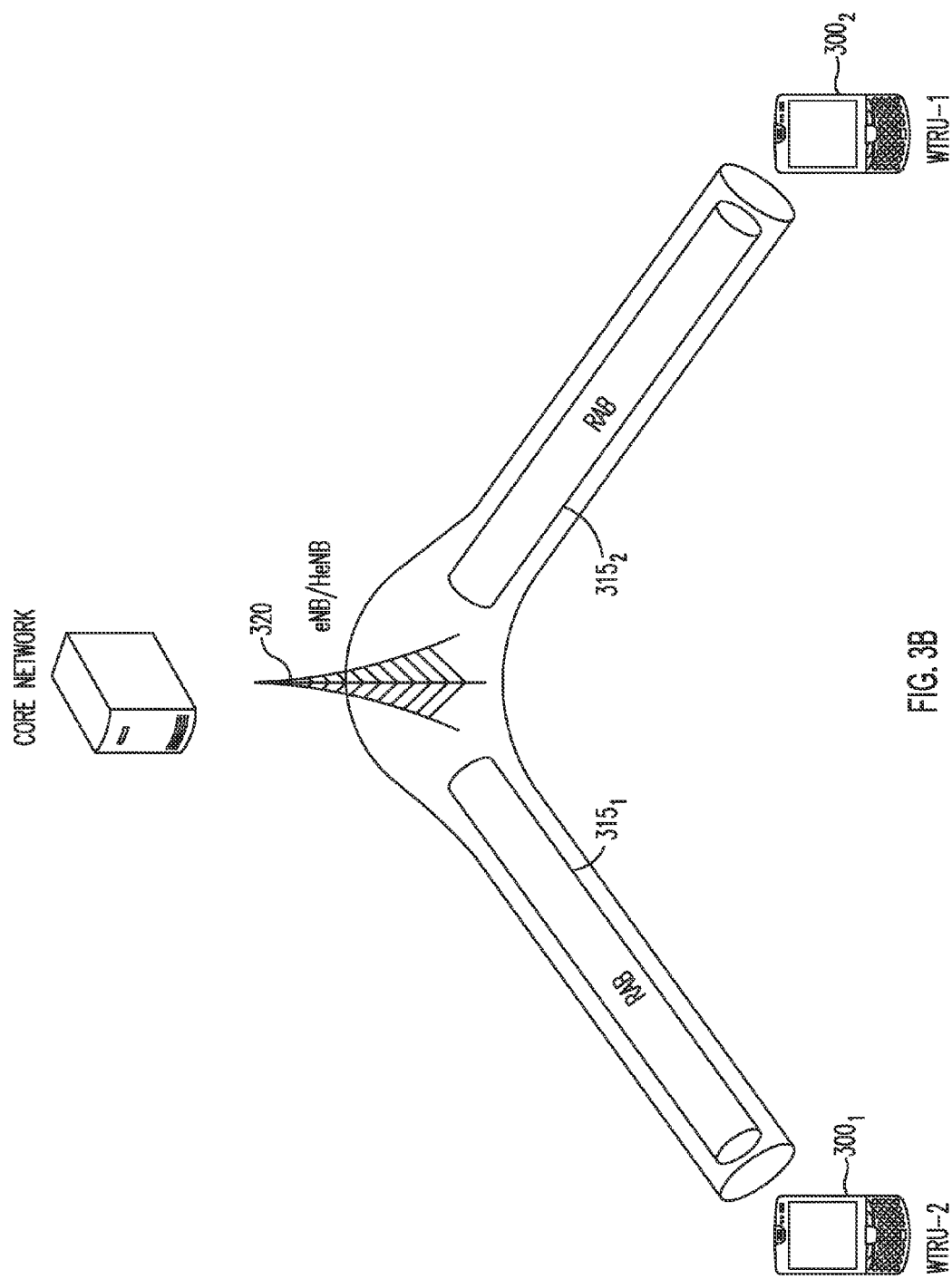
FIG. 3B shows an example of a WTRU-to-WTRU bearer that passes through an eNB or a home eNB (HeNB)

As previously mentioned, the WTRU-to-WTRU bearer may pass through a RAN or a CN node. FIG. 3B (Case 2) shows an example of a WTRU-to-WTRU bearer that passes through an eNB or a home eNB (HeNB). This bearer may include two radio bearers (RABs) $315_1$ and $3152_2$. The RAB $315_1$ may be between WTRU-2 and an eNB/HeNB 320, and the RAB $315_2$ may be between WTRU-1 and the eNB/HeNB 320. These types of bearers may not have a one-to-one mapping between the RAB 315 and an S1 bearer, as there may not be any S1 and S5 resources established in this scenario. Instead, there may be a one-to-one mapping between the RABs 315 on each side of the respective bearers, (e.g., there may be a one-to-one mapping between the RAB $315_1$ to eNB/HeNB 320, and the RAB $315_2$ to eNB/HeNB 320.

FIG. 3C (Case 3) shows an example of establishing a WTRU-to-WTRU connection via an eNB or HeNB in the path using regular EPS bearers. Each WTRU may establish a regular PDN connection, (e.g., both WTRUs may establish S1 and S5 resources as shown in FIG. 3C). However, these resources may not be used for WTRU-to-WTRU communication because when the data arrives at the eNB/HeNB, instead of sending the data to the S1-U tunnel, the eNB/HeNB may route the data towards the RAB connecting the receiving WTRU. The solution presented in Case 3 may also be applied to the following scenario at the SGW level.

Figure 3D:
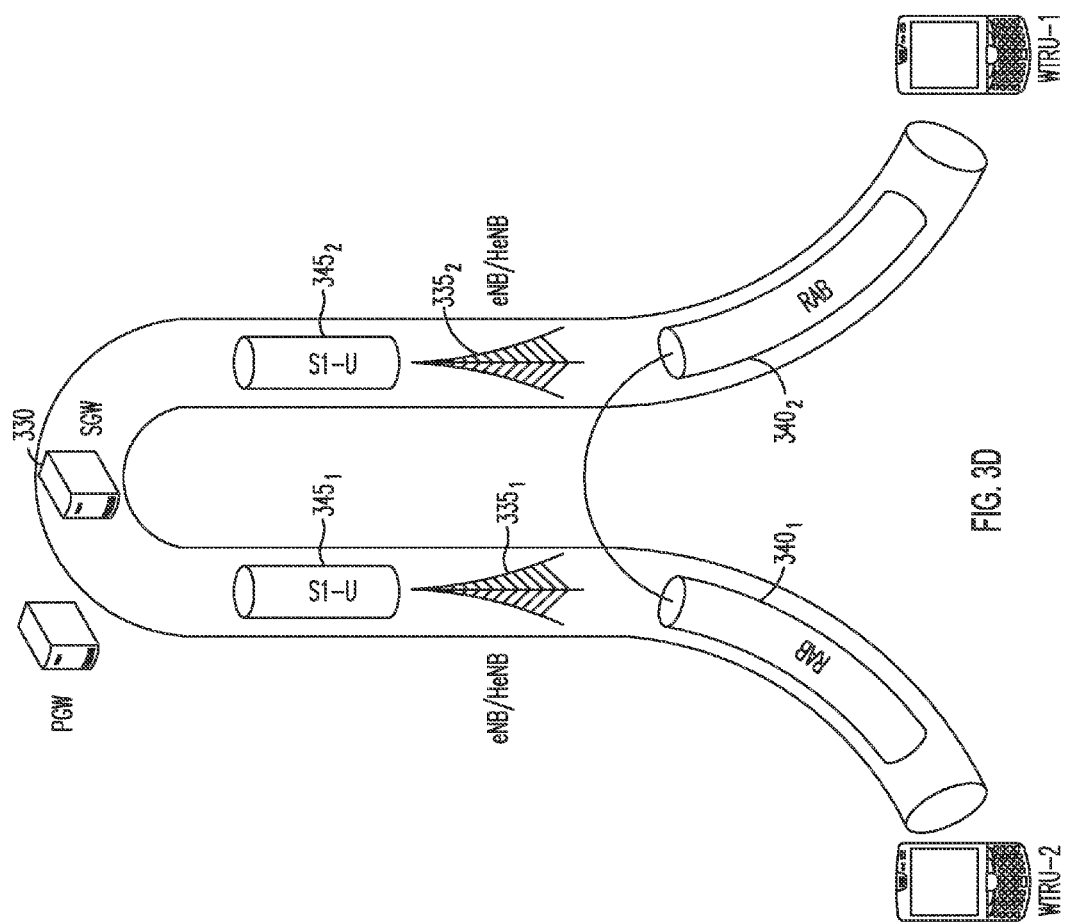
FIG. 3D shows an example of establishing an end-to-end bearer that passes through an SGW when two WTRUs are under the coverage of two different eNBs or HeNBs.

FIG. 3D (Case 4) shows an example of establishing an end-to-end bearer that passes through an SGW 330 when two WTRUs are under the coverage of two different eNBs/HeNBs $335_1$ and $335_2$. In this scenario, the end-to-end bearer may include two RABs $340_1$ and $340_2$, and two S1-U tunnels $345_1$ and $345_2$, as shown in FIG. 3D. There is an RAB $340_2$ between WTRU-1 and an eNB/HeNB $335_1$, and a corresponding S1-U connection between the other eNB/HeNB $335_2$ and the SGW 330. Also, the same arrangement exists between WTRU-2 and the SGW 330. There may be a one-to-one mapping between the RAB and the S1-U connection. Also, there may be a one-to-one mapping between the two S1-U tunnels 345 as depicted in FIG. 3D.

A method and apparatus are described for performing an attach procedure to obtain device-to-device (D2D) services, and performing D2D service advertising and discovery. A mobility management entity (MME) may receive an attach request non-access stratum (NAS) message from a wireless transmit/receive unit (WTRU) and send a D2D WTRU capabilities message to a D2D server. The D2D server may send a unique D2D device identifier to the MME on a condition that the D2D server approves the WTRU for D2D service. The MME may send an attach accept NAS message including the unique D2D device identifier to the WTRU. A D2D WTRU may send a generic alert message to an access network discovery and selection function (ANDSF), which may update an ANDSF management object (MO) associated with the D2D WTRU with new D2D discovery information. The D2D WTRU may use the new D2D discovery information to find another WTRU to communicate with.

Procedures to enable call establishment for D2D communications are described herein, as well as a protocol stack architecture for D2D communications, service request procedures for intra-operator including intra-eNB and inter-eNB unicast and multicast sessions, service request procedures for inter-operator unicast and multicast sessions, and service teardown and D2D de-registration procedures. These procedures may be applicable to both the network and WTRUs operating in D2D communications.

The demand for wireless mobile data continues to explode, and this is leading to a surge in the number of smart phones in usage throughout the world. The telecommunications industry has in the past responded to demand with newer standards that provided increases in spectral efficiency through the use of better multiple access, modulation and coding and multi-antenna techniques.

Another dimension for capacity improvement has been through the increase in the density of deployment and correspondingly reducing the cell radius. In addition, heterogeneous topologies have been increasingly used, wherein small cells (micro/pico/femto) are deployed in conjunction with macro cells. Indoor coverage improvements through the use of remote radio-heads and distributed antennas have also proliferated. There are, however, limits and drawbacks to these approaches. Small cell deployments lead to a huge increase in mobility events, and the accompanying interference management issues are complex. The biggest drawback of the above techniques is the necessity for large amounts of additional infrastructure, such as high capacity internet backhaul, power sources, and radio frequency (RF) equipment that have to be maintained.

One possible alternative solution is to use the power of the smart phone revolution in a creative manner. Smart phones are becoming increasingly powerful devices, with multiple wideband radios and modems, and the capability to process large amounts of data, as well as run multiple simultaneous applications. If these smart phones are allowed to communicate directly with each other when necessary and possible, an alternate topology may be created that may co-exist with the conventional cellular deployment.

Enabled by such direct WTRU-to-WTRU communications, advanced topology (AT) applications may include AT-relay (AT-R) and AT-local offload (AT-LO). In the AT-R application, a terminal-WTRU (T-WTRU) may exchange data with the network through a relay node, which is a helper-WTRU (H-WTRU). The AT-LO application may allow the direct data communication between WTRUs in proximity under the control of the central network.

The AT-R application may include a capacity mode and a coverage mode. In the capacity mode, the T-WTRU is associated with the network and enlists the H-WTRU to augment the radio link capacity and improve data transmission capacity, while in the coverage mode the T-WTRU is out of network coverage and may rely on an H-WTRU to attain the network association. Both modes are envisioned for low mobility WTRUs.

In the AT-LO application, WTRUs in proximity may either be the source or the sink for the information exchanged. The radio link between the WTRUs in an AT-LO application may use licensed cellular spectrum or unlicensed or lightly-licensed spectrum.

The communication between WTRUs may occur in a dedicated channel called the cross link (XL), as opposed to the traditional eNB-to-WTRU communications that occur over the traditional radio link (TRL). The XL may be in a separate band (out-band solution) or in the same band as the traditional link (TRL), even in adjacent frequency subcarriers. The H-WTRU and T-WTRU may communicate with each other either in frequency division duplex (FDD) or time division duplex (TDD) fashion, and the related configuration may be defined by the network. The network may provide coarse resource allocation for the XL, and the WTRUs may have the freedom to handle the per-transmission timing interval (TTI) resource allocation.

D2D communications have become a subject of discussion in the 3GPP with the introduction of the proximity services (ProSe) study item in the SA1 group. "Direct path", wherein the physical communication is directly between the D2D devices, and "local path", wherein the communication can be through the eNB to which both the devices are connected, are both scenarios that are within the scope of ProSe.

Several use cases have been defined to be tackled as part of ProSe thus far, each of which brings up a different set of requirements on the system design. These can be broadly categorized under social and public safety.

In a basic social use case, D2D users may be able to discover and be discoverable by other D2D users that belong to their user group, (e.g., friends' list), and then may use a social network application over the D2D link. The discovery may be performed without any WTRU location information. In a public discovery case, a D2D user may be discoverable by any other D2D user without needing prior permission. For different public land mobile network (PLMN) discovery, D2D users belonging to different PLMNs may be discoverable to each other. A sub-set of this is when the D2D users are also roaming. For service continuity, D2D users may move between direct path and infrastructure mode with no degradation perceivable by the user. For location and presence, operators may enhance their location and presence information with ProSe procedures.

In a basic public safety use case, two authorized public safety users may communicate directly over the D2D link. A public safety D2D user may maintain multiple simultaneous one-to-one D2D sessions with different D2D public safety users.

The objectives of D2D discovery may be achieved by device and service discovery respectively. Device discovery, (i.e., neighbor discovery), process leads user devices to find each other based on device identities. These device identities may be in the form of physical layer sequences, radio access network (RAN) identities, or higher layer identifiers. Device discovery may involve physical communication between the devices. In the device (or neighbor) discovery process, the WTRUs looking for neighbors, (neighbor seeking WTRUs (NSWTRUs)), may transmit a discovery sequence in specific time-frequency resources based on a schedule provided by the network. Other WTRUs, (neighbor present WTRUs (NPWTRUs)), may listen during these intervals and receive these sequences. Based on their measurements, they may either respond back directly to the NSWTRUs or report the measurements back to the network for further action, followed by an association process between the WTRUs.

Each D2D device may have one or more services, and thus have multiple service identities. These service identities, along with the parameters of the offered services, may be discovered as part of service discovery. Service discovery may be performed either by communication between the device and another 3GPP node, some node external to the 3GPP network, or by direct exchange of service information between the devices after completion of device discovery. Service discovery may occur either before or after device discovery.

Architectural enhancements are needed in order to incorporate D2D communication into the 3GPP evolved packet core (EPC). These changes and additions to the existing architecture may be needed in order to enable the efficient operation of a large number of D2D-capable devices in the network, enable the coexistence of D2D links along with the traditional cellular links, fulfill all the deployment configurations envisioned for the 3GPP ProSe feature, and fulfill all the service requirements for D2D communication as laid out by 3GPP.

Figure 4:
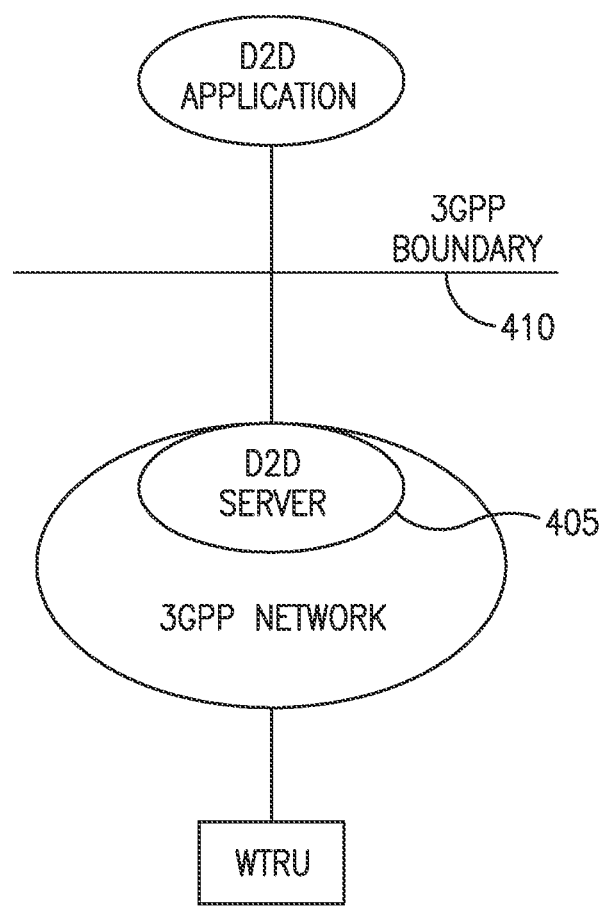
FIG. 4 shows a device-to-device (D2D) architecture as a condensed view of a direct model.

FIG. 4 shows a D2D architecture 400 as a condensed view of a direct model. In this direct model, a D2D server 405 may be located within a 3GPP network boundary 410. It may be located as a single entity that is common to multiple operators and is managed jointly by them, or it may be realized as multiple entities, located partly in each operator's domain.

Figure 5:
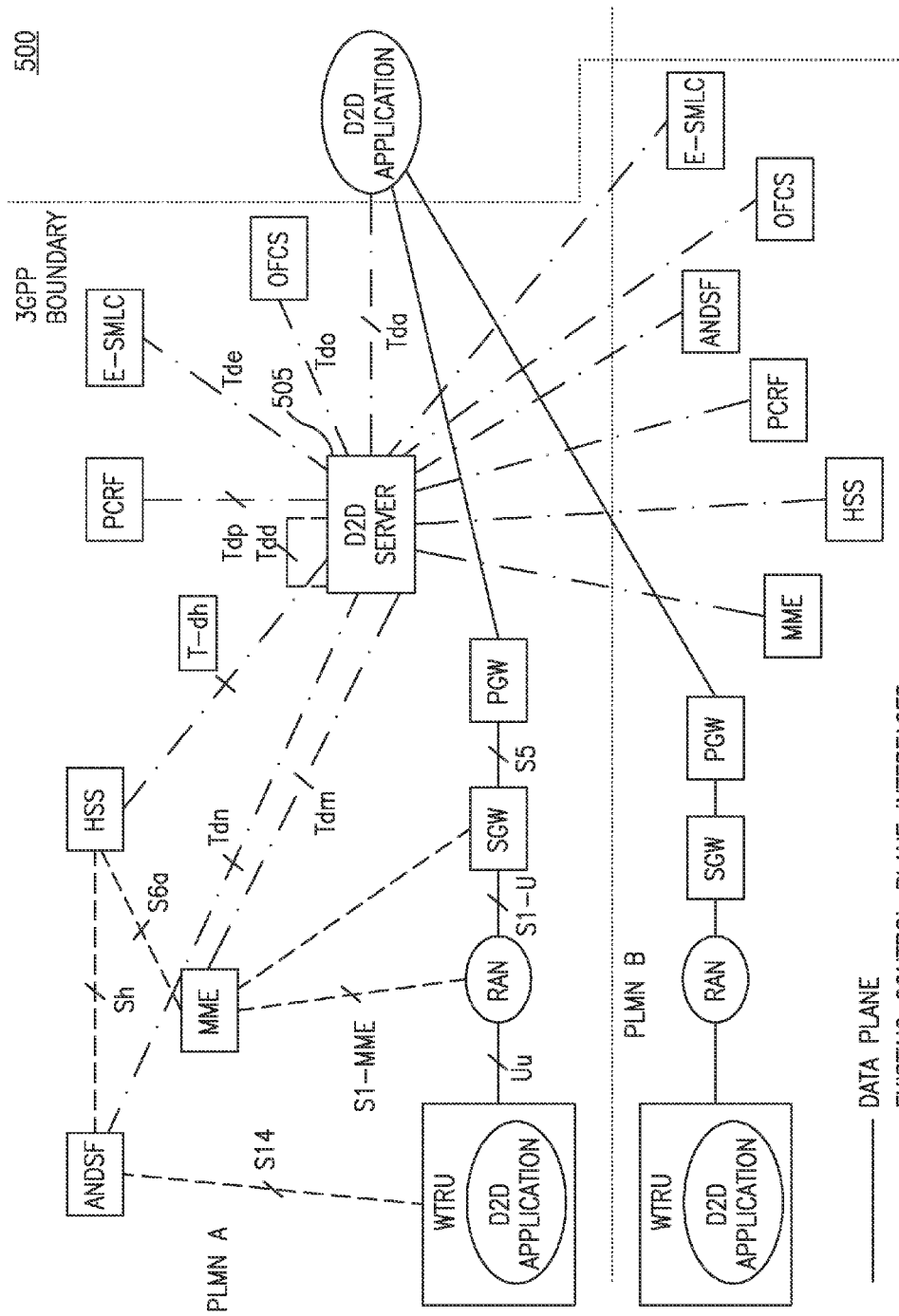
FIG. 5 shows a D2D architecture as an expanded view of a direct model.

FIG. 5 shows a D2D architecture 500 as an expanded view of a direct model. A D2D server 505 may manage D2D service for both the direct path and local path approaches to D2D. It may manage both intra-operator as well as inter-operator D2D services. The D2D services may be managed using either a centralized, hierarchical or a distributed management approach. The physical location(s) of the D2D server 505 may depend on the type of D2D management approach used. In the centralized approach, a D2D server 505 for the entire 3GPP network across all operators may be located in one entity. In a hierarchical approach, D2D servers may be replicated for different domains, (a domain may be defined as a PLMN, or an MME pool within a PLMN, and the like), and these may be coordinated by a D2D server entity at a higher level. Multiple levels of hierarchy are possible. In a distributed approach, multiple peer D2D entities may be located in different domains, and they may communicate with each other when they need to do so.

Call establishment procedures are described herein. A protocol stack architecture for both control and data planes is first described, followed by service request procedures for a multitude of scenarios including intra-eNB and inter-eNB, intra-operator and inter-operator, unicast and multicast.

Figure 6:
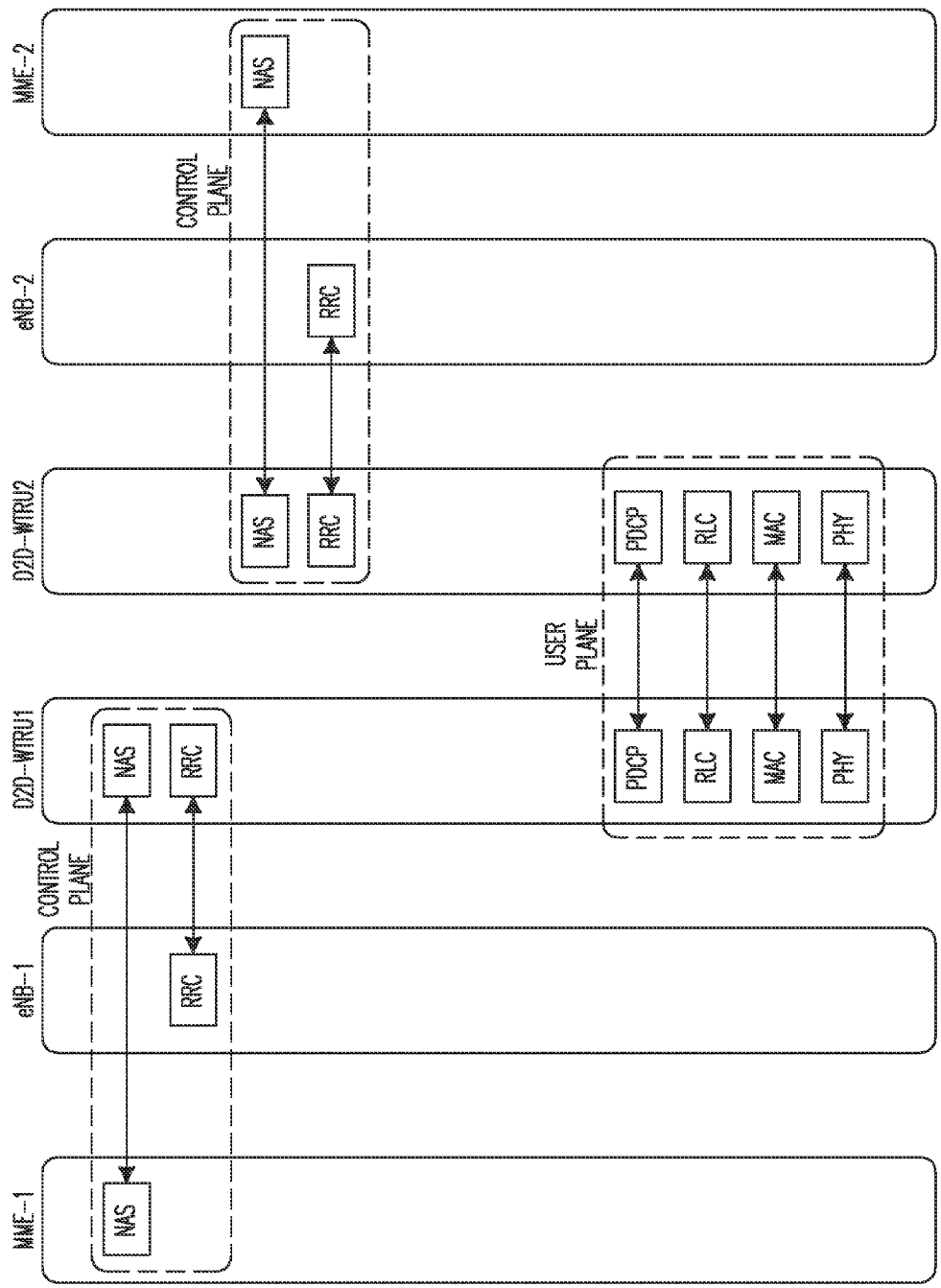
FIG. 6 shows a D2D protocol stack view.

FIG. 6 shows a D2D protocol stack view for D2D bearers between two D2D WTRUs, namely D2D-WTRU-1 and D2D-WTRU-2 for direct-path. The D2D-WTRU-1 may be associated with eNB-1 and MME-1, whereas the D2D-WTRU-2 may be associated with eNB-2 and MME-2 in this scenario.

Control plane termination for D2D bearers may be similar to LTE R8/R10 (without relays). The radio resource control (RRC) layer may terminate at the eNB, and the non-access stratum (NAS) layer may terminate at the MME. The data plane layers may terminate in the corresponding D2D WTRUs. The protocol layers for data plane may not be maintained at the eNBs. For the local path, both the control plane and the data plane protocol stack termination points may be similar to LTE R8/R10.

After service discovery and device discovery, a D2D capable WTRU may use a service request procedure to establish a D2D service. The service request message sent to the MME may include information that may assist the process, such as the service type—"D2D only" or "baseline and D2D", and whether the D2D service is for one user or to a group of users. A D2D unicast service or a D2D multicast service may be established, depending on how many users the D2D service is targeted for. The D2D service may be an intra-eNB, inter-eNB, or inter-PLMN service, depending upon where the individual users are connected to the network. The procedure for establishing the service may be different for each of the above cases. It is first assumed that if the target WTRUs are idle, they may first be brought into an RRC-connected state through paging and connection establishment procedures as necessary.

The D2D service related parameters in the service request may be first examined by the MME to determine whether the targeted WTRU(s) belong to the same MME. If the D2D service is intra-MME, then the target eNB information may also be available at the MME. If the target is not found within the MME, the parameters may then be sent to the D2D server. The D2D server may have the identity of the MME to which the target WTRU is currently attached to, (such as the MME's IP address), and the D2D server may also verify whether this service requires inter-PLMN operation.

A new kind of EPS bearer, (i.e., D2D EPS bearer), may be established for the D2D service. The D2D EPS bearer may not have the S1 interface between the eNB and the serving gateway (SGW) and the S5/S8 interface between the SGW and the packet data network (PDN) gateway (PGW), since data may be exchanged on the direct or local path in the D2D service.

Figure 7:
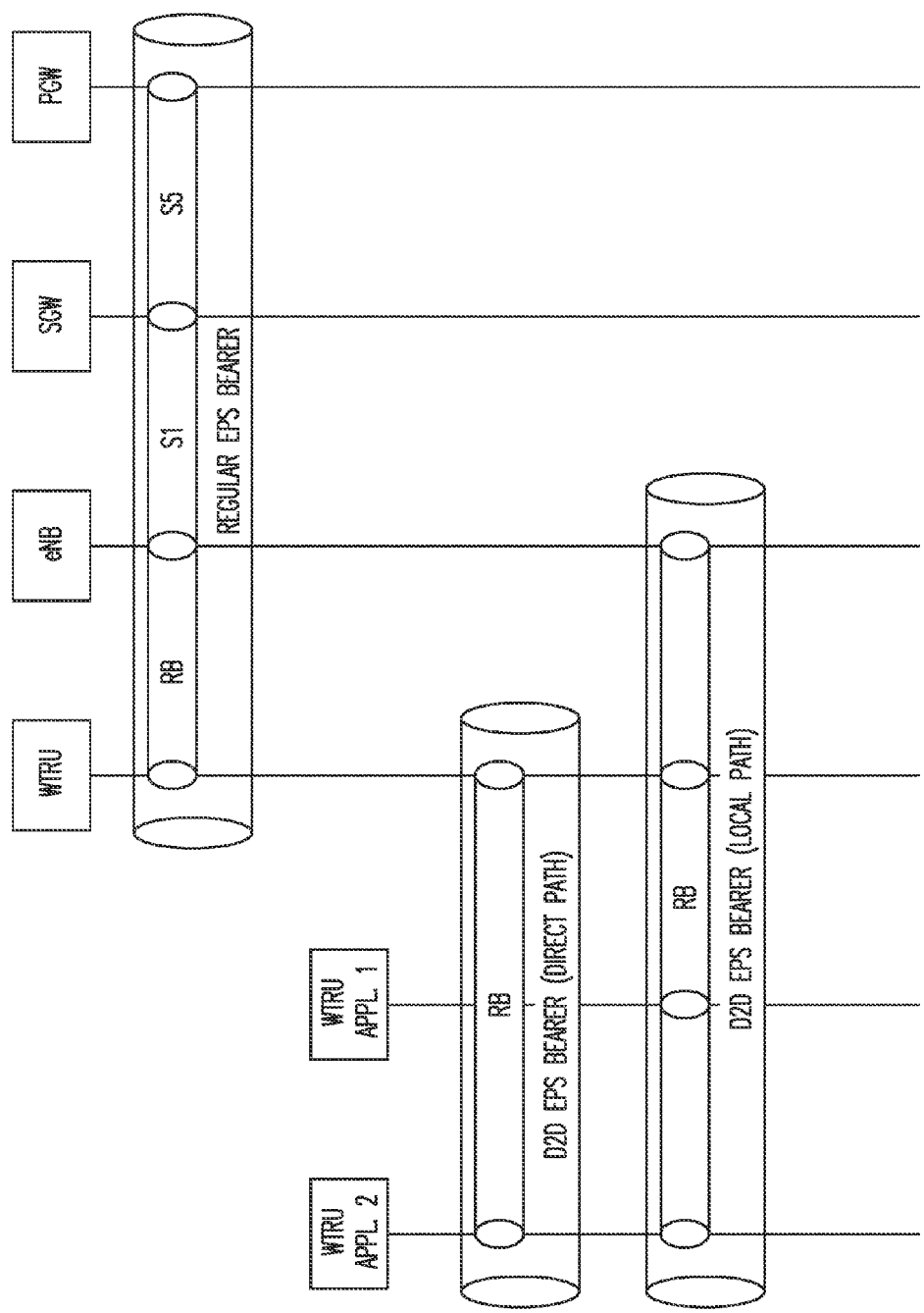
FIG. 7 shows a regular EPS bearer versus a D2D EPS bearer.

FIG. 7 shows a regular EPS bearer versus a D2D EPS bearer. The radio bearer establishment for the direct path between the users may be similar to the baseline LTE system. The related eNBs may be responsible for ensuring that the radio bearers with compatible configuration may be established on the D2D peers. For example, the radio bearer identity (ID) used by the WTRUs for this D2D service, the TDD configuration, maximum allowable data rate, modulation and coding scheme (MCS), and the like, may match. The communication/coordination may be at the MME to MME level to avoid changes to the existing X2 interface. The eNBs may communicate with each other to perform the coordination, provided that there are some changes in the X2 interface between the eNBs from more than one operator.

In an intra-eNB unicast D2D service, the two users involved are under the coverage of the same eNB. The targeted WTRU's D2D device identifier and the temporary service name may be included in the service request message. The eNB in question is aware of the capabilities of both the WTRUs, and may be able to configure their D2D bearer(s) accordingly. A new type of EPS bearer without the S1 and S5 interface may be used to represent the D2D service(s) between the two users.

Figure 8:
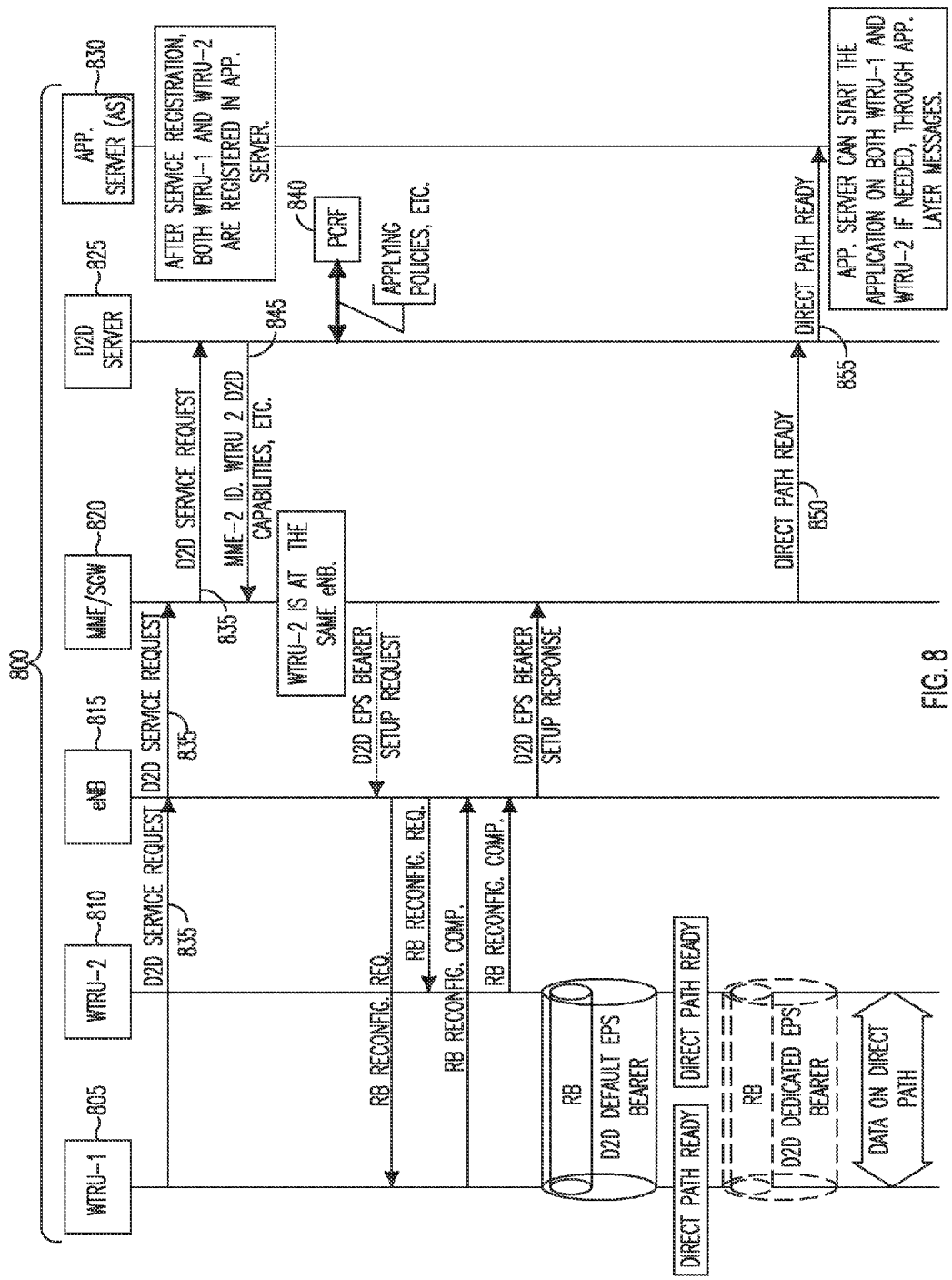
FIG. 8 is a flow diagram of an intra-eNB unicast D2D service request procedure.

FIG. 8 is a flow diagram of an intra-eNB unicast D2D service request procedure in a wireless communication system 800 including a first WTRU 805, a second WTRU 810, an eNB 815, an MME/SGW 820, a D2D server 825 and an application server (AS) 830. When the WTRU 805 desires to have D2D service with the WTRU 810, the WTRU 805 may send a service request 835 to the MME/SGW 820 through the eNB 815 with the D2D device ID of the WTRU 810 and the temporary service name. The MME/SGW 820 may forward the D2D service request 835 to the D2D server 825. The D2D server 825 may grant the D2D service request 835, together with a policy and charging rules function (PCRF) 840, and send the ID of a target WTRU's MME to the source MME (845). In this case, the MME for the WTRU 810 may be the same MME/SGW for the WTRU 805, (i.e., MME/SGW 820). The MME/SGW 820 may determine that the WTRU 810 is under the coverage of the same eNB as the WTRU 805, so it may inform the eNB 815 to perform radio configuration to setup a default D2D EPS bearer between the WTRUs 805 and 810. The eNB 815 may use a radio bearer (RB) reconfiguration procedure to configure the radio for both of the WTRUs 805 and 810. Once the default D2D EPS bearer is established, if the D2D service needs other dedicated D2D EPS bearers, the source MME may establish them in a similar way.

After the necessary D2D EPS bearer(s) is/are established, the source MME/SGW (MME/SGW 820) may send a message 850 to the D2D server 825 to indicate that the direct path between the WTRUs 805 and 810 is available. The D2D server 825 may forward this information to the AS 830 as message 855. The AS 830 may start controlling the applications on the WTRUs 805 and 810 that are using the direct path after this point, through application layer signaling to the WTRUs 805 and 810.

Figure 9A:
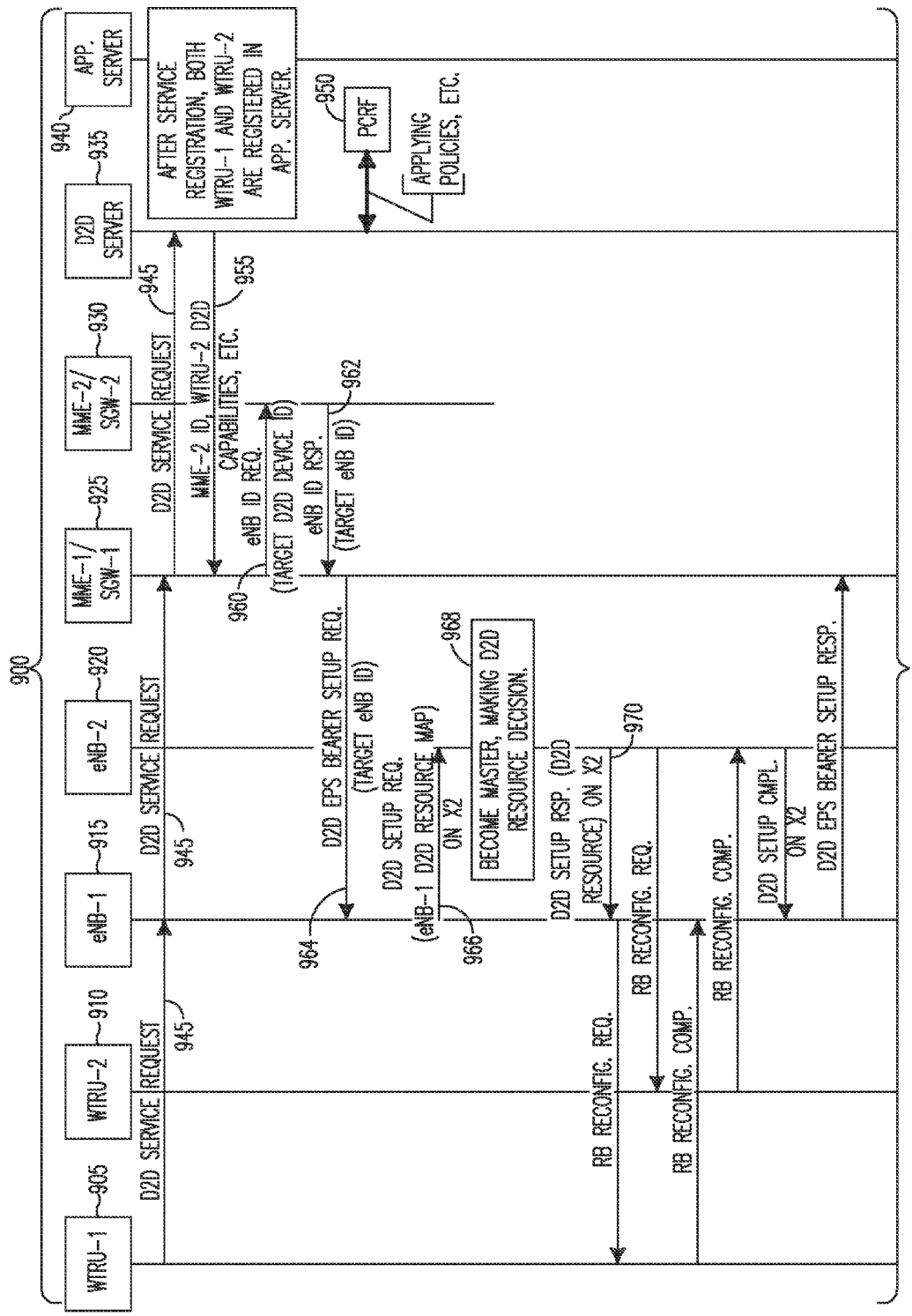
FIGS. 9A and 9B, taken together, are a signal flow diagram of an inter-eNB/inter-mobility management entity (MME) D2D service request procedure.
Figure 9B:
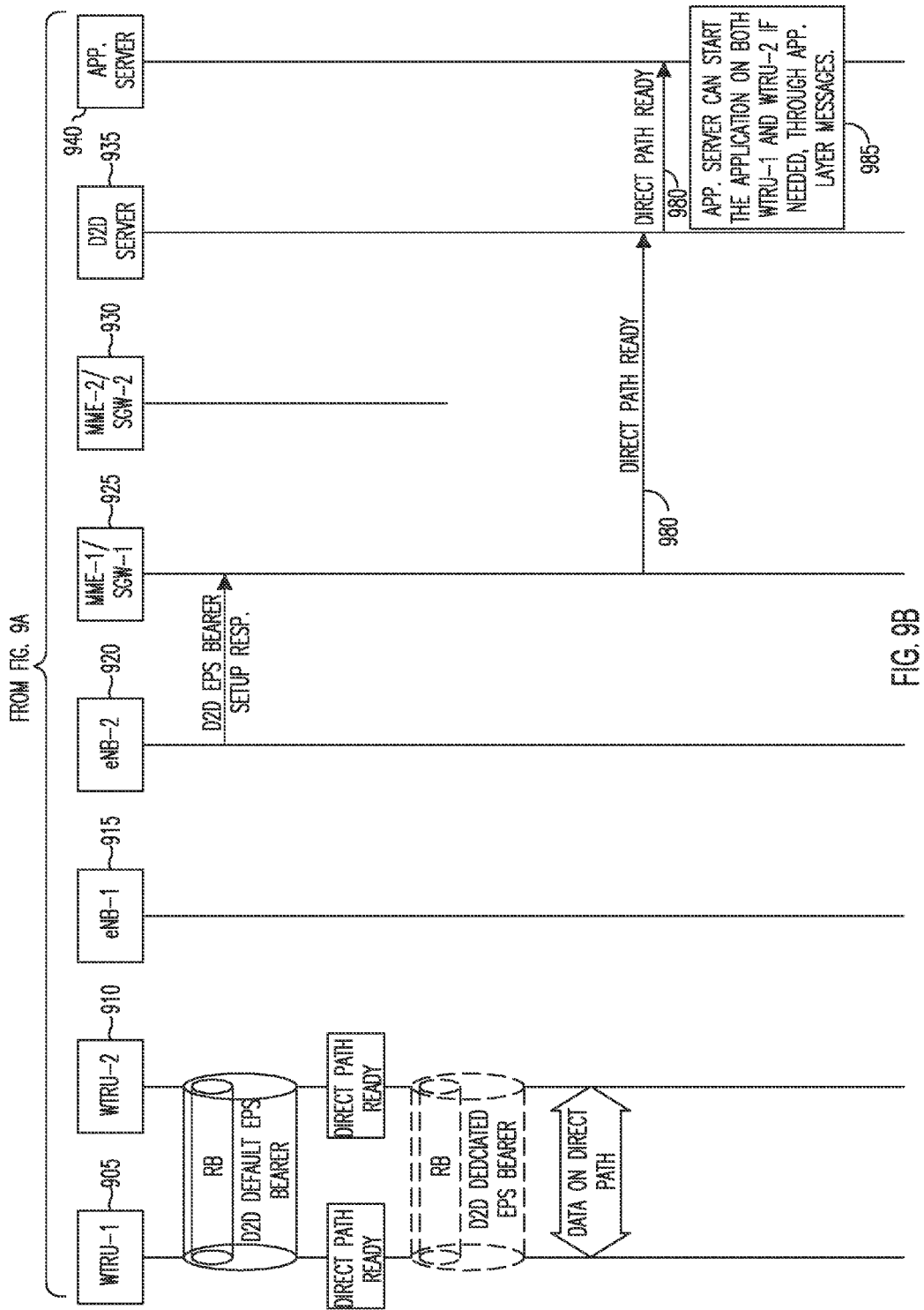

FIGS. 9A and 9B, taken together, are a signal flow diagram of an inter-eNB/inter-MME D2D service request procedure with eNB coordination on the X2 interface between eNBs in a wireless communication system 900. As shown in FIG. 9A, the wireless communication system 900 may include a WTRU 905, a second WTRU 910, a source eNB 915, a target eNB 920, a source MME/SGW 925, a target MME/SGW 930, a D2D server 935 and an application server (AS) 940. In the inter-eNB unicast, the WTRUs 905 and 910 may be connected to different eNBs 915 and 920, and may be with two different MME/SGWs 925 and 930 (inter-MME/SGW). Coordination may be required between those two eNBs 915 and 920. The coordination may include but is not limited to radio resource configuration for the direct path, radio resource scheduling for the direct path, and establishment of a "master" for purposes of RRC.

The coordination may be directly through the X2 interface between the eNBs 915 and 920 if it exists, or through the MME/SGWs 925 and 930 and the S10 interface therebetween (not shown).

In this case, WTRU 905 may desire to request D2D service with WTRU 910. Therefore, WTRU 905 may send a D2D service request 945 through the source eNB 915, to the source MME/SGW 925, with the D2D device ID of WTRU 910 and the temporary service name. The source MME/SGW 925 may forward the D2D service request 945 to the D2D server 935. The D2D server 935 may grant the D2D service request 945 together with the PCRF 950, and send the ID of the target WTRU's MME 930 to the source MME/SGW 925 (955). The source MME/SGW 925 may send an eNB ID request 960 to the target MME 930 with the D2D device ID of the WTRU 910. The target MME 930 may respond back with an eNB ID response 962 that contains the ID of the target eNB 920. The source MME/SGW 925 may send a D2D EPS bearer setup request 964 to the source eNB 915 with the ID of target eNB 920. The source eNB 915 may send a D2D setup request 966 to the target eNB 920 on the X2 interface with a suggestion list of resources used for the D2D link. The target eNB 920 may become the master and make decisions on using a subset of the suggested list of resources from the source eNB 915 (968). The target eNB 920 may send a D2D setup response 970 back to the source eNB 915 on the X2 interface, carrying its decision. Both the source eNB 915 and the target eNB 920 may perform radio configuration to setup the default D2D EPS bearer between the WTRUs 905 and 910 using the resources specified by the target eNB 920 in accordance with an RB reconfiguration procedure.

The default D2D EPS bearer may be established with the above-mentioned procedure. If the D2D service needs other dedicated D2D EPS bearers, the source MME/SGW 925 may either establish them in a similar way, or by using the D2D default EPS bearer. In the latter case, the source eNB 915 and the target eNB 920 may coordinate the effort through the D2D default EPS bearer in the D2D link.

As shown in FIG. 9B, after the necessary D2D EPS bearer(s) are established, the source MME/SGW 925 may send a message 980 to the D2D server 935 to indicate that the direct path between the WTRUs 905 and 910 is available. The D2D server 935 may forward the message 980 to the AS 940. The AS 940 may start controlling the applications on the WTRUs 905 and 910 that are using the direct path after this point, through application layer signaling to the WTRUs 905 and 910 (985).

Multicast/broadcast service in D2D may allow all of the users to become senders of traffic under scheduling. To request for a multicast D2D service, a WTRU may send the service request message containing the temporary service name instead of a specific user identity. By the help of the MME and the D2D server, the eNB may realize that it is an intra-eNB service. The eNB may use a procedure to select the radio configuration and to configure all WTRUs involved for the D2D link accordingly. The eNB may do this with the minimum configuration based on the resource usage, or it may rely on the D2D server to provide the minimum possible configuration based on the knowledge of the capabilities of all the involved WTRUs, and perform the radio configuration accordingly. Radio bearers with compatible configuration are established for all the users.

The radio resource scheduling for the multicast/broadcast may be performed by extending the semi-persistent grant mechanism to the multicast users. The scheduling may be determined by a master, (e.g., the eNB), for a period of time call scheduling window. The eNB may obtain buffer status from all users, and then at the beginning of each scheduling window, it may allocate a schedule. The users may be allowed to join and to leave an existing service at the beginning of a scheduling window, at which time the eNB may reallocate the resources.

Similar to inter-eNB unicast, inter-eNB multicast/broadcast may require coordination between the two eNBs through the X2 interface. The D2D server may recognize that the D2D service request by a WTRU is an inter-eNB case, and it may inform the WTRU's MME which eNBs are associated with the other WTRUs participating in the service. The WTRU's eNB may then communicate with these eNBs.

Radio bearers with a compatible configuration may be established for all of the WTRUs participating in the service. This can be performed with a predefined minimum configuration, or may be coordinated by the D2D server by providing the minimum possible configuration based on knowledge of the capabilities of all the WTRUs.

The air resource scheduling may be performed in the same way as for the intra-eNB case. However, the scheduling may require coordination between the eNBs for the inter-eNB case.

In inter-operator D2D service, the D2D server is aware of the fact that the WTRUs involved in the D2D service are from different operators. The communication/coordination between the two operators' networks can be at the MME to MME level to avoid changes to the existing X2 interface. It is also possible that the eNBs can talk to each other to perform the coordination, provided there are some changes in the X2 interface between the eNBs from more than one operator.

Figure 10A:
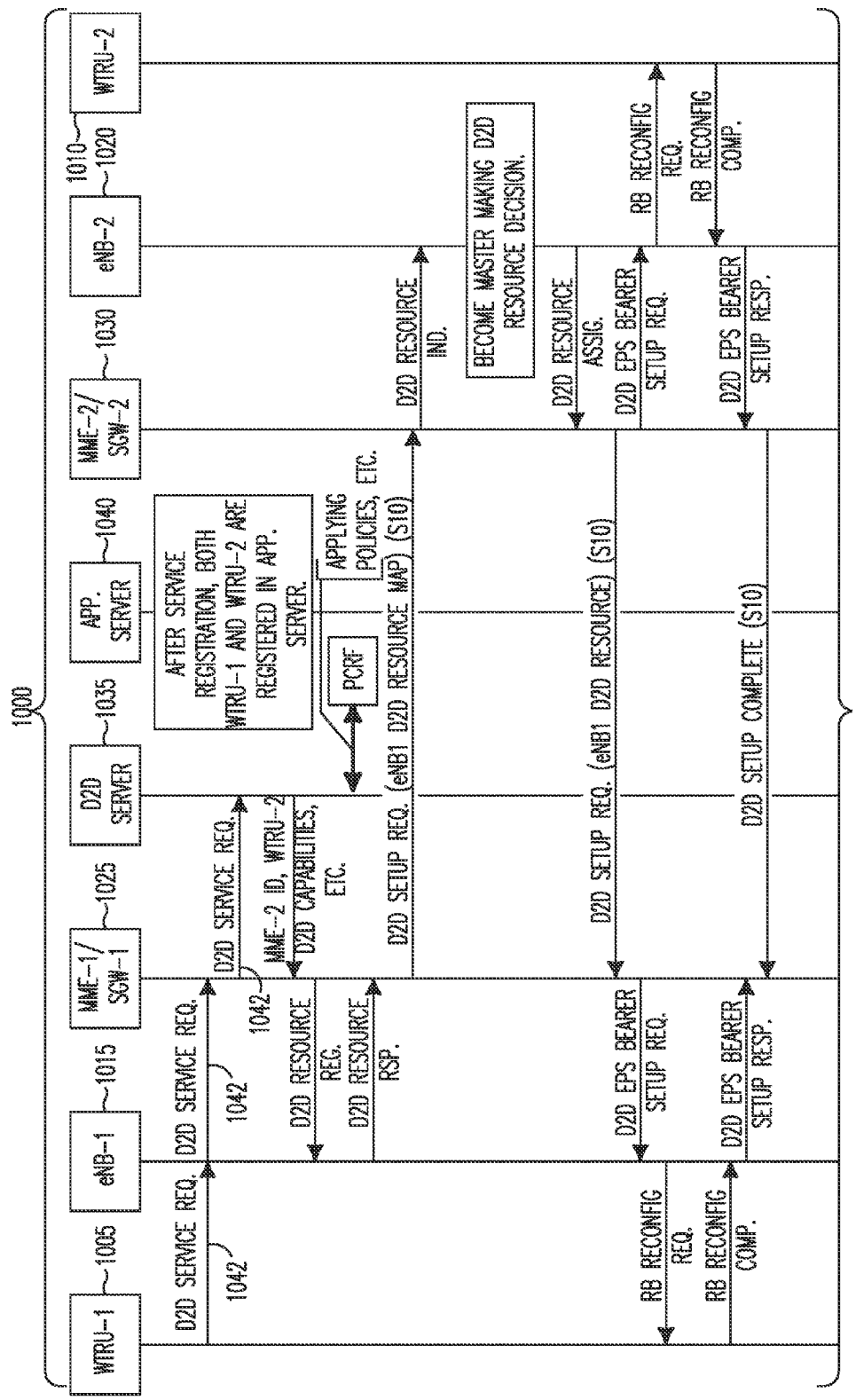
FIGS. 10A and 10B, taken together, are a signal flow diagram of a service request procedure for inter-operator unicast.
Figure 10B:
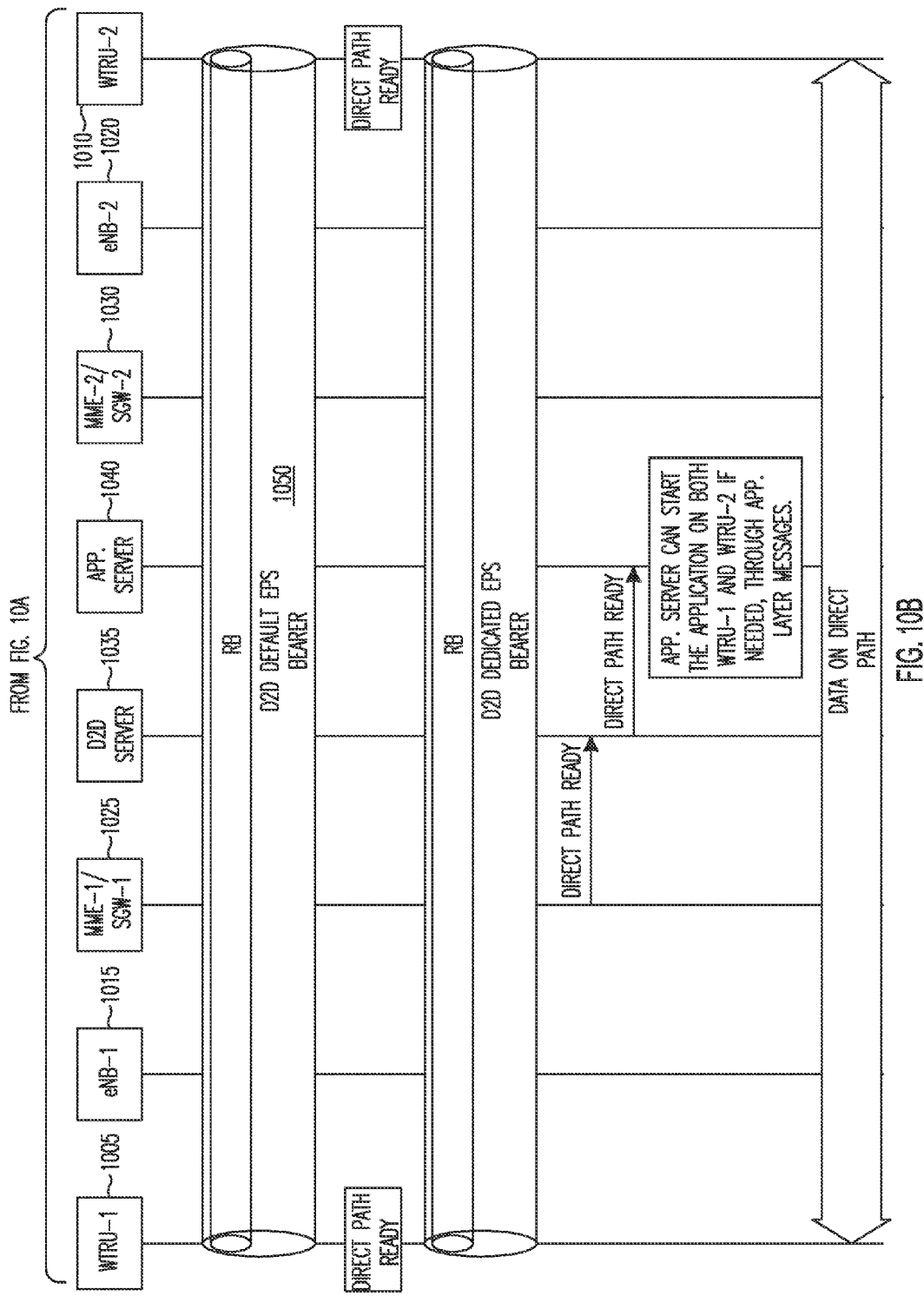

FIGS. 10A and 10B, taken together, are a signal flow diagram of a service request procedure for inter-operator unicast in a wireless communication system 1000. As shown in FIG. 10A, the wireless communication system 1000 may include a first WTRU 1005, a second WTRU 1010, a source eNB 1015, a target eNB 1020, a source MME/SGW 1025, a target MME/SGW 1030, a D2D server 1035 and an AS 1040. To initiate an inter-operator unicast D2D service, the WTRU 1005 may send the source MME/SGW 1025 a D2D service request 1042 with the D2D device identifier of the target WTRU 1010. The source MME 1025 may check its own data list of D2D devices to see if the target WTRU 1010 is on the list. If not, the MME/SGW 1025 may send the D2D device identifier of the target MME/SGW 1030 to the D2D server 1035. The D2D server 1035 may maintain the mapping between the D2D device ID and the MME/SGW 1030, and may inform the source MME/SGW 1025 to which MME/SGW (target MME/SGW 1030) the target WTRU 1010 is attached.

As shown in FIG. 10B, a default D2D EPS bearer 1050 may then be established between the WTRUs 1005 and 1010, followed by a number of dedicated D2D EPS bearers if necessary. For example, the radio bearer configuration may include establishment of a default bearer with minimum configuration. The D2D server 1035 may provide the WTRUs capabilities to one MME/SGW as the master, which may then indicate the configuration to another MME/SGW which is a slave. The MME/SGWs may then pass the configuration to the eNBs for establishing the radio bearers. The source MME/SGW 1025 may acquire the WTRU capabilities from the WTRUs 1005 and 1010, and pass it in a container to the target MME/SGW 1030 and on to the target eNB 1020, so that the radio bearer configuration may be coordinated.

The two operators may coordinate the radio configuration. As described above, this coordination may be implemented either at an eNB-to-eNB level or at the MME-to-MME level. In case eNB-to-eNB level coordination is used, the source MME may request the target MME to be identified by using the target WTRU's D2D device identifier. The target MME may send information identifying the target eNB to the source MME, and the source MME may forward this information to the source eNB so that the source eNB knows who it may coordinate with via the X2 interface.

With MME-to-MME level coordination, the source MME may send a D2D resource request message to the source eNB to request available radio resources for the D2D link. The source eNB may respond to the source MME with a D2D resource response message containing the suggested D2D radio resource list. The source MME may then send the target MME a D2D setup request message on the S10 interface, to request the target MME to setup the D2D link with the suggested resource list. The target MME may forward the suggested resource list from the source eNB to the target eNB in a D2D resource indication message. The target eNB may select a subset of resources from the suggested resource list, and may respond to the target MME with its choice in a D2D resource assignment message. In this case, it is the target eNB that becomes the master to choose the D2D resources used. With some signal variation, the source eNB may become the master in another embodiment. Continuing with this scenario, the target MME may send a D2D setup response message back to the source MME on the S10 interface, carrying the target eNB's decision on which resources may be used. Both the source and target eNBs may use an RB reconfiguration procedure to reconfigure the radio interface on both the source WTRU and target WTRU to be capable of performing D2D communications. After the target MME receives the confirmation from the target eNB that the D2D radio configuration is complete, it may send a D2D setup complete message of the S10 interface to the source MME to complete the D2D EPS bearer setup.

The default D2D EPS bearer may be established with the above mentioned procedure. If the D2D service needs other dedicated D2D EPS bearers, the source MME may either establish them in a similar way, or may use a D2D default EPS bearer. In later case, the source and target eNBs may coordinate the process through the D2D default EPS bearer in the D2D link.

After the necessary D2D EPS bearer(s) are established, the source MME may send a message to the D2D server to indicate that the direct path between the two WTRUs is available. The D2D server may forward this information to the AS. The AS may start controlling the applications on the two WTRUs that are using the direct path after this point through application layer signaling.

The multicast/broadcast D2D service procedure is a combination/modification of procedures for inter-eNB multicast/broadcast and inter-operator unicast. To initiate an inter-operator multicast/broadcast service, a WTRU may send a service request message to the MME (source MME) containing the temporary service name for the D2D service. The MME may forward the request to the D2D server. The D2D server may determine the MMEs to which the WTRUs involved in this service are attached, and may send a list of these MMEs to the source MME. The source MME may inform all eNBs to coordinate in radio configuration for the D2D link through communication with other MMEs on the list. The coordination between eNBs may also be achieved through the X2 interface at the eNB-to-eNB level, if there is an X2 interface exists between the source eNB and each of the target eNBs.

When a WTRU wants to terminate the D2D service, it may send a Service teardown request to its MME. The MME may forward this request to the D2D server. The D2D server may inform the related entities to remove the D2D EPS bearer for this WTRU. If there is only one WTRU left for the related D2D service, the D2D server may request termination of the D2D service for this WTRU and removal of the EPS bearer related to its service.

Before deregistering a D2D service, a WTRU may perform a service teardown procedure to terminate the service if the service is active on this WTRU.

A WTRU may deregister a service by sending an application deregistration NAS message to the MME with a temporary service identifier for the service it wants to deregister. The MME may send this request to the D2D server with the temporary service identifier and the WTRU's D2D device identifier. The D2D server may remove this application from this WTRU's available service list. If necessary, the D2D server may inform the AS about this change.

An EPS is effectively a connection-oriented transmission network. It may require the establishment of a "virtual" connection between two endpoints, (e.g., a WTRU and a PGW), before any traffic may be sent between them. In EPS, this virtual connection is called an "EPS bearer"; a term that emphasizes the fact that the virtual connection provides a "bearer service", (i.e., a transport service with specific QoS attributes). However, there may be a paradigm shift towards direct communication between two WTRUs and the impacts this may have on the system.

A method and apparatus are described for establishing a WTRU-to-WTRU bearer/end-to-end PDN connection between a first WTRU and a second WTRU. A direct WTRU-to-WTRU bearer or PDN connection may start from one WTRU and end at the other WTRU. This bearer may be a direct bearer between two WTRUs, or there may be some intermediate network nodes in the path of the bearer.

Multiple applications may be running in a WTRU at any time, each one having different QoS requirements. In order to support multiple QoS requirements, different bearers may be set up within EPS, each being associated with a QoS. Bearers may be classified into two categories based on the nature of the QoS they may provide: a minimum guaranteed bit rate (GBR) and non-GBR bearers.

The base station may ensure the necessary QoS for a bearer over the radio interface. Each bearer may have an associated QoS class identifier (QCI) and an allocation and retention priority (ARP). Each QCI may be characterized by priority, packet delay budget and acceptable packet loss rate. QCIs may have been standardized so that vendors may have the same understanding of the underlying service characteristics, and thus provide the corresponding treatment, including queue management, conditioning and policing strategy. The ARP of a bearer may be used for call admission control, and may also govern the prioritization of the bearer for pre-emption with respect to a new bearer establishment request.

Figure 11:
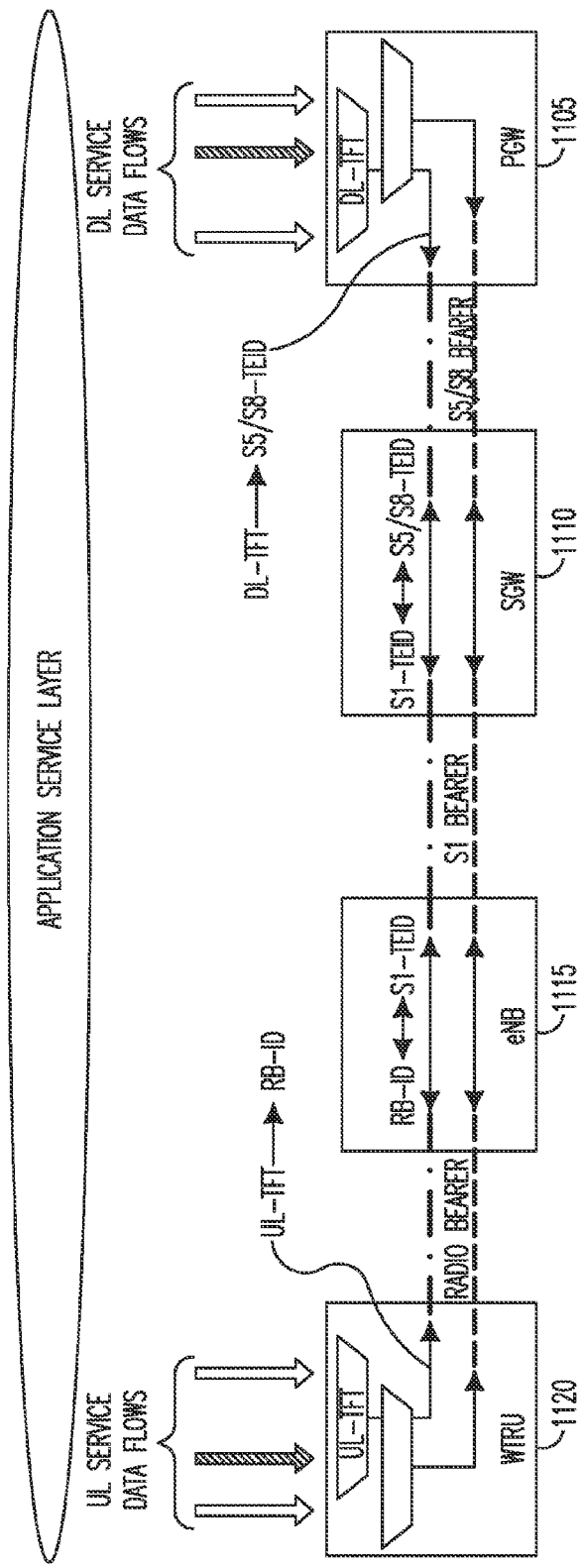
FIG. 11 shows an example of a EPS bearer setup across multiple interfaces.

FIG. 11 shows an example of an EPS bearer setup across multiple interfaces. As shown in FIG. 11, an S5/S8 interface may be established between a PGW 1105 and a SGW 1110, an S1 interface may be established between the SGW 1110 and an eNB (i.e., base station) 1115, and a radio interface may be established between the eNB 1115 and a WTRU 1120. Across each interface, the EPS bearer may be mapped onto a lower layer bearer, each with its own bearer identity. Each node may keep track of the binding between the bearer IDs across its different interfaces.

The eNB 1115 may store a one-to-one mapping between a radio bearer ID and an S1 bearer to create the mapping between the two. IP packets mapped to the same EPS bearer may receive the same bearer-level packet forwarding treatment. Providing different bearer-level QoS flows may require that a separate EPS bearer be established for each QoS flow, and user IP packets filtered into the different EPS bearers. Packet filtering into different bearers may be based on traffic flow templates (TFTs).

Figure 12:
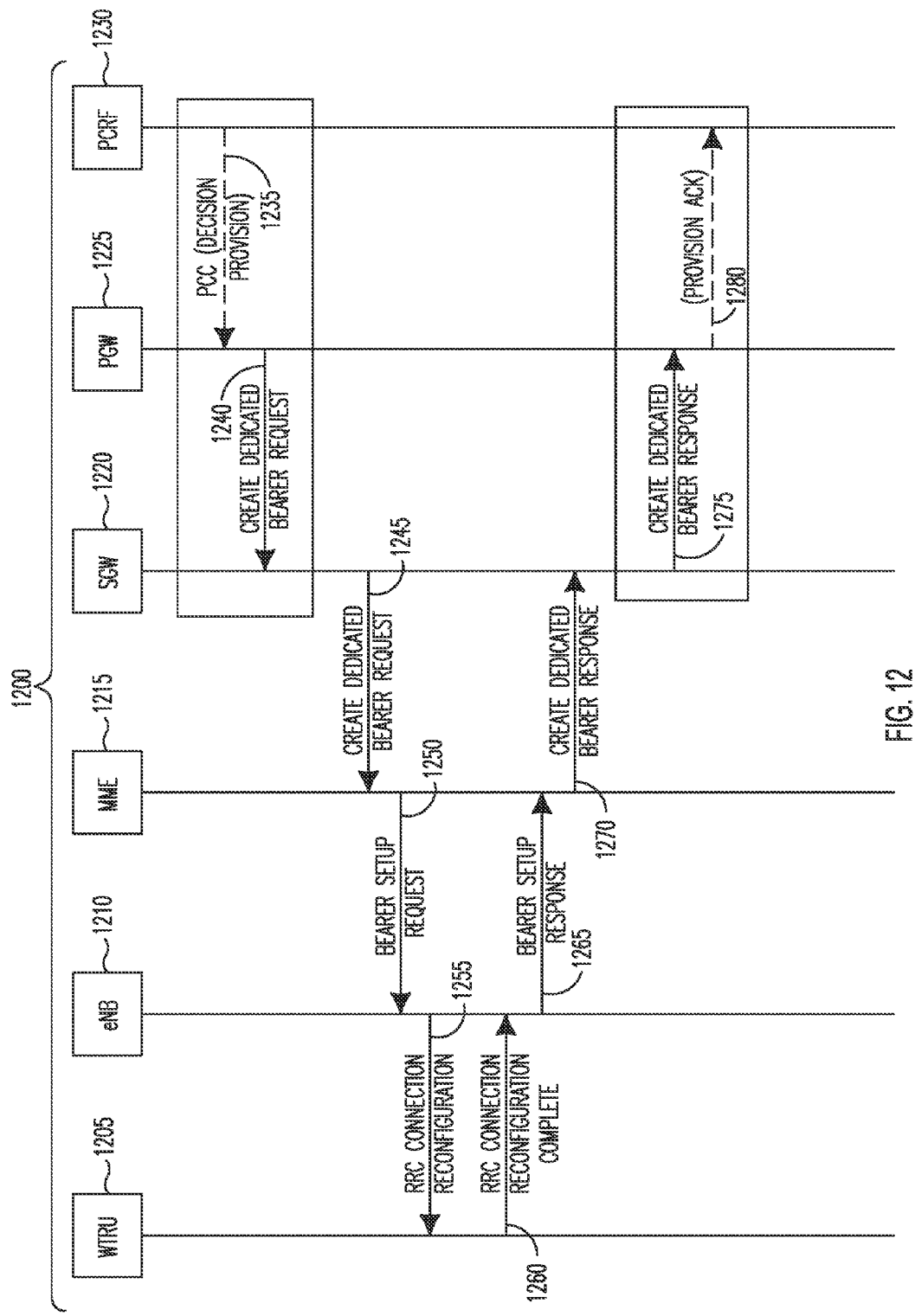
FIG. 12 shows an example signal flow diagram of a bearer establishment procedure.

FIG. 12 shows an example signal flow diagram of a bearer establishment procedure implemented in a wireless communication system 1200 including a WTRU 1205, an eNB 1210, an MME 1215, an SGW 1220, a PGW 1225 and a PCRF 1230. When a bearer is established, the bearers across each of the interfaces discussed above may be established.

The PCRF 1230 may send a policy control and charging (PCC) decision provision message indicating the required QoS for the bearer to the PGW 1225. The PGW 1225 may use this QoS policy to assign the bearer-level QoS parameters. The PGW 1225 may then send a create dedicated bearer request message 1240 including the QoS associated with the bearer and an uplink TFT to be used in the WTRU 1205 to the SGW 1220. The SGW 1220 may forward a create dedicated bearer request message 1245, (including bearer QoS, UL TFT and S1-bearer ID), to the MME 1215. The MME 1215 may then build a set of session management configuration information including the UL TFT and the EPS bearer identity, and include it in a bearer setup request message 1250 to send to the eNB 1210. The session management configuration is non-access stratum (NAS) information and may be sent transparently by the eNB 1210 to the WTRU 1205.

The bearer setup request message 1250 may also provide the QoS of the bearer to the eNB 1210. This information may be used by the eNB 1210 for call admission control, and also may ensure the necessary QoS by appropriate scheduling of the user's IP packets. The eNB 1210 may map the EPS bearer QoS to the radio bearer QoS, and may signal an RRC connection reconfiguration message 1255, (including the radio bearer QoS, session management configuration and EPS radio bearer identity), to the WTRU 1205 to set up the radio bearer. The RRC connection reconfiguration message 1255 may contain all of the configuration parameters for the radio interface. This is for the configuration of Layer 2, (the packet data convergence protocol (PDCP), radio link control (RLC) and medium access control (MAC) parameters), and also the Layer 1 parameters for the WTRU 1205 to initialize the protocol stack. The nodes along the above path, but in the reverse direction from the WTRU 1205 back to the PCRF 1230, may then generate the corresponding response messages, (RRC connection reconfiguration complete message 1260, to confirm that the bearers have been set up correctly correctly).

The PGW 1225 may be responsible for IP address allocation for the WTRU 1205, as well as QoS enforcement and flow-based charging according to rules from the PCRF 1230. The PGW 1225 may be responsible for the filtering of downlink user IP packets into the different QoS-based bearers. This may be performed based on the TFTs. The PGW 1225 may perform QoS enforcement for guaranteed bit rate (GBR) bearers.

As the paradigm changes towards direct communication between two WTRUs, the definition of a new end-to-end bearer concept may need to be modified. This new type of bearer may have multiple system impacts For example, there is a one to one mapping between the radio bearer (RB) and backhaul (RAN and/or CN) bearer, (collectively referred to as an EPS bearer). If one-to-one mapping does not apply any more, NAS layer and NAS procedures may be impacted.

In another example, the new bearer for direct WTRU-to-WTRU communication may only be an RB between the two WTRUs. In this case, methods are described herein for handling the new bearer (RB-only) in the WTRU and the MME without necessarily having S1 and S5 resources being setup. If the new type of bearer may be defined in the lower layers, (PDCP, RLC and the like), then the addressing scheme may need to be modified, since the IP address may not be required anymore.

The direct WTRU-to-WTRU connection may go through a base station or some other entity in the network. In this case, the new end-to-end bearer may be defined between the WTRUs going through the network entities (RAN and/or CN). For this case, some of the user plane resources, (S1-U tunnel), may need to be established while other resources, (S5/S8 tunnels), may not be required. Therefore, the procedure to setup this type of bearer may be defined and how the context of such a bearer is held by different network nodes (e.g., base station, MME, SGW and the like) may be determined.

In a WTRU-to WTRU connection, the PDN-GW may not be in the user path or the PDN-GW is not the end-point of the user plane tunnel. In this WTRU-to-WTRU communication model, the impact with respect to the PDN-GW functionality needs to be addressed. This may include, for example, which/what entity performs the PDN-GW functionality, relevance of the PDN-GW functionality in the context of the WTRU-to-WTRU communication, and need of additional PDN-GW functionality.

Described herein is the establishment of WTRU-to-WTRU bearer for each of the previously described Case 1, Case 2, Case 3 and Case 4.

Figure 13:
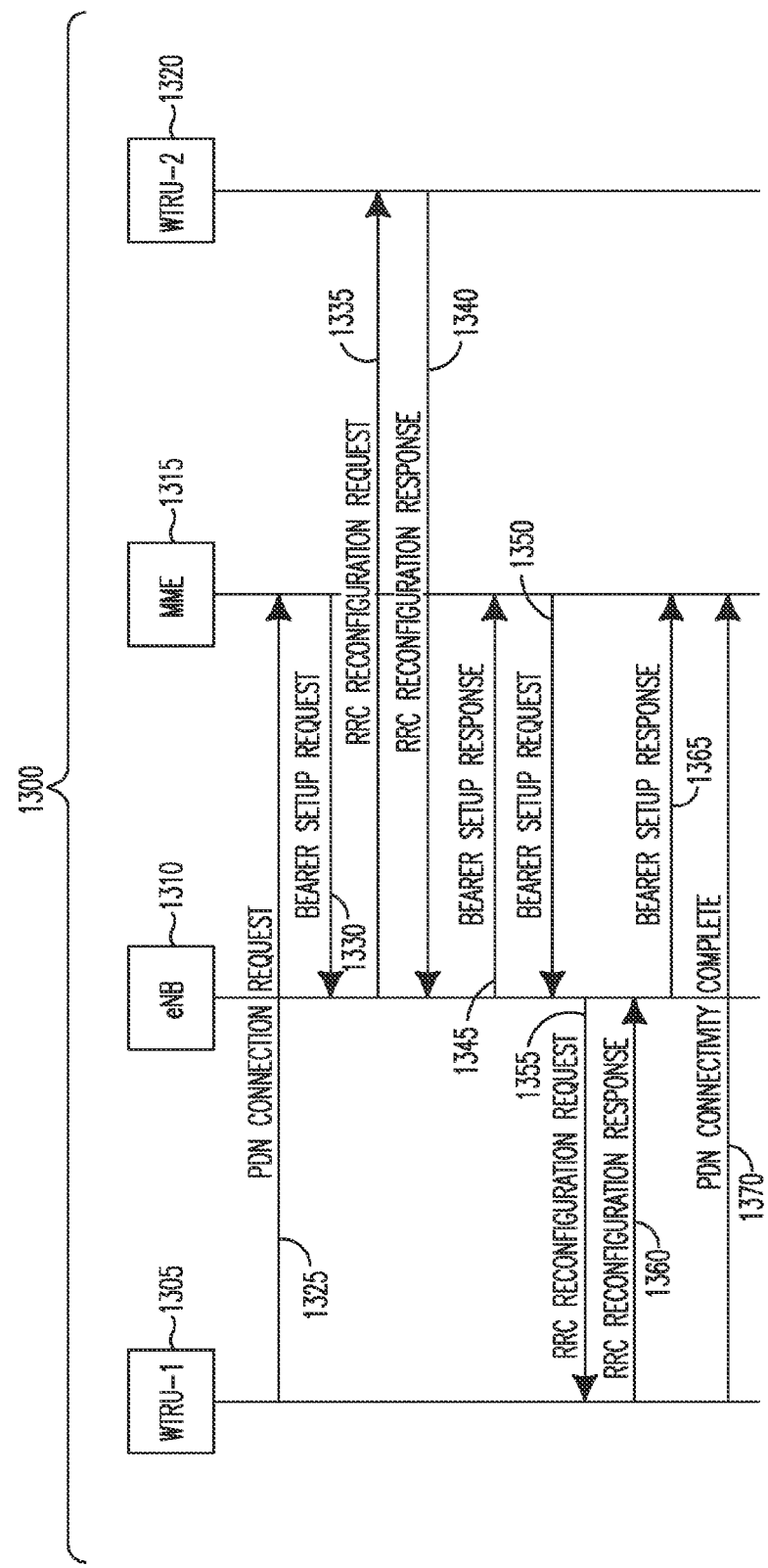
FIG. 13 shows an example signal flow diagram of a packet data network (PDN) connection setup procedure for a WTRU-to-WTRU PDN connection.

FIG. 13 shows an example signal flow diagram of a PDN connection setup procedure for a WTRU-to-WTRU PDN connection for Case 1 implemented in a wireless communication system 1300 including a first WTRU 1305, an eNB 1310, an MME 1315 and a second WTRU 1320. The WTRU may have a default bearer which was established when the WTRU attached to the network.

As shown in FIG. 13, the WTRU-to-WTRU PDN connection in Case 1 may be initiated by WTRU 1305 sending a PDN connection request message 1325 to the MME 1315. This PDN connection request message 1325 may contain additional information elements (IEs) which may assist the MME 1315 in establishing the WTRU-to-WTRU PDN connection. For example, an additional IE may indicate or be a type of PDN connection, (i.e., the WTRU 1305 may want to inform the MME 1315 that this PDN connection is for a direct WTRU-to-WTRU communication). Another example IE may be a list of preferences for the connection path, (i.e., the WTRU 1305 may desire to inform the MME 1315 about the path of the PDN connection that it prefers). For example, the WTRU 1305 may prefer the direct WTRU-to-WTRU path (Case 1), via the eNB 1310 (Case 2) or via an SGW, (not shown), (Case 3). Another example IE may be a name, alias, mobile station international subscriber directory number (MSISDN), access point name (APN), public user identity (PUI), or some other form of identity of WTRU 1320. The requesting WTRU 1305 may indicate to the MME 1315 the identity of the WTRU it desires to establish the PDN connection with. The MME 1315 may use this information to select the correct WTRU in the network for PDN connection establishment.

Referring to FIG. 13, when the MME 1315 receives the PDN connection request 1325 from the WTRU 1305, it may use the information received from the WTRU 1305 to setup the connection. Based on the capabilities of the WTRUs 1305 and 1320 and the network, the MME 1315 may decide to setup a direct WTRU-to-WTRU PDN connection. The MME 1315 may also use the cell location, measurements, subscription information and the like to identify the type of bearer to be setup, (i.e., Case 1, Case 2, Case 3 and the like). The MME 1315 may then send a bearer setup request message 1330 to the eNB 1310, which may include the encapsulated activate bearer NAS message. The bearer setup request message 1330 may also indicate to the eNB 1310 that this bearer setup request message 1330 is for a direct WTRU-to-WTRU connection, so that the eNB 1310 may send the necessary information about setting up the direct connection to WTRU 1320. This information may include the radio network temporary identifier (RNTI) or some other Layer 2 identification of WTRU 1305, scheduling information, QoS parameters to be used by the WTRU 1305 during the lifetime of this bearer, and other layer 2 connection setup parameters included in an RRC reconfiguration request message 1335 sent by the eNB to the WTRU 1320. The bearer setup request message 1330 may not include a tunneling endpoint ID (TEID) and other parameters, (e.g., IP address, port number and the like), required to create an S1 tunnel with the SGW (not shown).

When the WTRU 1320 receives the RRC reconfiguration request message 1335, and an activate bearer NAS message encapsulated in this RRC reconfiguration request message 1335, the WTRU 1320 may accept or reject the RRC reconfiguration request message 1335. The RRC reconfiguration request message 1335 may not include the parameters sent out in the regular case to establish a radio bearer between the WTRU 1320 and the eNB 1310. If the WTRU 1320 accepts the request, it may send an RRC reconfiguration response message 1340, which may include a bearer activation accept message contained in a NAS transport container of the RRC reconfiguration response message 1340.

The WTRU 1320 may also include an assigned IP address for WTRU 1305, (if an IP address is assigned for this PDN connection), in a NAS message contained in the NAS transport container of the RRC reconfiguration response message 1340, since the WTRU 1320 may have some of the functionalities of the PGW (not shown). This NAS message may then be forwarded to the MME 1315 by the eNB 1310 in an S1-AP bearer setup response message 1345. The MME 1315 now may send WTRU 1305 a PDN connection accept message encapsulated in an S1-AP bearer setup request message 1350. The S1-AP bearer setup request message 1350 may trigger the eNB 1310 to send the necessary layer 2 parameters to WTRU 1305 for a direct WTRU-to-WTRU connection as described herein. These parameters and a NAS PDN connection accept message may be sent to the WTRU 1305 in an RRC reconfiguration request message 1355.

The PDN connection accept message may include the IP address assigned for this PDN connection by WTRU 1320, and the QoS parameters including the TFTs and the packet filters to be used for this particular PDN connection. The WTRU 1320 may also include its own IP address, which may be used by the peer-to-peer (P2P)/ProSe application running at WTRU 1305. As shown in FIG. 13, the WTRU 1305 may then send an RRC reconfiguration response message 1360 to the eNB 1310, and consequently the eNB 1310 may send a bearer setup response message 1365 to the MME 1315. To complete the procedure, the WTRU 1305 may then send a PDN connectivity complete message 1370 to the MME 1315 in an uplink direct transfer message, indicating to the MME 1315 that the direct WTRU-to-WTRU PDN connection may have been successfully established between WTRU 1305 and WTRU 1320. Both WTRU 1305 and 1320 may then send data to each other over this direct PDN connection.

When WTRU 1305 sends the PDN connection request message 1325 to the WTRU 1320, the MME 1315 may not proceed with the PDN connection establishment procedure, but instead may send a PDN connection reject message to the WTRU 1305. This may happen due to one or more of the following reasons, which may be included in the reject message: 1) the user of the WTRU 1320 may not have accepted the incoming proximity connection; 2) the WTRU 1320 may no longer be in the proximity or under the coverage of the same eNB/HeNB; or 3) the WTRU 1320 may have reached the maximum number of proximity connections and may not able to accept any new connections.

As an alternative to a WTRU-to-WTRU PDN connection, the direct end-to-end bearer in Case 1 may be achieved using a direct WTRU-to-WTRU dedicated bearer. In this case, both WTRUs 1305 and 1320 may have default bearers, (i.e., a default PDN connection) may already be setup with the PGW, and both WTRUs 1305 and 1320 may have setup a direct dedicated bearer among themselves for the purpose of direct WTRU-to-WTRU communication.

Figure 14:
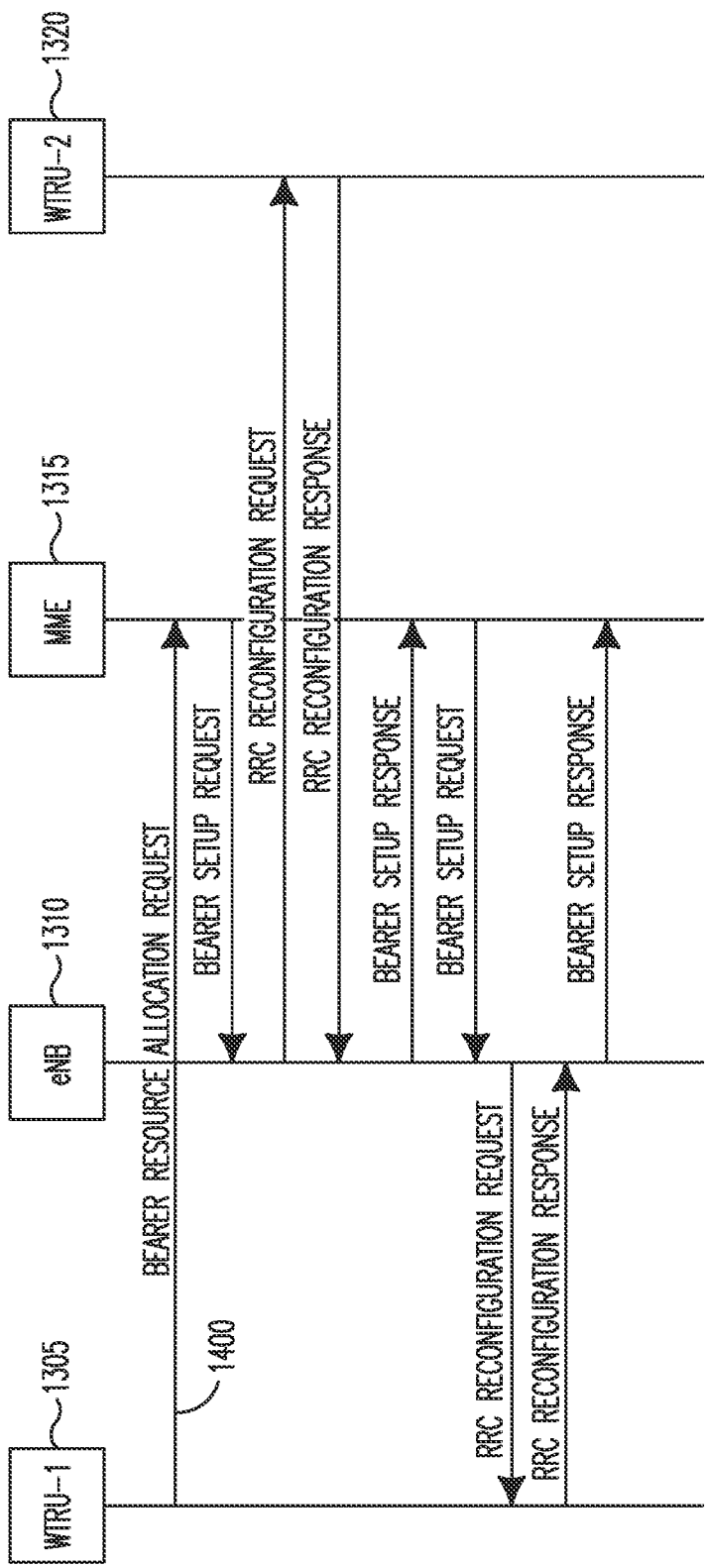
FIG. 14 is an example signal flow diagram of a WTRU-to-WTRU dedicated bearer establishment procedure.

FIG. 14 shows an example signal flow diagram of the connection establishment procedure for the above case, whereby WTRU 1305 may send a bearer resource allocation request NAS message 1400 to the MME 1315 to setup a direct WTRU-to-WTRU dedicated bearer. In the bearer resource allocation request NAS message 1400, the WTRU 1305 may include one or more of additional information elements (IEs) which may be in included in the PDN connection request message as described above. Also, in the bearer resource allocation request NAS message 1400, a linked EPS bearer ID (LBI) may be sent as a blank IE, or with a special reserved code. This may indicate to the MME 1315 that a dedicated bearer may not be linked to the original default bearer. Furthermore, WTRU 1305 may include its IP address in the bearer resource allocation NAS message 1400, which may be sent to WTRU 1320 by the MME 1315, or the MME 1315 may itself send the IP address of WTRU 1305 to WTRU 1320, which may be used by a P2P or ProSe application running on the WTRU 1320. This may be needed since the IP address is not assigned by WTRU 1320. The rest of the procedure shown in FIG. 14 is similar to the procedure shown in FIG. 13.

A procedure for setting up of the end-to-end PDN connection for Case 2 is described herein. Although this procedure is similar to the procedure associated with Case 1, as shown in FIG. 13, the contents of each of the messages may be different from the contents of the messages in Case 1. Referring again to FIG. 13, the PDN connection request message for Case 2 may be similar to the PDN connection request message 1325 for Case 1. In the bearer setup request message 1330, the MME 1315 may inform the eNB 1310 that this bearer may be established for a WTRU-to-WTRU connection via the eNB 1310. This may be achieved by the eNB 1310 sending a mapping ID or by sending an explicit indication in the bearer setup request message 1330. The evolved-radio access bearer (E-RAB) ID may be sent by the MME 1315 in Case 2. The RAB may be established between the eNB 1310 and the WTRU 1305 when the eNB 1310 sends the RRC configuration request message 1335 to the WTRU 1320. The MME 1315 may send the same mapping ID in the bearer setup request message 1350 to the eNB 1310. This may indicate to the eNB 1310 that data from the first RAB may be sent on this RAB being established, instead of sending it to the SGW (not shown). This may be achieved by the MME 1315 sending an explicit indication.

The eNB 1310 may then send the RRC reconfiguration request message 1355 to the WTRU 1305 to establish the RAB between the WTRU 1305 and the eNB 1310. Once the RAB is established, the WTRU 1305 may send the PDN connectivity complete message 1370 to the MME 1315, and the WTRUs 1305 and 1320 may be able to exchange data via this PDN connection.

Described herein is the case where a regular PDN connection or regular EPS bearer is established between each WTRU and a PGW, (i.e., each WTRU has a RAB and corresponding S1 and S5 bearers). However, for direct WTRU-to-WTRU communication, the data may be transferred from one RAB directly to the other RAB at the eNB as depicted in FIG. 3C. This type of PDN connection may be a default PDN connection or a dedicated bearer.

In the case where such a PDN connection is a default PDN connection, one of the WTRUs, (WTRU-1 or WTRU-2), may send a PDN connection request NAS message to the MME, as described herein above with respect to Case 1. Upon receipt of this message, the MME may decide to establish this kind of connection for direct WTRU-to-WTRU communication (Case 2), based on various considerations also described herein above with respect to Case 1. The MME may then send an indication/message to trigger the PDN connection request from the WTRU. The MME may include one or more of these parameters in this message: 1) the QoS parameters, (QCI and the like); 2) an indication that the PDN connection is for direct WTRU-to-WTRU communication; 3) specific access point name (APN) information; 4) IP address of WTRU-1, and the like. WTRU-2 may then request a PDN connection based on these parameters. Alternatively, it may be possible that the MME initiate the PDN connection establishment procedure for WTRU-2 by sending an activate default EPS bearer message, which may include the above parameters to the WTRU.

During the setup process of these PDN connections for WTRU-1 and WTRU-2, or after each of these PDN connections has been established, the MME may send in the bearer setup request message or any other downlink S1-AP message, the mapping ID for each bearer to the eNB. This mapping ID may indicate to the eNB that each of these bearers have been established for the direct WTRU-to-WTRU communication, and may assist the eNB to send the data transmitted on the RAB of WTRU-1 to the RAB of WTRU-2, and vice versa. The packets may therefore not go through the S1 and S5 tunnels.

The direct WTRU-to-WTRU communication via the eNB (Case 3) may also be achieved with dedicated bearer establishment. The WTRU-1 may send a dedicated bearer activation request to the MME with an indication that this request is for direct WTRU-to-WTRU communication. This request may include some or all of the parameters in the PDN connection request as described above. Alternatively, the WTRU may send a message to the MME to indicate its desire for a direct WTRU-to-WTRU connection with the particular WTRU, and the MME may respond by initiating a dedicated bearer establishment procedure at each WTRU. The message that the WTRU sends to the MME may include some form of identification of the other WTRU, (e.g., an IP address, discovery alias and the like).

During the establishment of each of these dedicated bearers, the MME may send the mapping ID to the eNB so that the eNB may map the packets coming on the RAB from WTRU-1 to the RAB for WTRU-2, as described herein, so that the packets do not have to go through S1 and S5 tunnels.

When each dedicated bearer is established, the QCI of the default bearer at the WTRU's NAS layer, and the corresponding dedicated bearer established for direct WTRU-to-WTRU communication, may be the same. This may cause some confusion at the WTRUs NAS layer. This confusion however may be avoided by properly setting up packet filters and TFTs in both the uplink and downlink directions for both of the WTRUs. The packet filters may need to be configured with the correct IP address of each WTRU and/or a specific port number to avoid such confusion.

In another example of Case 3, the WTRU may have a proximity connection with more than one WTRU. In such a case, the base station may need to check the destination address, or some other destination identity of the packet, and send it to the appropriate RAB so that the packet may be routed to the correct destination WTRU. The base station in this case may have the ability to check the destination address of the packet by employing deep packet inspection or some other method to check the destination address. It may be possible to use some layer 2 or layer 3 addressing scheme such as, for example, an RNTI or some specific proximity address. In this case, when the base station finds such a destination address in the layer 2 or layer 3 message, it may use this address to route the packet to the correct destination.

Described herein is the end-to-end bearer for direct WTRU-to-WTRU communication that goes through an SGW 330 as shown in FIG. 3D. This bearer establishment procedure may be initiated by any of the WTRUs involved, (i.e., WTRU-1 or WTRU-2).

Figure 15:
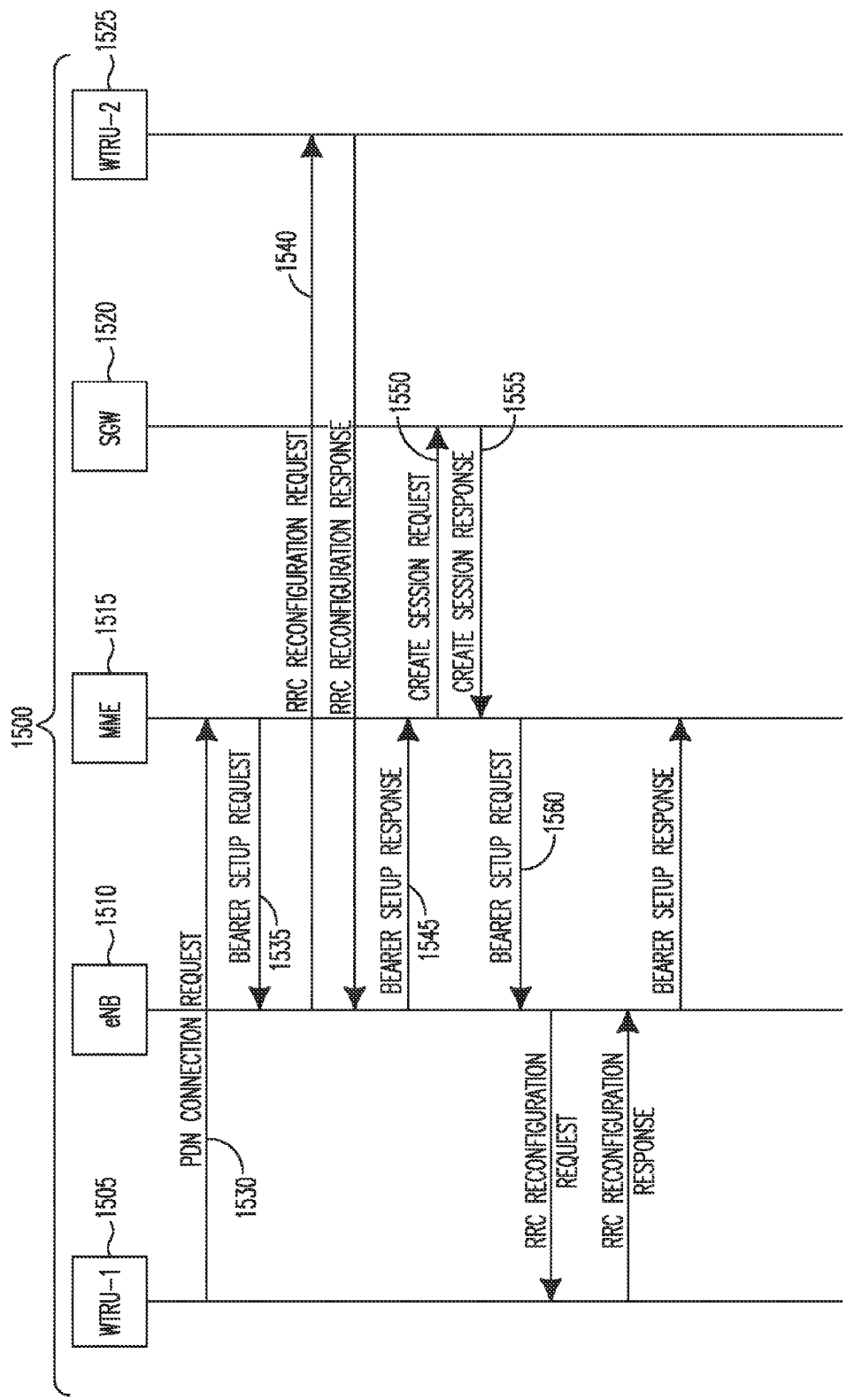
FIG. 15 is an example signal flow diagram of a PDN connection setup procedure for the SGW case.

FIG. 15 shows an example signal flow diagram where the WTRU-1 initiates the PDN connection request for Case 4 implemented in a wireless communication system 1500 including a first WTRU 1505, an eNB 1510, an MME 1515, an SGW 1520 and a second WTRU 1525. The WTRU 1505 may send a PDN connection request message 1530. Upon receipt of the PDN connection request message 1530, the MME 1515 may decide to establish this bearer via the SGW 1520. The MME 1515 may then send a bearer setup request message 1535 to the eNB 1510, which may include the IE as described herein above, and may additionally include other parameters to setup the user plane tunnel with the SGW 1520. For example, the bearer setup request message 1535 may include the TEID, IP address, port number and the like. The eNB 1510 may then create a radio bearer for sending the RRC reconfiguration request message 1540.

The WTRU 1525 may also act as a PGW in this case, and assign an IP address to WTRU 1505 for this PDN connection as described herein. This IP address may be sent to the MME 1515 in the bearer setup response message 1545. The bearer setup response message 1545 may also include parameters from the eNB 1510 to setup a user plane tunnel with the SGW 1520.

The MME 1515 may then proceed to setup the S1-U tunnel by sending a create session request message 1550 to the SGW 1520. The MME 1515 may send two separate create session request messages 1550 for each S1-U tunnel between the SGW 1520 and the eNB 1510, or the MME 1515 may just send one create session request message 1550 to the eNB 1510. In the later case, the MME 1515 may indicate to the SGW 1520 that create session request message 1550 may establish two S1-U tunnels, and may include the parameters needed for the establishment of each S1-U tunnel. Also, in either case, the create session request message 1550 may be different from the one sent to the SGW 1520 in establishing a regular EPS bearer.

For example, the create session request message 1550 sent by the MME 1515 may include a mapping ID, indication or something similar to indicate to the SGW 1520 that this tunnel may be established for direct WTRU-to-WTRU communication, and any data arriving at the SGW 1520 from this tunnel may be routed to the corresponding S1-U tunnel, and not to the S5 tunnel. The MME 1515 may also indicate to the SGW 1520 to not send a create session request message to the PGW, (i.e., to create an S5 tunnel).

In another example, the create session request message 1550 may include parameters of the corresponding S1 tunnels, (S1-U bearer ID of the corresponding S1-U tunnel).

In another example, the MME 1515 may assign a bearer ID of this WTRU-to-WTRU end-to-end bearer, and send it to the SGW 1520 in the create session request message 1550. This bearer ID may be the same in both create session request messages 1550.

In another example, the create session request message 1550 may not include the PGW or PDN address.

When the MME 1515 receives a create session response message 1555 from the SGW 1520, the MME 1515 may then send a bearer setup request message 1560 to the eNB 1510, which may include a PDN connectivity accept message for the WTRU 1505. This may trigger the establishment of a RAB between the eNB 1510 and the WTRU 1505. Also, when the MME 1515 receives the create session response message 1555 from the SGW 1520, the MME 1515 may send S1-U user plane tunnel parameters to the eNB 1510 serving the WTRU 1525 if it already has not done so.

Furthermore, as described herein, it may be possible to setup a dedicated bearer for this type of WTRU-to-WTRU connection. This procedure may be similar with the changes in the messages as described above with respect to this case. In addition, a case similar to case 3 may be possible in this case where the packets are routed by the SGW 1520.

Direct device-to-device communications are gaining importance lately. This requires a change in the current 3GPP architecture and call management procedures. Procedures for call management are required for both local-path and dual-radio access technology (RAT) cases. Inter-eNB, inter-MME, and inter-PLMN cases also need to be supported.

In order for D2D bearers to be managed, procedures for call management need to be developed. Several embodiments are described hereafter.

Call management procedures are described herein for local-path and dual-RAT cases related to D2D configuration and bearer setup, D2D bearer(s) reconfiguration, and D2D bearer(s) teardown. Also described herein are intra-PLMN and inter-PLMN cases including intra-eNB, inter-eNB, and inter-MME cases both for dual-RAT and local-path. Procedural details as well as corresponding updates related to the RRC and NAS messages and the interfaces (S1-AP interface updates, X2 interface updates, and S10 interface updates) are also described. System information updates for enabling D2D are also described.

Prior to D2D bearer call establishment, two D2D-capable WTRUs may be under the network coverage and may have registered with the network, and a NAS signaling connection and an RRC connection setup may have been completed by each WTRU individually prior to the D2D bearer setup.

It should be noted that the procedures described below will be explained with reference to 3GPP LTE and IEEE 802.11, but these procedures may be applicable to any wireless communication technologies including, but not limited to, WCDMA, IEEE 802.16, CDMA2000, or the like.

Embodiments for call management for dual-RAT are disclosed hereafter.

In this case, the D2D link is based on technology other than 3GPP RATs. For convenience, this other RAT will be referred to be 802.11 based, but any other techniques may be employed equally well as the other RAT (e.g., Bluetooth, or the like). For dual-RAT, the procedures below apply for D2D direct path and cover intra-PLMN and inter-PLMN cases including intra-eNB, inter-eNB, and inter-MME cases.

Several discovery and communication mechanisms for dual-RAT cases are presented below. The discovery mechanisms (both device discovery and service discovery) may be independent of the communication procedures between the two D2D capable WTRUs. It should be noted that any combination of the below discovery and communication mechanisms are possible.

In cellular-based device discovery, D2D device discovery may first be performed on the cellular RAT. The device discovery on cellular may trigger either service discovery for communication on an 802.11 RAT-based D2D link or subsequent device discovery on an 802.11 RAT. The D2D device discovery on the cellular RAT may be limited to information that is derived from location information, (based on a LTE positioning protocol, GPS, or otherwise), cell identifiers, sector identifiers, and the like.

In this case, the 802.11 RAT radio may not even be triggered on before the cellular RAT performs the D2D device discovery and identifies that an 802.11 RAT-based D2D link may be feasible. The D2D capable WTRU may provide the cellular RAT-based D2D device discovery result to the network. The network entity (or entities) may then assist the D2D-capable WTRU in translating the device discovery result to service discovery. The EPC entities that may be involved include, but not limited to an MME, a D2D server, an HSS, an access network discovery and selection function (ANDSF), a policy control and rules function (PCRF), and the like. Subsequently, the 802.11 RAT may perform 802.11-based device discovery to augment the findings from the D2D discovery on cellular RAT. In another embodiment, a service discovery procedure for communication on the 802.11 RAT may be triggered based on the D2D device discovery performed on the cellular RAT.

The network may provide filters to the D2D-capable WTRU based on its current policy or privacy aspects and which users the D2D-capable WTRU is allowed to be aware of.

In another embodiment, the device discovery may be performed with a unique other RAT D2D identifier. The 802.11 RAT may perform device discovery without triggering from the 3GPP (LTE) network. There may be a unique device identifier on the other RAT (e.g., 802.11 MAC address) that is unique and cannot be tampered with. This unique device identifier may be known to the 3GPP network. This unique identifier may be registered either when the user buys the device or is communicated to the network as part of other RAT information from the D2D-capable WTRU.

The D2D-capable WTRU connects to the 3GPP network if it is not already connected. The D2D-capable WTRU may be authenticated based on the universal subscriber identity module (USIM) information similar to the baseline procedures of LTE Release 8 or later releases. In one embodiment, the authentication procedures of the other RAT may "ride on" authentication provided by the cellular network.

The D2D-capable WTRU may provide the device discovery result to the network. The network entity (or entities) may then assist the D2D-capable WTRU in translating the device discovery result to service discovery. The EPC entities that may be involved include, but not limited to an MME, a D2D server, an HSS, an ANDSF, a PCRF, and the like. Since there is a unique device identifier on the other RAT that is available at the network for each dual-RAT D2D-capable WTRU, the network may translate the D2D device identifier to a service identifier.

The network may provide filters to the D2D-capable WTRU based on its current policy or privacy aspects and which users the D2D capable WTRU is allowed to be aware of.

In another embodiment, a D2D identifier for other RAT may be allocated by the cellular network. The D2D-capable WTRU connects to the 3GPP network. As part of the registration/attach or subsequent NAS procedures, the D2D-capable WTRU may indicate to the network that it is capable of D2D operations in other RAT. It may also indicate that it requires the cellular network to allocate a unique D2D device identifier. The network may then allocate a unique D2D device identifier for the other RAT. The EPC entities that may be involved include, but not limited to an MME, a D2D server, an HSS, an ANDSF, a PCRF, and the like.

The other RAT uses this unique D2D identifier allocated as part of its D2D device discovery procedure. The device discovery messages on the other RAT may be seen as "higher layer" messages for discovery. Once device discovery is complete, the D2D-capable WTRU may provide the device discovery result to the network. The network entity (or entities) may then assist the D2D-capable WTRU in translating the device discovery result to service discovery as network is fully aware of mapping between the other RAT D2D device identifiers and service level mapping.

The network may provide filters to the D2D-capable WTRU based on its current policy or privacy aspects and which users the D2D capable WTRU is allowed to be aware of.

In another embodiment, the device discovery may be triggered by the cellular network. For example, an 802.11 RAT D2D-capable WTRU-1 is connected to an 802.11 RAT D2D capable WTRU-2 via a baseline infrastructure mode. The cellular network detects that D2D on other RAT is possible for data communication between WTRU-1 and WTRU-2. This may be based on, but not limited to, location information, measurements, cell ID, sector ID, and the like. The cellular network may request WTRU-1 and WTRU-2 to turn on their other RAT radios and start D2D device discovery on other RAT. Other RAT performs device discovery either based on a unique D2D device identifier or using a D2D device identifier that is allocated by the cellular network on 802.11 RAT. The device discovery results may be translated into service discovery.

Two data plane protocol alternatives are considered for communication using an 802.11 RAT-based D2D link.

In one embodiment, an IP may be located above the 802.11 MAC/PHY. In this embodiment, IP packets are carried directly over 802.11 based MAC and PHY protocols. The cellular network may assist with configuration of the other RAT-based D2D links. This may be enabled by using NAS or RRC messages.

The assistance from the cellular network for 802.11 RAT call management of D2D WTRUs may reduce the configuration time and resources required for coordination for the 802.11-based D2D link. For example, if two tri-mode 802.11 RAT-capable D2D WTRUs are involved, the cellular network may indicate to these WTRUs via the corresponding eNB-to-WTRU links to use 802.11n and may also indicate the channel(s) and other related configuration parameters to use.

The cellular network may provide information that the D2D-capable WTRUs involved in the call may derive keys to be used for communication over the 802.11 RAT-based D2D direct-path. Alternatively, the 802.11-based security may also be utilized. The cellular network may assist in allocating a new IP address for the D2D 802.11 RAT-based direct-path. Alternatively, separate logical interfaces may be defined for the D2D link(s) and the infrastructure link(s). The logical interface definitions may be extended for separate D2D and infrastructure links. These may be applied to the cases where the WTRU may have D2D direct-path, D2D local-path, and infrastructure links.

In another embodiment, the cellular radio link control (RLC) and packet data convergence protocol (PDCP) layers may be located above the 802.11 MAC/PHY. The cellular RLC/PDCP protocol data units (PDUs) are carried directly over the 802.11 based MAC and PHY protocols. The cellular network may configure RLC and/or PDCP layers on top of the 802.11 MAC/PHY and may assist with configuration of the 802.11-based D2D links. This may be enabled by using NAS or RRC messages.

If the PDCP layer is configured, the cellular layer may provide security for the 802.11 RAT D2D direct-path transmissions similar to baseline. New security keys may be derived or defined, which may be different from the keys used for the infrastructure links.

In this embodiment, there is no need for a new IP address allocation for the D2D links. An anchor point for the IP address allocation may be a PGW and this may help with mobility when the D2D bearer(s) are moved to the infrastructure mode.

Figure 16A:
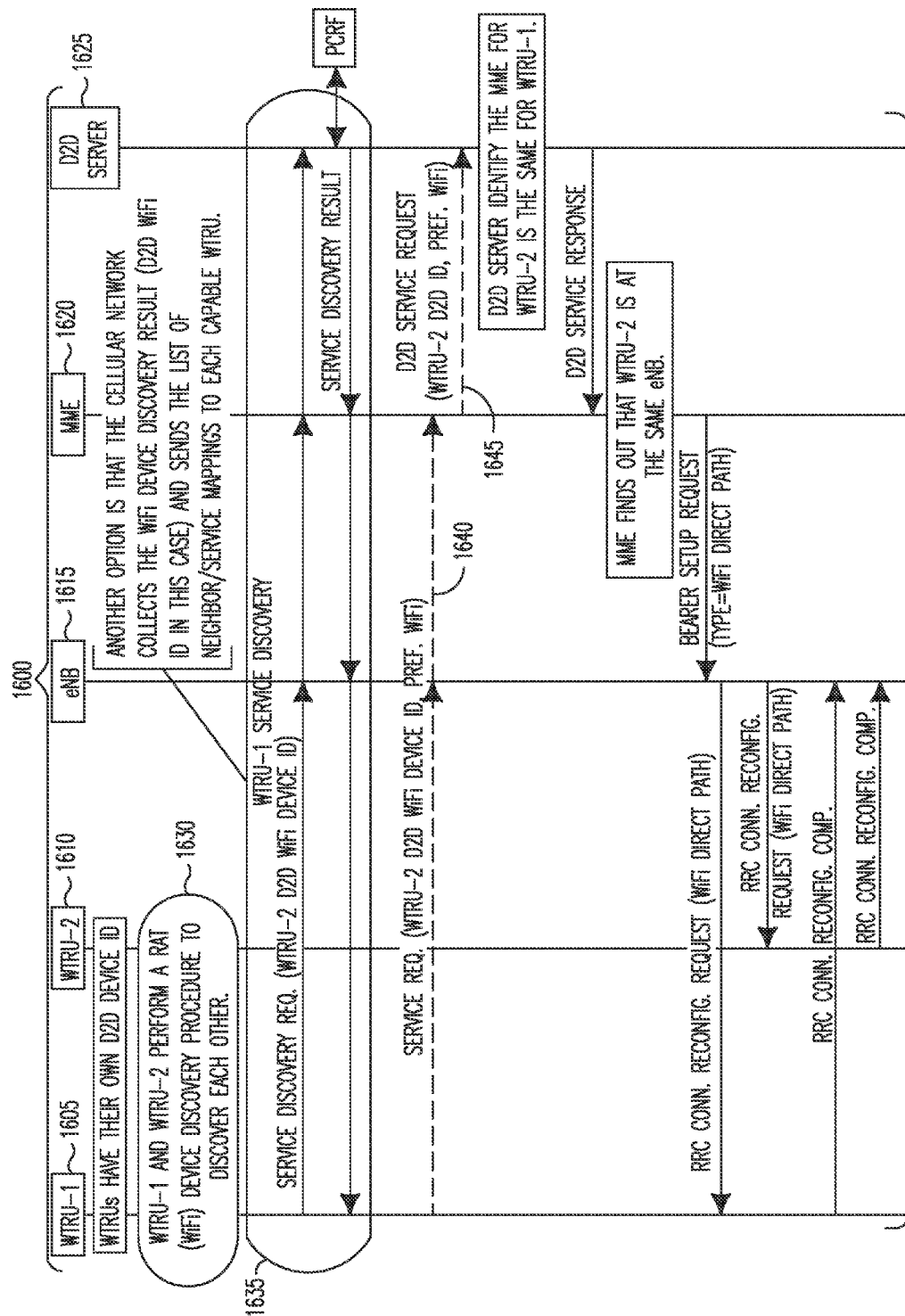
FIGS. 16A and 16B, taken together, are a signal flow diagram of an example service request procedure for intra-eNB, intraMME dual-radio access technology (RAT) with unique D2D identifiers.
Figure 16B:
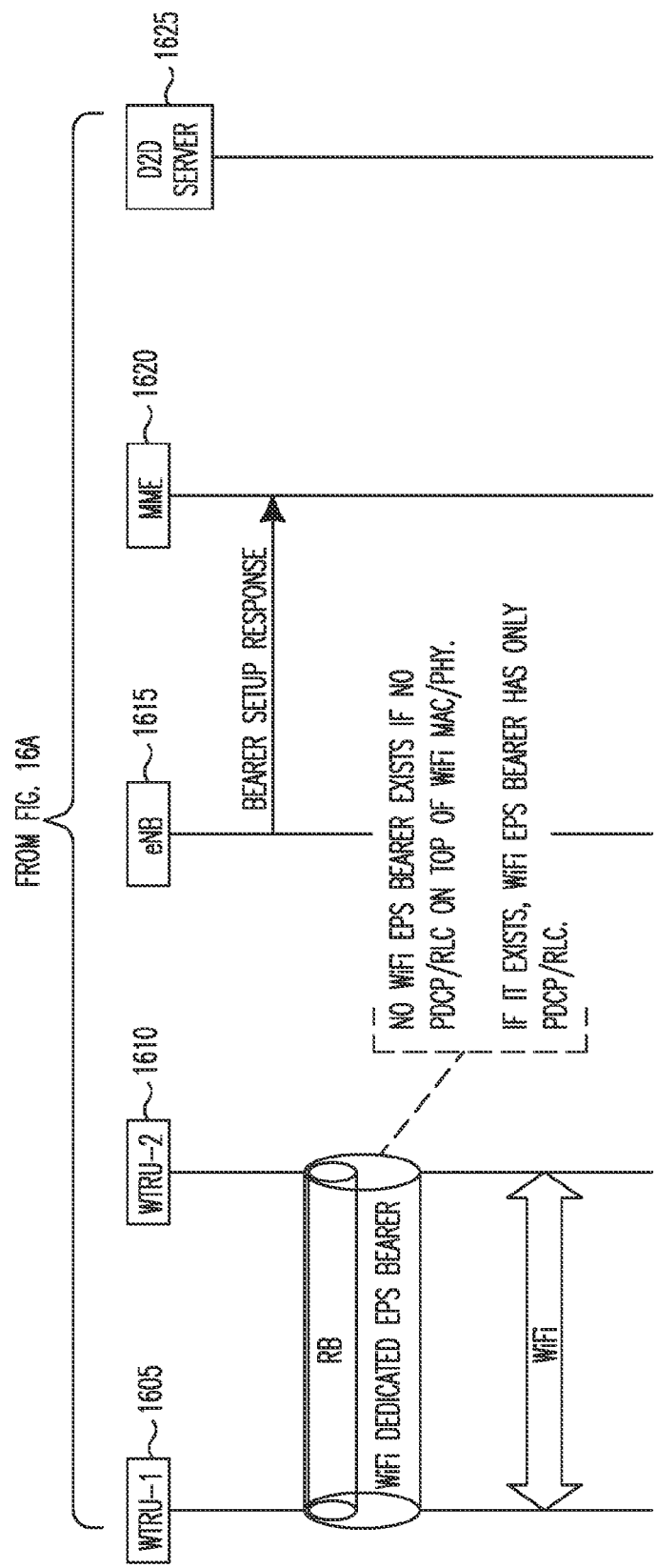

FIGS. 16A and 16B, taken together, are a signal flow diagram of an example procedure for service request procedure for intra-eNB, intra-MME dual-RAT with unique D2D identifiers in a wireless communication system 1600 including a first WTRU 1605, a second WTRU 1610, an eNB 1615, an MME 1620 and a D2D server 1625. In this example, both WTRUs 1605 and 1610 may be D2D 802.11 RAT capable and may be registered in the network. Both WTRUs 1605 and 1610 may have their own unique D2D identifier on the RAT, and perform device and service discovery (1630, 1635). Once the device discovery (1630) is complete, the associated applications may be aware of service discovery and may trigger service request procedures for D2D bearer establishment. The example in FIGS. 16A and 16B depicts cellular RLC and/or PDCP layers configured on top of the 802.11 RAT (WiFi) MAC/PHY.

As shown in FIG. 16A, if WTRU 1605 desires to have a D2D service with WTRU 1610 using an 802.11 RAT, the WTRU 1605 may send a service request 1640 to the MME 1620 through the eNB 1615 with the D2D device ID of WTRU 1610 and a temporary service name. The MME 1620 may forward the service request 1645 to the D2D server 1625. The D2D server 1625 may verify the request with the PCRF (not shown) and may provide any required policy information.

As shown in FIG. 16B, the MME 1620 may inform the eNB 1615 to perform radio configuration to setup a dedicated D2D EPS bearer 1650 between the WTRUs 1605 and 1610. The eNB 1615 may use a radio bearer (RB) reconfiguration procedure to configure the RLC and/or PDCP layers for WTRUs 1605 and 1610. The MME 1620 or the eNB 1615 may also assist in configuration of the 802.11-based MAC and PHY protocols.

Figure 17:
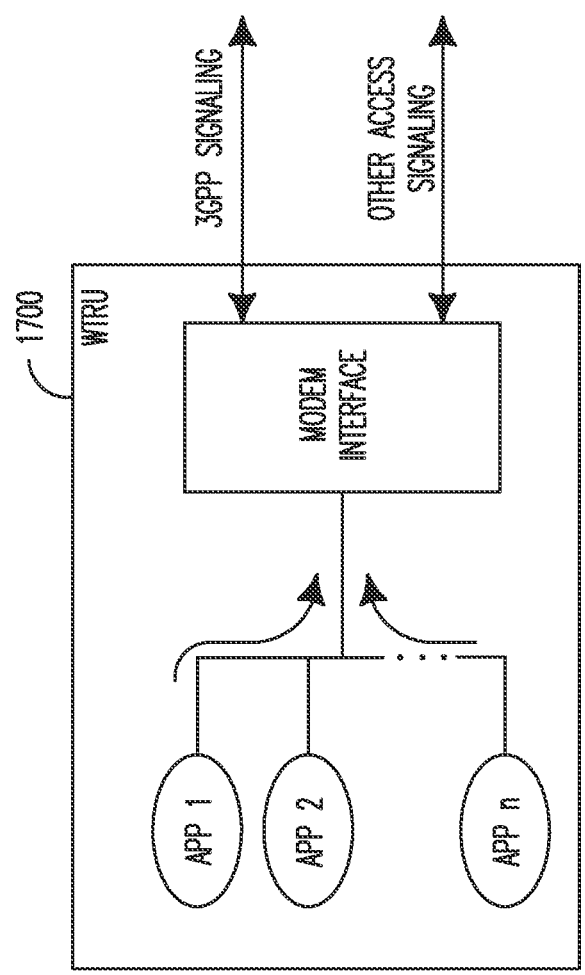
FIG. 17 shows an example of a WTRU initiating a request for proximity services.

FIG. 17 shows an example of a WTRU 1700 initiating a request for proximity services. The establishment of a proximity service bearer may be initiated by the WTRU 1700 or a network. The WTRU 1700 may request resources with specific quality of service (QoS) requirements along with at least one of a proximity feature ID or a list of buddies for which the WTRU 1700 may be interested about establishing an optimized proximity connection (OPC), or a request to determine buddy proximity. The WTRU 1700 may use a value broadcast by surrounding WTRUs and/or it may explicitly use identifiers provided by the application function, to send the appropriate information element (IE) to the MME. The WTRU 1700 may request resources with specific QoS requirements along with an indication of whether a D2D bearer may share the same QoS class identifier (QCI) characteristics, an indication of whether the originating WTRU and termination WTRU may have the same QoS parameters, and/or an indication of whether the requesting WTRU may assume temporary sponsoring attributes.

The WTRU 1700 may establish the setting up of network and radio resources. This may be implemented through a bearer resource allocation request or a bearer resource modification. The network may be able to accept or reject whether a proximity procedure may be triggered by a particular WTRU. When a WTRU requests a network resource using the mechanisms described herein, the network may determine what may be its most viable procedure, based on the requirements of a particular application, to establish an optimized connection and pass location information.

An application may request resources that warrant establishment of proximity bearers. For example, an application may request services or actions over an Rx interface that may prompt the policy and charging rules function (PCRF) to set rules that trigger the establishment of a bearer, or a bearer that may be used to support an OPC. The services or actions that may trigger the establishment of bearer supporting OPC are described herein.

Alternatively, an application that provides proximity services may request the establishment of a bearer to support an OPC, (e.g., over the Rx interface). Possible reasons, although not a complete list of reasons, as to why an application may request resources to support an OPC are described herein. Alternatively, an application that requires proximity services may request the proximity service from a proximity server or a central proximity function, which in turn may use any of the previously described methods to establish an end-to-end proximity bearer. Alternatively, an application within a WTRU may request resources that may require the establishment of a bearer used to support an OPC.

Figure 18:
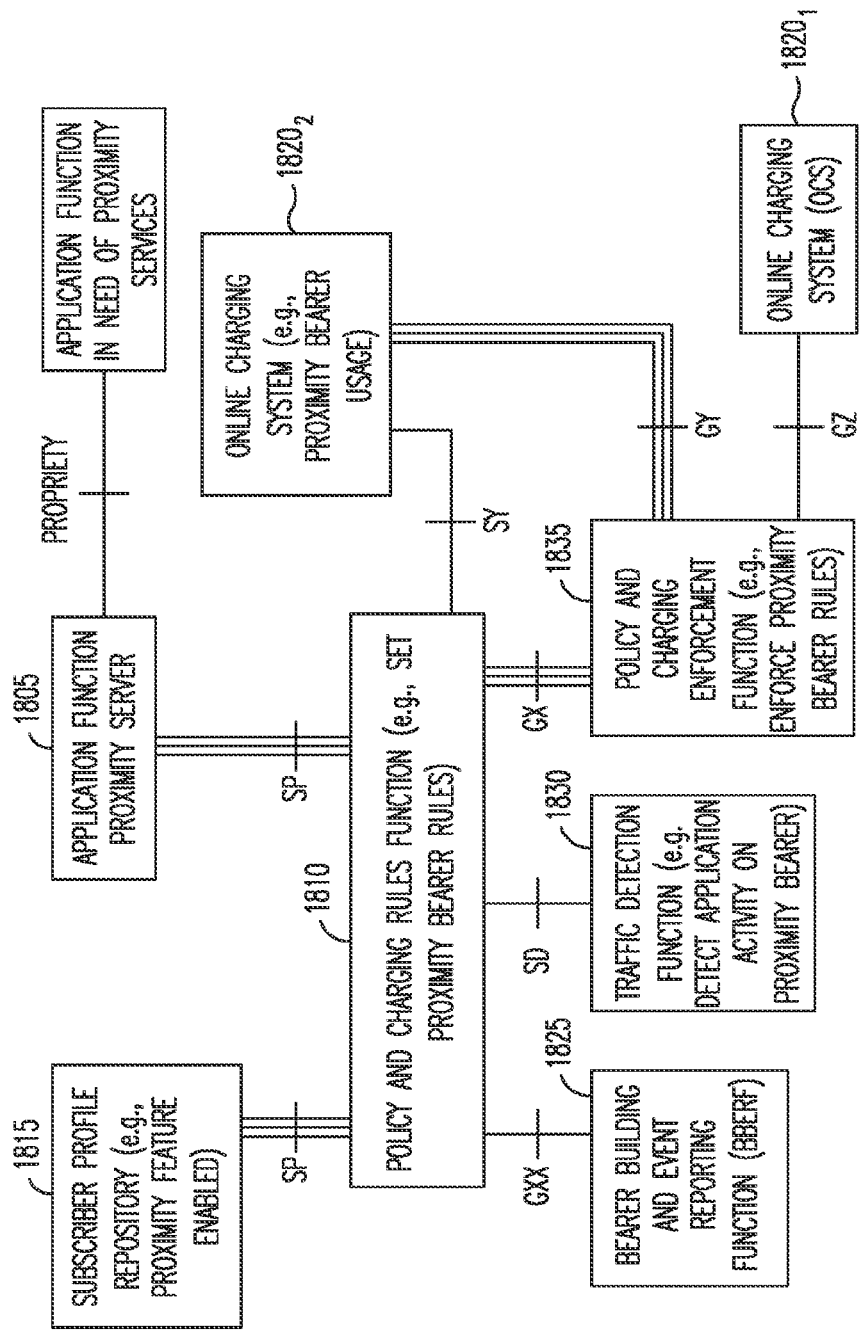
FIG. 18 shows a policy and charging control model for proximity services.

FIG. 18 shows a policy and charging control model 1800 for proximity services, whereby a PCRF-based proximity-driven bearer may be established. An application function (AF) 1805, (e.g., proximity server), may provide a PCRF 1810 with the characteristics and/or requirements that bearers must comply with to support the needs of data flows transported over these bearers. Thus, the AF 1805 may explicitly indicate to the PCRF 1810 "supported features" or the "application identity" of an application that may require proximity support. This may be implemented using existing attribute value parameters (AVPs) already included in an authentication and authorization request (AAR) diameter message. The PCRF 1810 may use policies to "bind" the "application identity" or the "supported feature" with specific QoS and/or policy and charging control (PCC) rules and/or a single proximity service ID.

The policy and charging control model 1800 may further include a subscriber profile repository (SPR) 1815, online charging systems (OCS) 18201 and 18202, a bearer building and event reporting function (BBERF) 1825, a traffic detection function 1830 and a policy charging enforcement function (PCEF) 1835.

The single proximity service ID may be used to associate any other member that subscribes to an application that may require proximity services. These members may be either part of a group or individual WTRU that may be connected through an OPC, which is the connection which takes shorter path for WTRU-to-WTRU communication, (e.g., a proximity connection through an eNB in Case 3).

The proximity service ID may be derived from a group ID or an application ID associated to applications or services that require proximity support. A single proximity service ID (SPSI) may be used to manage the connection of at least two WTRUs that may associate to a single TFT, leaving the decision as to when and/or where to establish this connection entirely to the 3GPP network. The PCRF, through the relevant PGW, may pass the single proximity service ID to the MME. The MME may use this identity to determine if there are WTRUs supporting proximity services that may be connected using OPCs. If the MME identifies two or more WTRUs having the same proximity service ID, the MME may determine whether these WTRUs may be connected through an OPC. OPCs may be defined at different levels, including same PGW, same LGW, same eNB/HeNB/HeNB, or any other node that may support direct routing over the same proximity bearer ID.

Besides using the SPSI, the MME may use several other criterions to determine if an OPC may be allowed/executed, including a modified WTRU proximity indication signaling the proximity of a candidate OPC WTRU.

In addition, the node ID of a candidate node executing the OPC may be used as long as the MME is able to determine that two or more WTRUs are connected to a candidate OPC node. The MME may obtain the candidate OPC node ID from the WTRU bearer context, and this information may be transferred during a handover procedure, including inter and intra MME handover. For example, the bearer context may be transferred in the "handover required" message and the "forward relocation request" message. Alternatively, the global eNB ID may be used to identify whether two or more proximity-enabled WTRUs are connected to the same eNB. Furthermore, the closed subscriber group (CSG) ID and a local H(e)NB network (LHN) ID may be used.

Figure 19:
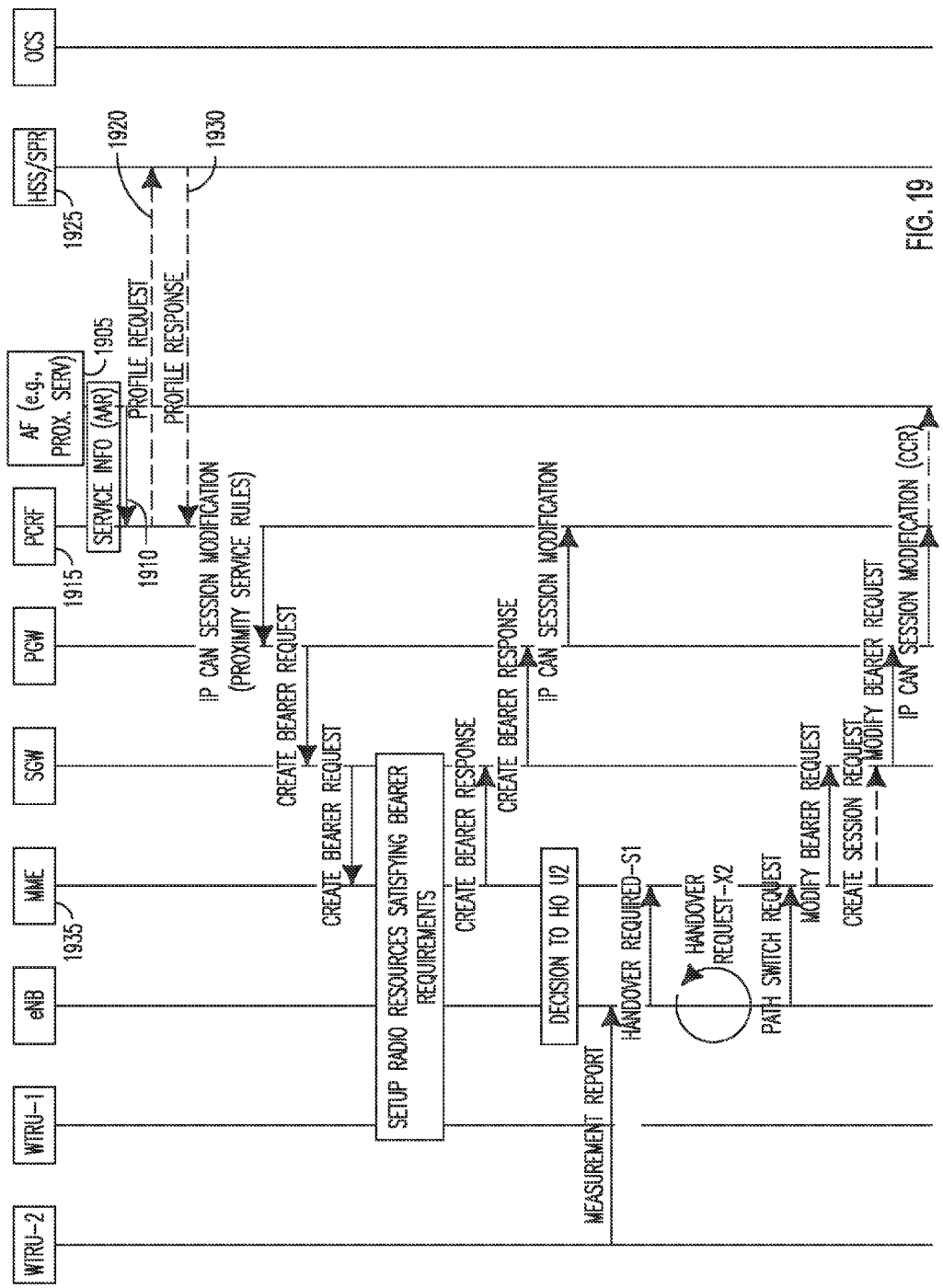
FIG. 19 shows a signal flow diagram of a network-based proximity trigger procedure.

FIG. 19 shows a signal flow diagram of a network-based proximity trigger procedure. An application function (AF) 1905, possibly acting as a proximity server, may send a proximity service request 1910 to a PCRF 1915. The proximity service request 1910 may have been triggered by a separate AF requesting proximity services from the AF 1905. The service information may provide, amongst other things, the application ID or feature ID and a single proximity service ID. The PCRF 1915 may send a subscriber profile request message 1920 to a home subscriber server (HSS)/subscriber profile repository (SPR) 1925, passing the application ID/feature ID. The HSS/SPR 1925 may use this information to retrieve the list of subscriber that maybe defined by the subscriber as potential proximity buddies. The list may be provided in a profile response message 1930 sent by the HSS/SPR 1925. The proximity buddy list, along with the application/features ID, may be passed to an MME 1935 through the message chain. The MME 1935 may use this information to determine whether an OPC may be established.

Procedures and the effect on the WTRU-to-WTRU bearer when one or both of the WTRUs move to Idle mode are described herein. Furthermore, a paging procedure is described that may cause one of the WTRUs to transition to connected mode when another WTRU has data to be sent to in idle mode. The procedures and methods may be different, depending on the WTRU-to-WTRU bearer case described herein.

In Case 1 shown in FIG. 3A, when one of the WTRUs goes to idle mode, the direct WTRU-to-WTRU bearer may be torn down (i.e., the radio bearer may be released). However, the context of the bearer may remain in both of the WTRUs. The bearer context may be made up of radio bearer context or a full or partial EPS bearer context. Therefore, when both WTRUs return to connected mode, the same bearer may be reestablished.

In the example shown in FIG. 3A, if one of the WTRUs is in idle mode, the RAB between WTRU-1 and WTRU-2 may be torn down. However, WTRU-2 may have some peer data to be sent to WTRU-1, but since the direct WTRU-to-WTRU bearer is torn down, WTRU-2 may therefore know that WTRU-1 is in idle mode and therefore WTRU-2 may send a first packet via a default PDN connection or default bearer towards a PDN connection. Since this first packet's destination IP address may be the address of WTRU-1, it may be routed to the PGW, and eventually the SGW of WTRU-1. This may trigger the regular paging by the MME to transition the WTRU-1 to connected mode. Once the WTRU-1 is in connected mode, the remaining packets may be sent over the direct WTRU-to-WTRU bearer. Alternatively, the first packet which triggers paging may be discarded by the eNB or SGW, and once the WTRU-to-WTRU bearer is re-established, all of the packets including the first packet may be sent over the direct bearer.

In the example shown in FIG. 3B (Case B), when one of the WTRUs transition to idle mode, the end-to-end bearer may be torn down, (i.e., both RABs may be released). However, the contexts of the RABs may remain in WTRU-1, WTRU-2 and the eNB. If this is the case, the solution described previously may also apply to this case if one of the WTRUs has packets to be sent to the other WTRU, which may be in idle mode.

The entire WTRU-to-WTRU bearer may not be released if one of the WTRUs is in idle mode, but only the parts of the bearer which are connected to that particular WTRU may be released.

In the example shown in FIG. 3B (Case B), if WTRU-1 transitions to idle mode, the RAB from WTRU-1 to the eNB may be released, but the RAB from WTRU-2 to the eNB may not be released if WTRU-2 remains in the connected mode. If WTRU-2 has some proximity or peer-to-peer packets to be sent to WTRU-1, it may not know that WTRU-1 is in idle mode, since the RAB for the WTRU-to-WTRU bearer from WTRU-2 to eNB is still active. Therefore it may send the packet on that RAB. When the first packet arrives at the eNB, it knows that WTRU-1 is in idle mode. It may send a notification to the MME to bring the WTRU to connected mode, and once it receives the response from the MME, it may send a radio resource control (RRC) reconfiguration request to re-establish the RAB. Once the RAB is re-established between the eNB and WTRU-1, the eNB may then forward the first packet to the WTRU, and then some or all of the remaining packets may be transmitted over the WTRU-to-WTRU bearer, transparent to the eNB. The eNB may discard the first packet, and all of the packets including the first packet may be sent by WTRU-2 once the bearer is re-established.

FIG. 3C shows an example of establishing a bearer via an eNB or HeNB in the path. In the example shown in FIG. 3C (Case 3), each of the WTRUs may have a separate bearer to the PGW or ProSe-GW, but the data packets may be transferred directly from one RAB to another RAB at the eNB or HeNB, which is connected to both of the WTRUs. Therefore, in this case, when one of the WTRUs moves to idle mode, (e.g., as a result of user inactivity), all of the RABs and S1-U bearers associated with that WTRU may be torn down, and all WTRU-related context information may be deleted in the eNB or HeNB. However, the EPS bearer context may remain in the WTRU and the MME.

Referring to FIG. 3C, if WTRU-1 goes into idle mode, the eNB/HeNB may, as part of the deletion of WTRU-1 context information, remove or deactivate the mapping ID associated with the optimized path for this bearer or RAB. Thus, if WTRU-2 has data to be sent to WTRU-1, when the data may arrive at the eNB/HeNB, the eNB/HeNB determines that a mapping ID has not been assigned to this bearer or RAB. This data may then be forwarded to the corresponding S1-U tunnel to enable the optimized path following regular, (i.e., not optimized), procedures, and then may eventually be forwarded to an S5/S8 tunnel. The data may be routed back to the PGW/ProSe-GW and SGW of WTRU-1, which may trigger the regular paging procedure to transition WTRU-1 into a connected mode. A new mapping ID or indication may be sent to the eNB/HeNB to reactivate the old mapping ID during this paging procedure. Thus, once WTRU-1 returns to the connected mode, the eNB/HeNB may enable the local path through the eNB/HeNB for this bearer and all of the peer-to-peer data may be sent via this path from WTRU-1 to WTRU-2. For Case 4, which may be similar to the situation described for Case 2, when one of the WTRUs transitions to idle mode, either the entire end-to-end bearer may be deactivated, or a portion of the bearer associated with the WTRU transitioning to idle mode may be deactivated, which in this case may be the RAB and the corresponding S1-U bearer. For example, if WTRU-1 transitions to idle mode, the RAB between WTRU-1 and the eNB/HeNB and the tunnel between the eNB/HeNB and the SGW may be deactivated, but the S1-U tunnel between the SGW and the eNB/HeNB serving WTRU-2 and the corresponding RAB may stay active.

Similarly, if WTRU-2 has peer-to-peer or ProSe packets for WTRU-1 while WTRU-1 is in idle mode, the packets may be sent over the default PDN connection as described before on a condition that the entire WTRU-to-WTRU bearer had been deactivated. Alternatively, the packets may be sent by WTRU-2 on the WTRU-to-WTRU bearer while it is still active from WTRU-2's perspective. In this case, when the packets arrive at the SGW using the RAB and S1-U tunnel, the SGW may trigger the regular paging procedure to transition WTRU-1 to connected mode. Once WTRU-1 is in connected mode, the packets may be sent to WTRU-1 over the WTRU-to-WTRU bearer.

Non-access stratum (NAS) discovery methods for proximity are described herein. A WTRU's registration for proximity discovery may include the willingness to use the proximity discovery service to look for other WTRUs, and/or to identify itself as discoverable or not by other WTRUs. If it is discoverable, the user may also provide a "nickname" for the network to display to other user, and the user may also provide other information like the gender, interests for network to display to other users. Whether the network grants the WTRU to use the discovery service may be based on the subscription profile.

Moreover, the WTRU may also include in the registration message the well-known applications (i.e., applications) that it is using. Well-known applications are those widely used smart-phone applications that may benefit from the proximity service, such as voice over Internet protocol (VoIP) clients (Skype, Vonage), and/or the social networks (SNS) applications (e.g., Facebook). The information may be used by the network or application server for further proximity based services. The network may record the WTRU's proximity discovery registration information, well-known applications information and associated location information (global positioning system (GPS) coordinates, cell ID, eNB ID, CSG, and the like).

New information elements (IEs) may be added in attach or tracking area update (TAU) messages for registration. The network may notify the WTRU the registration result in a response message. New NAS messages may also be devised for this purpose.

A cell may broadcast at the RRC level if the system supports the proximity discovery.

Application specific information may be requested. If a well-known application registration is implemented, the MME may request a WTRU to send some application specific information, such as the nickname, login-ID, password and the like. The information may be used by the network or further provided to application servers for proximity based services. A new NAS message may be devised for this purpose.

A WTRU may modify its proximity registration information, (e.g., change from discoverable to non-discoverable). Upon the location movement, e.g., reselection or HO to another cell, or TAU in a new area, the system may or should update or delete the proximity information of this WTRU in the original MME. If WTRU's are capable of GPS, the WTRU may be configured to send GPS coordinates over NAS periodically to update the location information.

Proximity discovery information may be requested. The WTRU may request the network for proximity discovery information, such as all WTRUs that allow themselves to be discoverable in the vicinity, or for a specific well-known application, other users of the same application in the vicinity. A new NAS message may be devised for this purpose.

Inter-system proximity information exchange may occur. The MME may exchange the proximity information, (e.g., discovery information, location information, proximity capability information, and/or proximity QoS information, and the like), with other system elements such as a serving general packet radio service (GPRS) support node (SGSN). The MME may request the SGSN to send the proximity related information for certain location (e.g., GPS coordinates, cell or tracking area). The SGSN may map the location to its own location (cell or routing area) and return all of the discoverable WTRUs in that location or the application specific information. The MME may also provide similar information to other system as well. A new inter-system message may be devised.

Communication may be established between an MME and an application server. The MME may provide the current proximity information to a well-known application server, so that the server may have the proximity information. When a user gets online for the application, the application may display related proximity information to the user. Upon request or periodically, the MME may send the current tracking area ID or eNB ID of the WTRUs, which may be registered with the application server and/or proximity server. Alternatively, the proximity server may inform the MME about whether two WTRUs desire to communicate via the proximity server, or not. In the first case, the application server/proximity server may use this information, (e.g., tracking area IDs of the WTRU to identify whether two WTRUs which have requested the proximity service and/or may be using a specific application are within the same area or not). If the application server determines that they are within the same area, the application server or proximity server may request the MME and/or the network to establish the proximity connection between two or more WTRUs.

In the second case where the application server may send information to the MME, the MME may determine whether the two WTRUs in the same tracking area would like to communicate to each other based on the information from the application server/proximity server. If it is concluded by the MME that WTRUs may desire and/or may perform proximity communication, then a proximity connection may be established among those WTRUs.

Figure 20:
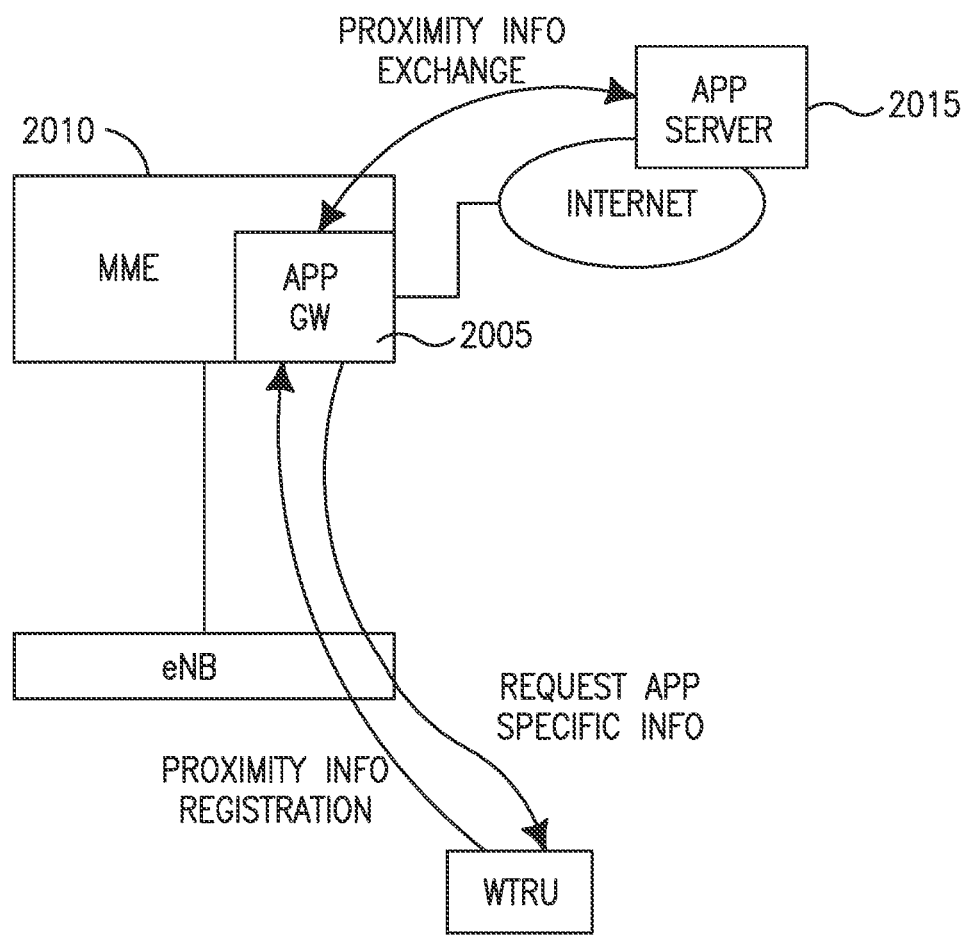
FIG. 20 shows the registration and exchange of proximity information for a particular application.

As shown in FIG. 20, an application gateway 2005 may be embedded in an MME 2010 to enable communications with an application server 2015.

In order to realize ProSe, (WTRU-to-WTRU proximity service), and enable WTRU-to-WTRU communication, a new logical node may be provided, (referred to herein as a proximity service gateway (GW), (i.e., ProSe-GW)). The ProSe-GW may be deployed by the network operator or by an independent ProSe service provider or by an enterprise. The ProSe-GW may span multiple local home networks and the associated local GW (LGW). Similarly the ProSe-GW may span multiple enterprise local networks. The ProSe-GW may include the IP address allocation for use by ProSe PDN connection, and a policy control enforcement function (PCEF) in support of QoS enforcement and flow based charging function according to PCRF rules.

If the ProSe-GW is deployed by an enterprise or an independent ProSe provider, then the PCEF and flow based charging function may not be located in the ProSe-GW. In such case, the ProSe maybe supported with a PDN connection or a bearer, (such as a WTRU default bearer), with a predefined QoS level as per the user service level agreement.

The ProSe-GW may also include the following functions toward a WTRU involved in the proximity service which also may be SGW functions. When the WTRU has only a ProSe PDN connection, a local mobility anchor may be used with the data bearers when the WTRU moves between eNBs or between HeNBs. Information about the bearers may be retained when the WTRU is in the idle state, (e.g., EPS mobility management (EMM)) idle or EPS connection management (ECM)-IDLE), and at least temporarily buffers downlink data while the MME initiates paging of the WTRU to reestablish the bearers. For roaming WTRUs, information may be collected for charging, (e.g., the volume of data sent to or received from the user), and lawful interception.

For example, a proximity service (ProSe) area may be defined as one or more a collection of cells, (e.g., cells with same CSG ID or belongs to a list of CSG IDs), or a collection of local home network or local enterprise network. The ProSe area may span cells from multiple PLMNs, or the ProSe area may span multiple CSGs.

The ProSe area may be associated with an identifier which may be a global unique identifier. Such an identifier may be broadcasted by the cells in that ProSe area. The ProSe area identifier may also be exchanged between the WTRUs, or between a WTRU and a network entity in dedicated RRC messages or NAS messages. The ProSe area identifier may be used by a WTRU or a network entity, (MME, eNB/HeNB, GWs including ProSe GW), in support of ProSe discovery, or discovery of ProSe peer WTRUs or group of WTRUs. The WTRUs in the same ProSe area may engage in ProSe communications.

ProSe access may be provided using accessibility control, activation triggers, and a decision node to determine when and how the ProSe access may be provided. For ProSe control, perhaps in order to enable and control ProSe, the following information may be incorporated into the WTRU or the user's subscription profile.

ProSe permission may be defined as permission for the WTRU to engage in a ProSe. Furthermore, the PDN subscription context in the HSS may contain various granularities of ProSe permission, such as an access point name (APN) and an indication for the APN of whether ProSe is allowed or prohibited for the AP; an APN and an indication of whether only ProSe is supported for this APN; an APN and an indication of whether ProSe supported is conditional, (e.g., ProSe-conditional); the identity of a PGW or a ProSe GW, (e.g., default ProSe GW), and an APN; a ProSe area, (e.g., a list of ProSe areas), and an APN; whether ProSe is allowed during roaming, (e.g., in a visited public land mobile network (VPLMN)); whether ProSe is allowed during roaming through a visited network ProSe GW or a PGW; whether ProSe is allowed for a specific ProSe group, (open group, close group, private group, public group); an APN with an indication on whether ProSe is allowed for a specific ProSe group or type of group; whether a WTRU is allowed to invite another WTRU into a ProSe communication, even if the invited WTRU has not subscription to ProSe; and/or an APN with an indication of the allowed level of ProSe Service, (whereby there may be many levels of ProSe Service); whether the ProSe is allowed to be established on the default PDN connection bearer or on a dedicated bearer or a dedicated PDN connection; whether the ProSe may be allowed for an originated call only, a terminated call only, or both; the permission may be granted for specific QoS attributes and related thresholds such as maximum bit rates, QoC class identifiers (QCIs) and allocation and retention priority (ARP); validity of the permission; the permission may be granted for a specific service type; and user consent, (which may have the same level of granularity described above).

Such information may reside in the HSS. Furthermore, this information may be provided, (e.g., by the HSS), to the CN nodes such as an MME, SGSN, SGW or PGW. The information may also be provided to the ProSe GW described herein.

Additionally, ProSe may be allowed between WTRUs under the same local network or between WTRUs that belong to a list of defined local networks. ProSe may be allowed between WTRUs that belongs to the same CSG. The permission may be always allowed; always prohibited; and/or conditional.

Support of ProSe communications may also be subject to network configurations and capability. Similarly the support for ProSe communication may be subject to the WTRU configuration and its capability and protocol/hardware version or release. For example, some MMEs, SGWs and PGWs may support ProSe while some may not. Similarly, some eNBs or HeNBs may support ProSe while some may not.

During Mobility, the serving network or network Node (MME, SGW/PGW or eNB or HeNB) may verify the support of ProSe in the target network or Specific Target network node. The serving network may de-activate a ProSe PDN connection if the target network, (or specific target network node that will be serving the WTRU), does not support ProSe. The deactivation may be initiated by the eNB or HeNB, the MME, and/or the SGW, PGW or the ProSe-GW.

Triggers for ProSe and the time when a ProSe may be triggered are described herein. The ProSe may be triggered upon discovery of a nearby friend or upon notification that a friend or point of interest is nearby. The notification may be addressed to the user from the network or from the WTRU. For example the user may configure the WTRU to issue a notification upon discovery of friend or a point of interest which may not be already on the user friend list.

The notification may be addressed to the WTRU. For example, the WTRU may be configured to autonomously take certain action, (e.g., update friend list), upon notification from the network or a peer WTRU or point of interest.

The ProSe may be triggered upon entering a ProSe area or upon reading a ProSe area ID from the system information broadcast.

The ProSe may be triggered upon request from the user. For example, the user may trigger the WTRU to detect nearby friends. The terminology "friend" refers to an individual entity, (e.g., person, shop, and the like), that the user may desire to establish a contact with if is nearby, a group of subscribers or social network groups, a ProSe Area server or ProSe-GW, a local network, among others, for example.

The ProSe may be triggered upon paging or request to initiate ProSe from the network. For example, the paging maybe a result of a friendly WTRU who want to establisher a ProSe communication.

The ProSe may be triggered upon the update of the ProSe allowed list, upon Proximity Indication, upon activation of the feature by the network, upon selecting a cell or handover to a cell which support ProSe, upon selecting a network or entering the covered of Cell or a ProSe GW which support ProSe, upon selection of a specific CSG ID or a specific APN or GW identity, upon activation of local IP access (LIPA) service, managed remote access (MRA) service or selective IP traffic offload (SIPTO) service, or upon the selection of any of the ProSe permission control parameter described under the ProSe control section.

A WTRU or a network may make the decision to trigger a ProSe. For example, the ProSe may be triggered by a WTRU, or by a user toward another user or in response or a request from another user or group of user or social group, or shop, or the like.

The ProSe may be a push service from the network (or a ProSe service provider). The network may autonomously initiate ProSe. For example, the network may offer advertisement services. Upon the proximity of the user to a point of interest, (for example in function of the user profile and pre-arranged consent), the network operator or service provider may trigger the ProSe and push advertisement information to be displayed on WTRU screen. Such advertisement information maybe also be push to the WTRU available to be displayed at any time by the WTRU, assuming that the information is still relevant to the location of the WTRU. Such ProSe initiation may be triggered by the MME, the SGW, the PGW, the ProSe-GW or the eNB/HeNB.

Termination of ProSe and release of ProSe bearers or connections may occur. A ProSe may be terminated upon a change in any of the ProSe permission control parameters leading to ProSe no longer being allowed. For example, the ProSe communication may terminate upon the expiration of the validity time granted by the network, a change in network configuration or WTRU configuration, or mobility into part of the network or into a network where ProSe is not supported either because that entire part of the network doesn't support ProSe or is not configured to support ProSe, the new network doesn't support ProSe, or the new eNB, HeNB, MME, SGW or PGW does not support ProSe, or a decision of the network, WTRU or user to terminate the ProSe. The WTRUs may reach the allowed threshold for sending proximity data.

Charging models may impact network architecture supporting ProSe. Operators may deploy ProSe services versus independent ProSe providers versus an enterprise deployed ProSe versus home deployed ProSe. Charging may be based on a fixed rate, (e.g., monthly) charging.

A default WTRU bearer, or a default PDN connection with pre-agreed/preconfigured QoS attributes, or a dedicated PDN with pre-agreed/preconfigured QoS attributes may be established to support ProSe communications. In this scheme, a policy control enforcement function (PCEF) for QoS in the downlink, (e.g., rate policing based on APN AMBR), may reside in the eNB or HeNB if the ProSe-GW, or any other node trusted by the network operator such as the SGW or the PGW, is used.

A function may also be specified at the eNB or HeNB to report to the network the data volume consumed using S1 application protocol (S1-AP) messages.

The AF may explicitly indicate to the PCRF "supported features" or the "application identity" of an application that requires proximity support. These may be performed using existing attribute value parameters (AVPs) already included in the AAR diameter message.

The single proximity service ID may be used to associate any other member that subscribes to an application that may require proximity services. These members may be either part of a group or individual WTRU that may be connected through an optimized proximity connection (OPC).

In one or more scenarios when one of the WTRUs goes to idle mode, the direct WTRU-to-WTRU bearer may be turned down, while the context of the bearer may remain in both the WTRUs. Therefore, when both WTRUs return to connected mode, the same bearer may be reestablished. It may also be possible that the whole end-to-end bearer may not be released if one of the WTRUs is idle mode, but only the parts of bearer which are connected to that particular WTRU may be released.

A heretofore unknown "mapping ID" or indication to the eNB to reactivate the old mapping ID may be sent to the eNB during this paging procedure. Thus, once WTRU-1 returns to the connected mode, the eNB may enable the local path through the eNB for this bearer and all of the peer-to-peer data may go on this path from WTRU-1 to WTRU-2.

The WTRU may include in the registration message the well-known applications that it's using. Well-known applications may be widely used smart-phone applications that may benefit from the proximity service, such as VoIP clients (Skype, Vonage), or the SNS applications (Facebook). The information may be used by the network or application server for further proximity based services.

A WTRU may establish a setting-up of network and radio resources. This may be implemented through a bearer resource allocation request or bearer resource modification. The network may be able to accept or reject whether a proximity procedure may be triggered by a particular WTRU.

Figure 21A:
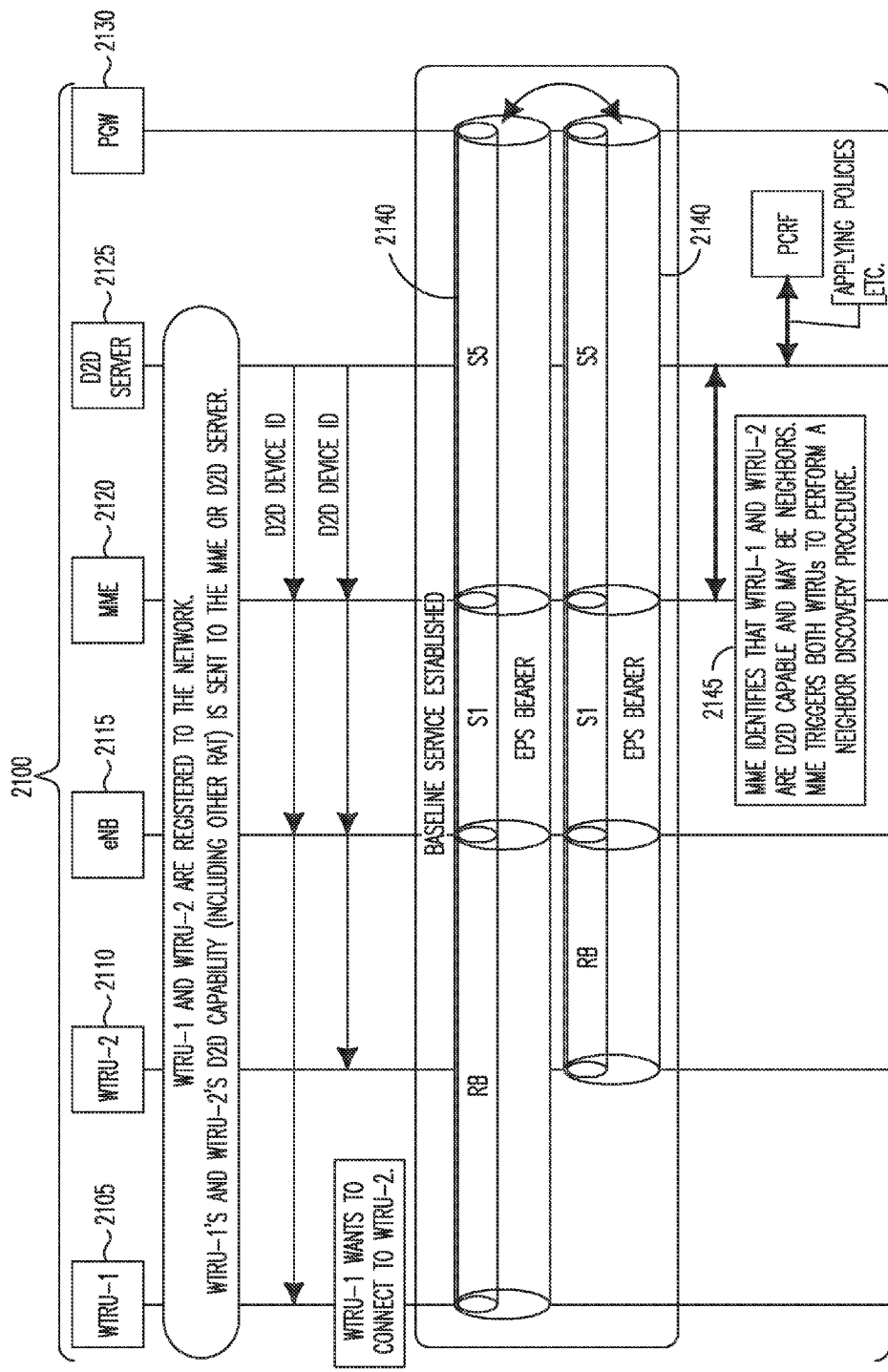
FIGS. 21A and 21B, taken together, are a signal flow diagram of an example service request procedure for intra-eNB, intra-MME dual-RAT with cellular triggered device discovery.
Figure 21B:
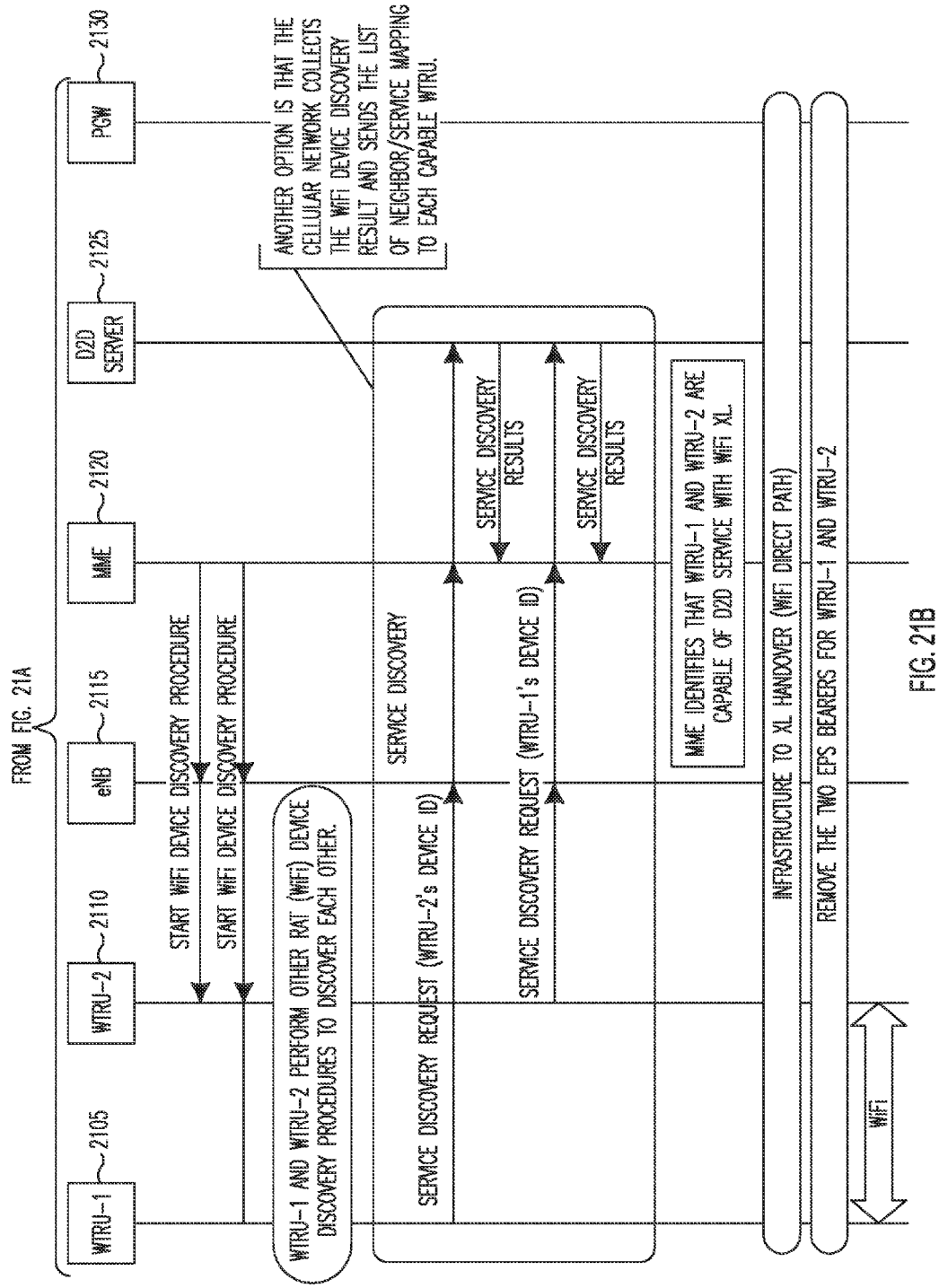

FIGS. 21A and 21B, taken together, are a signal flow diagram of an example service request procedure for intra-eNB, intra-MME dual-RAT with cellular triggered device discovery in a wireless communication system 2100 including a first WTRU 2105, a second WTRU 2110, an eNB 2115, an MME 2120, a D2D server 2125 and a PGW 2130. During registration (2135) as part of a NAS layer attach procedure, both WTRUs 2105 and 2110 may indicate that they are D2D-capable using the 802.11 RAT, and may send their respective D2D capabilities to the MME 2120 or D2D server 2125. The MME 2120 may update the D2D server 2125 with the D2D capabilities of WTRUs 2105 and 2110 at their time of registration or any subsequent updates, for example, using a tracking area update (TAU) procedure.

WTRU 2105 may attempt to establish a public safety (PS) call to WTRU 2110 per baseline procedures. The WTRUs 2105 and 2110 may establish default EPS bearers setup per baseline LTE procedures. The WTRU 2105 may use a random access channel (RACH) and connection setup procedure to move to an RRC connected state. If WTRU 2110 is not yet in an RRC connected state, the MME 2120 may use a paging procedure to bring the WTRU 2110 to the RRC connected state. After this stage, both the WTRU 2105 and the WTRU 2110 may have a default EPS bearer 2140 connected to the PGW 2130.

The MME 2120, either alone or in cooperation with the D2D server 2125, (or other EPC entities such as an ANDSF, PCRF, and the like), may identify that WTRUs 2105 and 2110 are D2D-capable and that they may be able to communicate using an 802.11 RAT-based D2D link (2145). This may be based on, but not limited to, location information, measurements, cell ID, sector ID, and the like. The WTRUs 2105 and 2110 may perform device and service discovery.

Figure 22A:
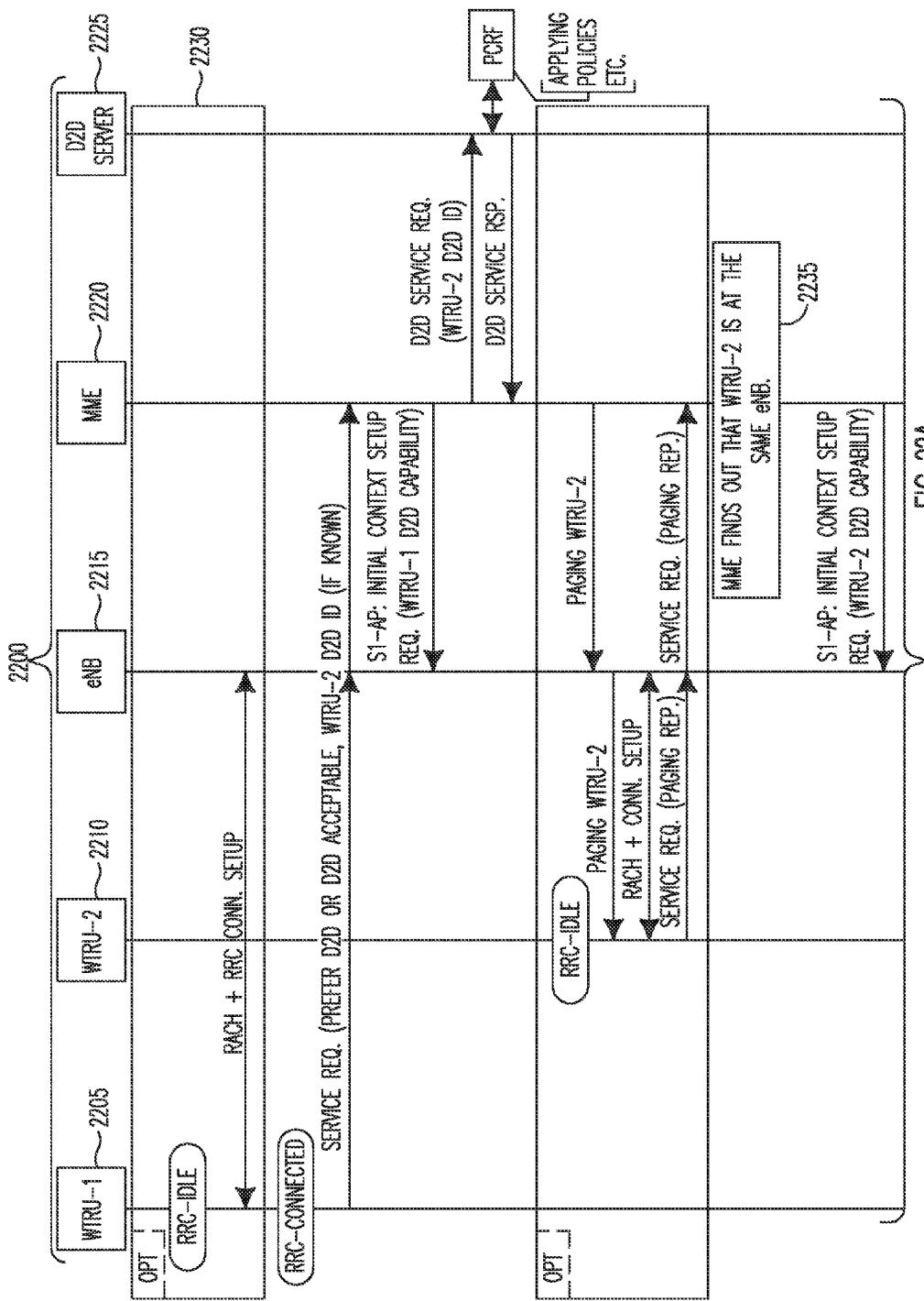
FIGS. 22A and 22B, taken together, are a signal flow diagram of an example procedure for setting up an intra-eNB local path.
Figure 22B:
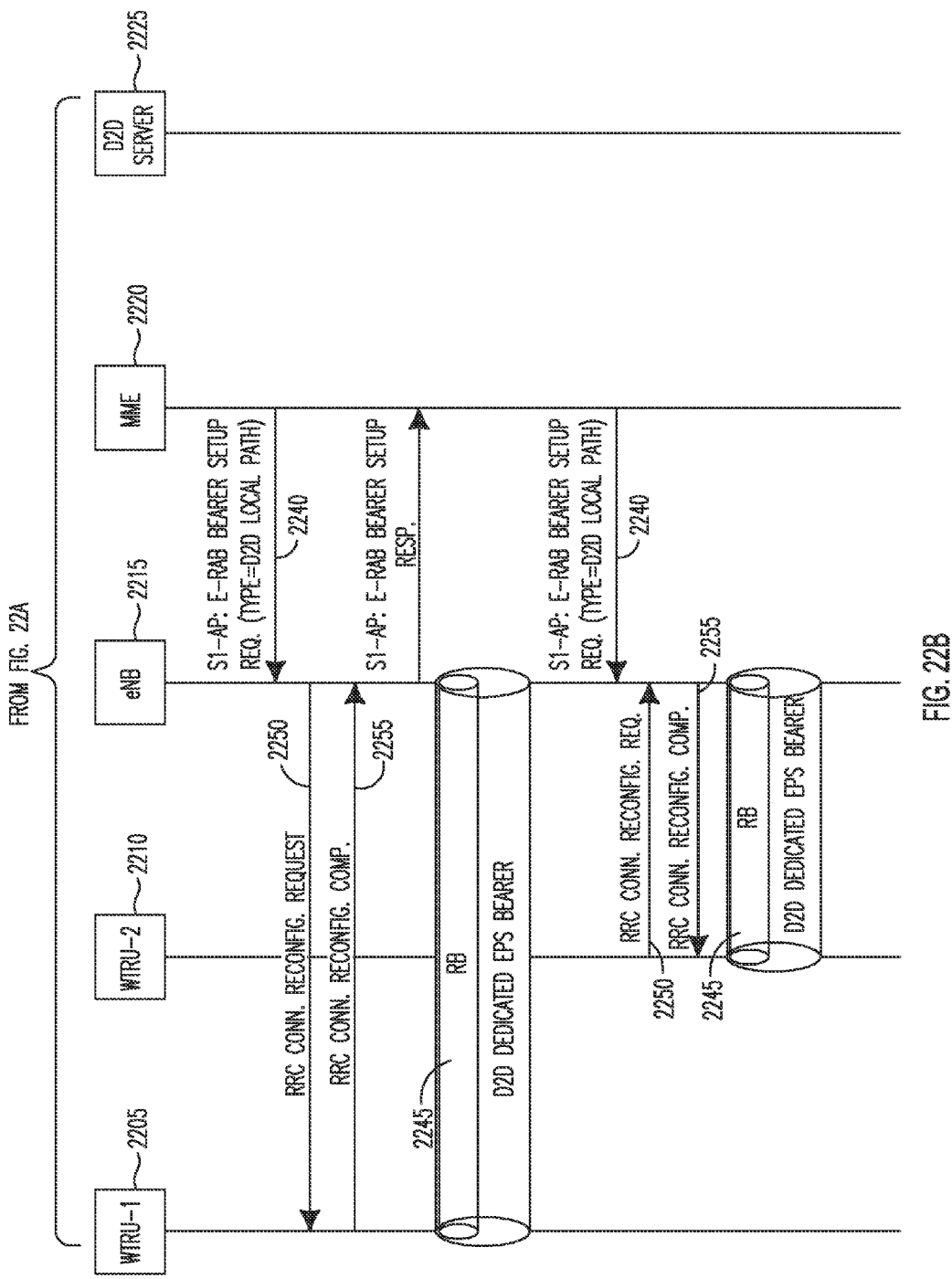

FIGS. 22A and 22B, taken together, are a signal flow diagram of an example procedure for setting up an intra-eNB local path in a wireless communication system 2200 including a first WTRU 2205, a second WTRU 2210, an eNB 2215, an MME 2220 and a D2D server 2225. For call management for local-path (single-RAT), at the time of registration, (in an attach procedure), WTRUs 2205 and 2210 may indicate that they are D2D-capable and may send their respective D2D capabilities. The MME 2220 may update the D2D server 2225 with the D2D capabilities of WTRUs 2205 and 2210 at their time of registration, or any subsequent updates, for example, using a TAU procedure.

The WTRU 2205 may acquire the IP address of WTRU 2210 or another specific identifier via session initiation protocol (SIP) procedures, (including an IP multimedia subsystem (IMS)). In the service request NAS message, the WTRU 2205 may include the IP address of WTRU 2210, a SIP uniform resource identifier (URI), a mobile station international subscriber directory number (MSISDN), or other temporary identifier that may be used to identify the WTRU 2210.

Referring to FIG. 22A, the WTRU 2205 attempts to establish a PS call to WTRU 2210 per baseline procedures. WTRU 2205 and 2210 may establish default EPS bearers setup per baseline LTE procedures. WTRU 2205 may use a RACH and connection setup procedure 2230 to move to the RRC connected state. If WTRU 2210 is not yet in an RRC connected state, the MME 2220 may use a paging procedure to bring WTRU 2210 to the RRC connected state. After this stage, WTRUs 2205 and 2210 may have a default EPS bearer connected to the PGW (not shown).

The MME 2220, either alone or in cooperation with the D2D server 2225, (or other EPC entities such as ANDSF, PCRF, HSS, and the like), may identify that both WTRUs 2205 and 2210 are D2D-capable and that they may be within the reach of local-path with the same eNB 2215 (2235). The D2D server 2225 may be a logical entity and its functionality may be executed in different EPC nodes.

Referring to FIG. 22B, the MME 2220 may send one or more modified S1-AP E-RAB bearer setup request messages 2240 to the eNB 2215 to setup the two radio bearers 2245 that are corresponding to the D2D EPS bearer representing the local path between the WTRUs 2205 and 2210. A D2D EPS bearer is a special EPS bearer that does not have the S1 bearer between the eNB 2215 and the SGW, and the S5/S8 bearer between the SGW and the PGW.

The PCEF functionality for an EPS bearer with the local path, (D2D EPS bearer), may be executed at the eNB 2215. This may be beneficial since the PGW and the SGW may no longer be involved in data transfer for the D2D local path, and it also may remove a need for the PGW to be involved in setting up the D2D EPS bearer corresponding to the local path.

Again referring to FIG. 22B, after receiving the S1-AP E-RAB bearer setup request messages 2240, the eNB 2215 may send an RRC connection reconfiguration request message 2250 to WTRUs 2205 and 2210 to setup the radio bearers per a baseline LTE procedure. The WTRUs 2205 and 2210 may respond with an RRC connection reconfiguration complete messages 2255 to indicate the successful establishment of the radio bearers. The eNB 2215 may relay data between the WTRUs 2205 and 2210 via two respective radio bearers to form a local path for a particular D2D connection.

The decision of having the local path may be made by the eNB 2215, for example, with coordination with the MME 2220, the D2D server 2225, and/or other EPC nodes.

Figure 23A:
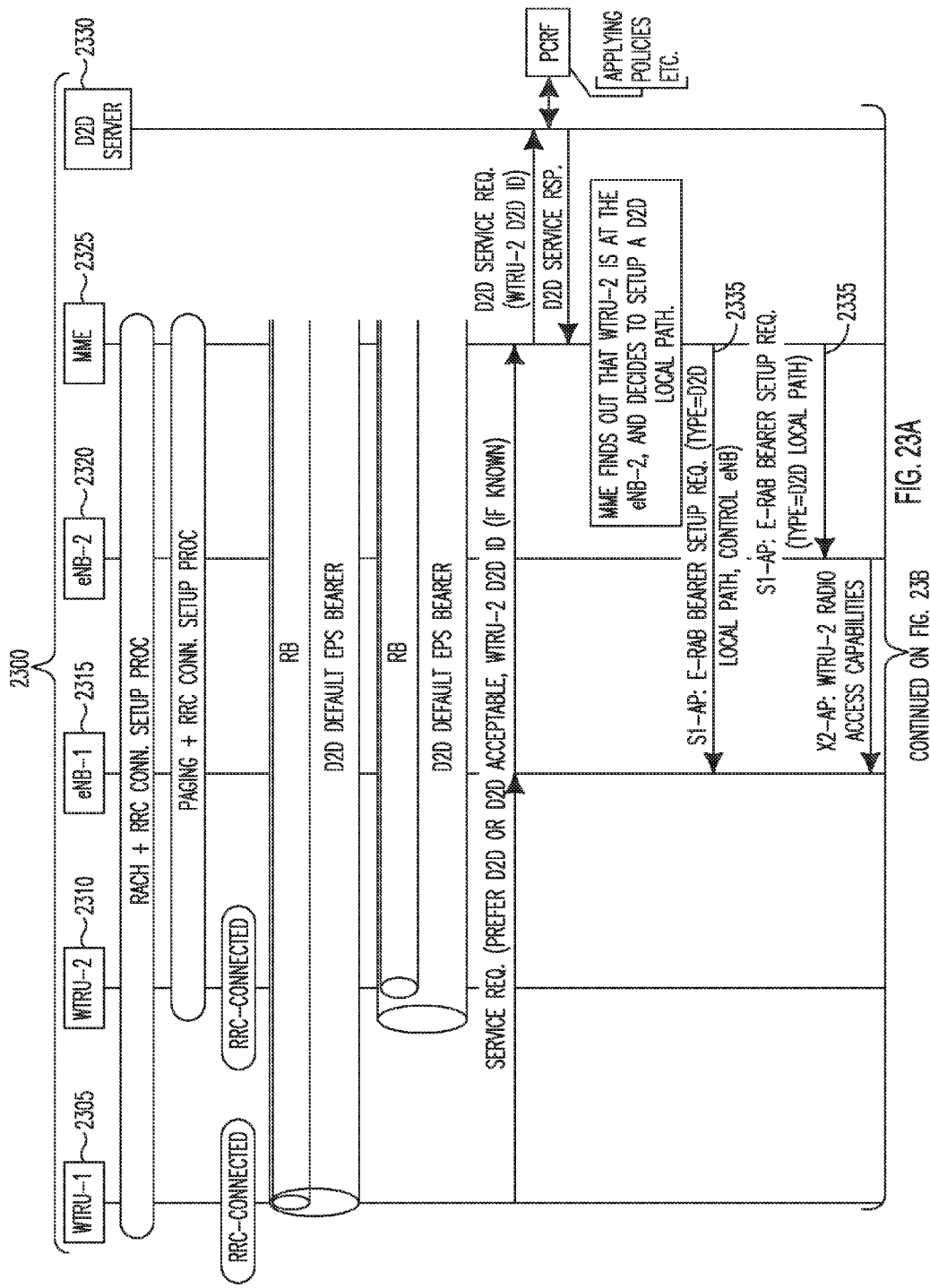
FIGS. 23A and 23B, taken together, are a signal flow diagram of an example procedure for setting up an inter-eNB local path.
Figure 23B:
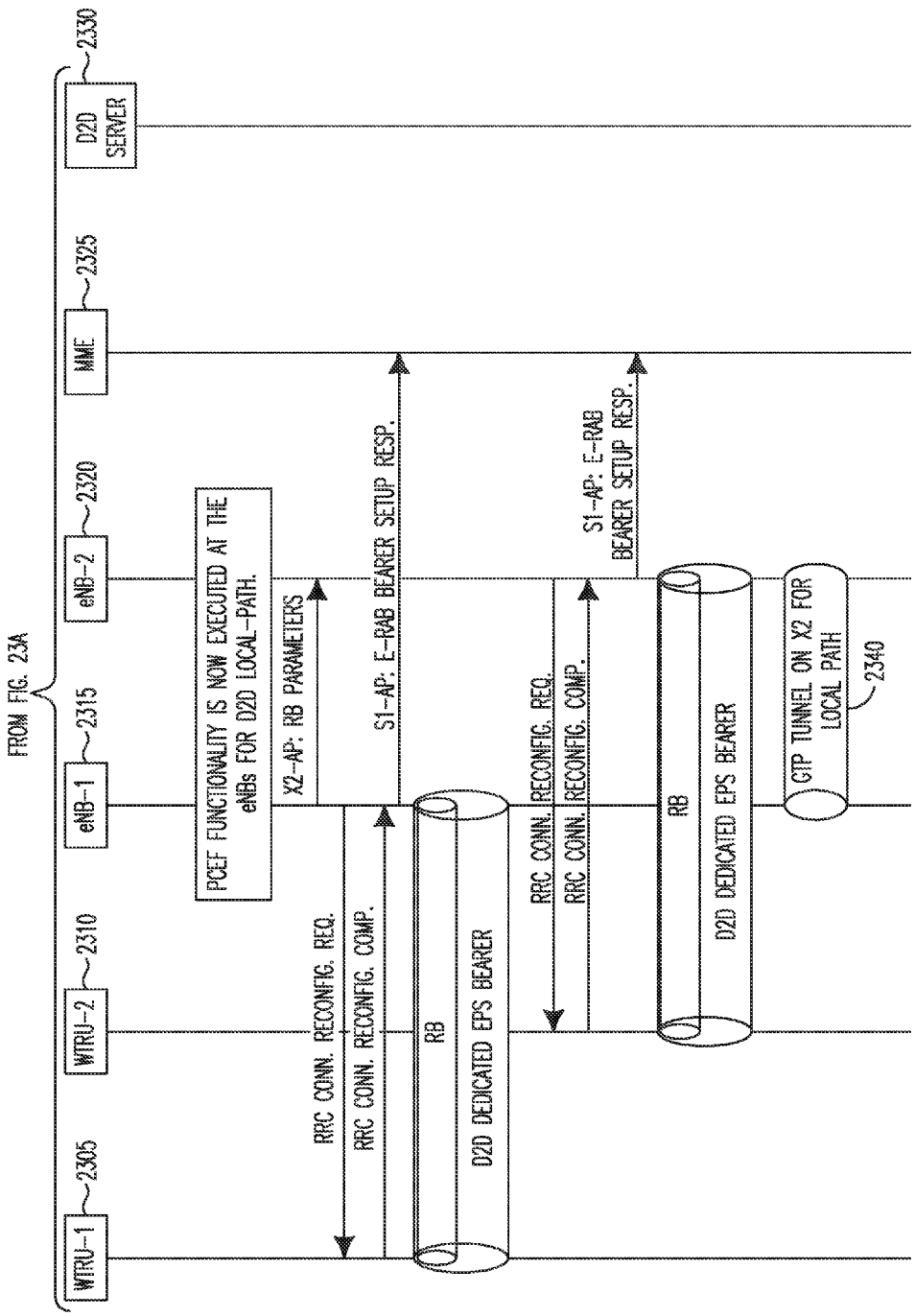

FIGS. 23A and 23B, taken together, are a signal flow diagram of an example procedure for setting up an inter-eNB local path in a wireless communication system 2300 including a first WTRU 2305, a second WTRU 2310, a first eNB 2315, a second eNB 2320, an MME 2325 and a D2D server 2330. The inter-eNB local path requires that there is an X2 interface between the eNBs 2315 and 2320.

Similar to the intra-eNB case, when the MME 2325 identifies that the WTRUs 2305 and 2310 are involved in a call and are capable of having a D2D local-path connection, the MME 2325 may make the decision to setup the local path for the WTRUs 2305 and 2310. The MME may send a modified S1-AP E-RAB bearer setup request message 2235 to each of the eNBs 2315 and 2320 to setup the two radio bearers for the two WTRUs.

As shown in FIG. 23B, a GPRS tunneling protocol (GTP) tunnel 2340 may be setup between the eNBs 2315 and 2320 for exchanging local path data between the WTRUs 2305 and 2310. The eNB specific identifier of the corresponding eNB may be conveyed in the modified S1-AP E-RAB bearer setup request messages 2235.

Referring to FIGS. 23A and 23B, the data plane layers of the access-stratum stack protocol, (e.g., PDCP, RLC, MAC, PHY), may terminate on the WTRUs 2305 and 2310. The eNBs 2315 and 2320 may coordinate to determine the parameters used for these protocol layers. The eNB 2315 for WTRU 2305 may become the controlling eNB for this specific D2D local path being established. The eNB 2315 may be responsible for coordinating and determining the parameters that will be used for D2D local path. The eNB 2320 for WTRU 2310 involved in the local path may send the radio access capabilities of WTRU 2310 to the eNB 2315 to assist in making the decision by using a new message that carries the WTRU radio access capabilities information element (IE) through the X2-AP interface.

The configuration information from eNB 2315 may be sent to eNB 2320 to enable the configuration of WTRU 2310 by a message that carries the WTRU radio setup parameter IE through the X2-AP interface. This may ensure that the D2D configuration information for WTRU 2305 matches with configuration information for WTRU 2310, and vice-versa.

If the WTRUs 2305 and 2310 involved in a local path are with two different MMEs, (i.e., an inter-MME case), the two MMEs may coordinate to identify that the WTRUs 2305 and 2310 may have a local path. This may require assistance from the D2D server 2330 and/or other EPC nodes. MME 2325 for WTRU 2305 may become the controlling MME for this specific D2D local path being established.

MME 2325 may negotiate with another MME about the possibility of establishing a local path between eNBs 2315 and 2320. This may be performed by extending the S-10 interface to allow these negotiations. If the other MME is in agreement with MME 2325, then the other MME may inform eNB 2320 to coordinate with eNB 2315 in configuring the local path radio bearers for the WTRUs in the same or similar way as described above.

The local path setup procedure for an inter-PLMN local path call may be similar to the one described above for the inter-eNB local path, provided there is an X2 interface between the eNBs 2315 and 2320 from different PLMNs.

Figure 24:
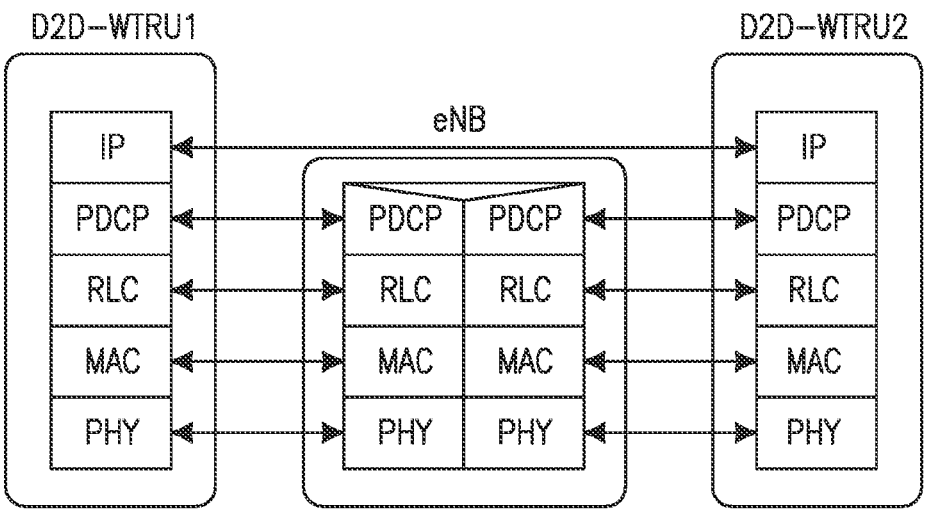
FIG. 24 shows an example protocol architecture when the access stratum data-plane protocol stack layers up to a packet data convergence protocol (PDCP) layer terminate between the WTRU and the eNB.

FIG. 24 shows an example protocol architecture when the access stratum data-plane protocol stack layers up to a packet data convergence protocol (PDCP) layer terminate between the WTRU and the eNB. In this case, the protocol architecture for the local path radio bearer may be similar to what is in the baseline LTE. The data packets may be routed at IP level at the eNB from WTRU-1 to WTRU-2. Local IP gateway functionality may be added at the eNB(s) to enable IP level routing for the local path.

In another embodiment, the access stratum data-plane protocol layers other than PHY and MAC may terminate directly between the two WTRUs involved in the local path.

Figure 25:
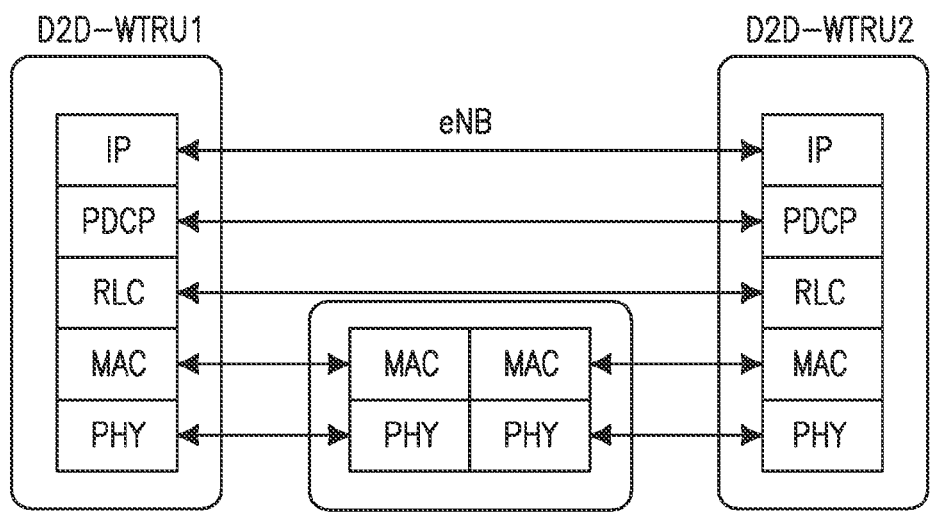
FIG. 25 shows an example data-plane protocol stack for D2D local path.

FIG. 25 shows another example data-plane protocol stack for D2D local path. In this example, the involved eNBs may relay data packets that may either be MAC service data units (SDUs) or RLC SDUs. IP level routing is not required in this case.

This protocol architecture may have the following impacts to the operation of the local path. It may require MAC segmentation or RLC re-segmentation at the corresponding eNBs to let the payload from one radio bearer (e.g., eNB-1 to WTRU-1) to be transmitted on another radio bearer, (e.g., eNB-2 to WTRU-2). Additional procedures may be executed at the eNBs to adhere to similar procedures as the baseline PDCP discard procedure to clean up any stalled data in eNB's buffer after congestion on the second link. RLC retransmissions may be performed end-to-end from source WTRU to destination WTRU and this may also impact the delay associated with retransmissions. It may alleviate the processing overhead and delay on the eNB compared to the case where the access stratum data-plane layers are terminated between the WTRU and the eNB.

Applications that may utilize LTE D2D direct path bearers are classified into two groups: D2D aware applications and D2D unaware applications.

D2D aware applications are aware of the potential benefit of using the D2D connection. The D2D aware application may request the cellular modem to setup a D2D connection. It may also point out if it is requesting the connection to be setup if a D2D path (and/or preference for a direct path or a local path) is available, or if a D2D path is preferred.

Service registration for the D2D aware applications may be performed and a temporary service name may be allocated. The D2D aware applications may register with the D2D service discovery procedure to avail the results of D2D service discovery. The D2D device discovery may be completed prior to the D2D service discovery.

In the service request message, the cellular modem may explicitly request to have the D2D service when feasible to obtain better quality of experience (QoE) during the call on behalf of the D2D applications. It may include the other party's D2D device identifier and temporary service name if available.

D2D aware applications are either ignorant of the potential benefit of using the D2D connection applications or they do not care whether the service is provided through a baseline LTE bearer or through a D2D bearer.

In such case, the operator may recognize the opportunity to optimize the connection and may configure a D2D connection between the two calling parties after the original call is established via baseline LTE procedures.

A baseline/infrastructure call is established per baseline LTE, and the operator sees the opportunity of having a D2D direct path connection between the two calling parties. The operator may initiate the procedure for an infrastructure to D2D direct path service handover.

Embodiments for messaging and interface updates to enable D2D call management are disclosed hereafter. These updates impact several RRC and NAS messages on the Uu interface and several other interfaces in the network including, but not limited to, X2 interface, S1-AP interface, and S10 interface.

The D2D configuration may be provided through an RRC Reconfiguration message. In one embodiment, a D2D direct path link may be configured by the RRCConnectionReconfiguration message. The D2D link may be considered as another carrier similar to a secondary cell. This is achieved by using a new D2D element of sCellToAddMod in sCellToAddModList-r10 to represent the D2D link. A new field of D2D-link may be added to sCellToAddMod to indicate that the new carrier to be added is a D2D direct path link.

Other configuration information such as radio resource configuration information of the D2D link may be carried in the conventional fields. One or more new radio bearers are setup in each WTRU for purposes of direct path communication. More than one bearer may be configured if different flows with different QoS requirements need to be communicated over the direct path. The bearer setup may be done using the drb-toAddModList IE in the RRC Reconfiguration message.

A D2D radio bearer that is established using the drb-ToAddModList with a D2D link may be considered as a D2D direct radio bearer. Alternatively, a D2D direct path radio bearer may be established using an extension to the drb-ToAddModList without adding the D2D link as a new carrier. A new field, D2D-Config, may be added to the DRB-ToAddMod element in the drb-ToAddModList that may represent the D2D radio bearer in a RadioResourceConfigDedicated IE included in the RRCConnectionReconfiguration message. The D2D-Config may contain D2D specific information for the radio bearer including, but is not limited to, type of D2D RB:direct path, and series of D2D related configuration elements, (e.g., XPSCH_config: scheduling, reference symbol power, and the like, XPFBCH_config: power, resource, and the like, and Measurement_config: new measurement type for D2D).

An RRCConnectionReconfiguration message for configuring a D2D local path link may be more or less identical to the one that is used to setup a baseline radio bearer.

Frequency band information about the direct path may be communicated to the WTRUs, either by using the mobilityControlInfo IE or by a different IE. This may be needed, for example, in cases where the direct path communication occurs in a different band than the discovery process, or in inter-PLMN case, where the two PLMNs use different bands for direct path communication.

The radio configuration parameters may match between WTRU-1 and WTRU-2. For example, the subframePattern specified for WTRU-1 in the TDD-Config IE may mirror the corresponding configuration for WTRU-2, so that one WTRU's transmitting interval corresponds to the other WTRU's receiving interval.

In order to provide security on the access stratum, the direct path bearer may be configured with its own ciphering keys as part of the RRC Reconfiguration process. These keys may be different from the keys used for infrastructure communication, since the latter are derived from a WTRU's private data which is available to the network, but not available to other WTRUs. The usage of different ciphering keys for the different radio bearers (infrastructure bearer and the direct path) is a departure from the baseline R8/R10 LTE standards. A new keyAddIndicator for the D2D bearers instead of keyChangeIndicator may be added to the securityConfigHO IE within the RRC Reconfiguration message for this purpose.

After receiving and processing the RRC Reconfiguration message, the WTRUs exchange handshake signals on the direct path. These handshake signals may be at the physical layer. Upon reception of these handshake signals, the WTRUs may transmit an RRC Reconfiguration Complete message to the eNB. After that, the WTRUs are ready to receive and transmit data on the direct path.

The network may obtain WTRU's D2D capability information. For example, this may be achieved by adding a new field of UE-D2D-Capability in ue-CapabilityRequest carried in WTRUCapabilityEnquiry message to trigger the WTRU to return the WTRU D2D radio access capability.

A D2D capable WTRU may inform the network about its D2D capabilities, for example, using WTRUCapabilityInformation message by including a UE-D2D-Capability IE that is similar to UE-EUTRA-Capability IE in the UE-CapabilityRAT-ContainerList to carry over a WTRU's D2D radio access capabilities. The WTRU capability information may include in-band/out-of-band carrier frequencies that the D2D capable WTRU is able to operate in. The WTRU capability information may include whether the D2D WTRU is capable of operating using a single RAT (e.g., 3GPP RAT) and any associated restrictions on the RAT or if it capable of operating on a different RATs (e.g., non-3GPP RAT such as 802.11, Bluetooth, or the like). 3GPP RAT capabilities of D2D link may include support for FDD and/or TDD, and radio access capabilities of PHY, MAC, RLC and PDCP layers, or the like. Non-3GPP RAT capabilities of D2D link may include, for example, which amendments of 802.11(a, b, e, g, n, ac, ad, or the like). The WTRU capability information may also include at least one of the following: capabilities related to seamless handover support, support for aggregation across infrastructure, D2D direct-path, and/or D2D local-path, support for uni-directional D2D, ciphering and security protocols supported over D2D link, trust-zone capabilities for PCEF execution in the WTRU, support related to device discovery, maximum transmit power capability for D2D link, maximum buffering capabilities for D2D link, capabilities related to logical interface support below IP, D2D policy related preferences, support for D2D multicast, or the like.

In order to support the D2D services, updates for NAS messages may be made. A service request message may include the following D2D parameters: D2D device identifiers of the destination UE(s), and new values to Service Type IE to indicate the selected or preferred D2D related service (D2D direct path, D2D local path, other-RAT direct path, etc.), or define a new IE type of D2D Preferred Path to indicate the D2D path preference.

The D2D radio capability received from the WTRU may be included in the WTRU Capability Information Indication S1-AP message. The direct path may carry user plane data only, or both user plane and control plane data (e.g., RRC and NAS). Separate security keys may be configured for each of these purposes. An NAS Security Mode Command may be used to setup security for NAS.

Update to the S1-AP E-RAB Setup Request message may be made to allow the MME to inform the eNB to setup the D2D bearer. A new field, D2D-Type, may be added to the E-RAB To Be Setup Item IE. If present, this field indicates the radio bearer to be setup is a D2D direct path or D2D local path radio bearer.

Additional information may be provided by the MME to the eNB to facilitate inter-eNB, inter-MME, or inter-PLMN cases both for D2D direct-path and D2D local-path. These may include, but are not limited to, the eNB identifier of the corresponding eNB (e.g., GUMMEI+eNB ID), a temporary WTRU identity of the destination WTRU, WTRU D2D capability information of the remote WTRU, policy information if applicable of the remote WTRU, discoverability preferences of the remote WTRU, a temporary service name if applicable, queries related to the temporary service name to check if this service is already being used by any in the eNB, or the like.

Updates to the X2-AP interface between two eNBs may be made to support features including, but not limited to, the coordination to setup the D2D bearer(s), the coordination to perform D2D link scheduling, data exchange related to local-path, or the like.

The following new message may be added. A D2D RAB Setup Request message may be sent by the controlling (master) eNB to the cooperating (slave) eNB to request coordination on D2D direct path RB configuration. It may convey the following parameters: the eNB identifier of the controlling eNB, and source and target WTRU's D2D device identifiers, suggested D2D link configuration (e.g., antenna, bandwidth, frequency band, multiple access scheme, scheduling options, etc.), QoS parameters, supported security parameters, or the like.

A D2D RAB Setup Response message may be sent by the cooperating eNB to the controlling eNB. It may convey the following parameters: target eNB's preference from the suggested D2D link configurations provided in D2D Setup request message by the controlling eNB, target eNB's preference with respect to security parameters, preference with respect to radio resources that may be utilized for a D2D link.

A D2D Schedule Request message may be sent by the controlling eNB to the cooperating eNB when new scheduling on XL is needed. It may include suggested scheduling parameters (e.g., RB allocation, maximum Tx power level, period, etc.).

A D2D Schedule Response message may be sent by the cooperating eNB to the controlling eNB to respond to the D2D Schedule Request message. It may include scheduling parameters preferred by the target eNB.

A D2D WTRU Radio Access Capability message may be sent by the cooperating eNB to the controlling eNB carrying the D2D WTRU's radio access capability, (UE-D2D-Capability IE from the UE).

S10 interface may be updated to handle inter-MME and inter-PLMN cases to support D2D services. The MMEs that may be potentially involved in D2D bearer establishment may exchange the following information, but not limited to: if D2D is supported by the target MME, D2D services supported by the target MME, the eNB identifier of the corresponding eNB (e.g., GUMMEI+eNB ID), a temporary WTRU identity of the destination WTRU, WTRU D2D capability information of the remote WTRU, policy information if applicable of the remote WTRU, discoverability preferences of the remote WTRU, a temporary service name if applicable, queries related to the temporary service name to check if this service is already being used by any in the eNB, or the like.

In case there is no X2-AP interface available between the two eNBs, the coordination of configuring the D2D radio bearers and D2D scheduling may be achieved by the help of MMEs through the S10 interface. The similar messages specified above for X2-AP interface may be added to the GTPv2-C specification that is used on the S10 interface.

System information may be updated for D2D support. The following information may be included in the system information, but not limited to: indicator pointing out if D2D operations are currently allowed, load indicator for D2D, indicator to point out if D2D multicast services are supported, support for dual-RAT D2D link and other RAT details, support for D2D local-path, support for D2D direct-path, in-band information including carrier frequencies of D2D link and corresponding bandwidth (resources may be dynamically scheduled) and neighbor discovery zone bandwidth and location (may be predefined, for example, in USIM), out-of-band information including carrier frequencies of D2D link and corresponding bandwidth (resources may be dynamically scheduled) and neighbor discovery zone bandwidth and location (may be predefined, for example, in USIM), or the like.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method comprising:
   transmitting, by a dual-radio access technology (dual-RAT) wireless transmit/receive unit (WTRU) over a cellular RAT, a registration message to a cellular network, wherein the registration message includes a wireless local area network (WLAN) device identifier (ID) associated with the dual-RAT WTRU for a WLAN;
   receiving, from the cellular network over the cellular RAT, a response message authorizing the dual-RAT WTRU for device-to-device (D2D) communications;
   receiving, from the cellular network over the cellular RAT, assistance information that includes a security key for the WLAN, wherein the assistance information is received from the cellular network on a condition that the dual-RAT WTRU is proximate to a WTRU; and
   performing, over a WLAN RAT, D2D direct discovery using the WLAN device ID and the security key for the WLAN.

2. The method of claim 1, wherein the cellular RAT is for the cellular network and the WLAN RAT is for the WLAN.

3. The method of claim 1, wherein the cellular network is a third generation partnership project (3GPP) network and the WLAN is an 802.11 network.

4. A dual-radio access technology (dual-RAT) wireless transmit/receive unit (WTRU) comprising:
   a transceiver configured to transmit, over a cellular RAT, a registration message to a cellular network, wherein the registration message includes a wireless local area network (WLAN) device identifier (ID) associated with the dual-RAT WTRU for a WLAN;
   the transceiver configured to receive, from the cellular network over the cellular RAT, a response message authorizing the dual-RAT WTRU for device-to-device (D2D) communications;
   the transceiver configured to receive, from the cellular network over the cellular RAT, assistance information that includes a security key for the WLAN, wherein the assistance information is received from the cellular network on a condition that the dual-RAT WTRU is proximate to a WTRU; and
   a processor configured to perform, over a WLAN RAT, D2D direct discovery using the WLAN device ID and the security key for the WLAN.

5. The dual-RAT WTRU of claim 4, wherein the cellular RAT is for the cellular network and the WLAN RAT is for the WLAN.

6. The dual-RAT WTRU of claim 4, wherein the cellular network is a third generation partnership project (3GPP) network and the WLAN is an 802.11 network.

* * * * *

UNITED STATES PATENT AND TRADEMARK OFFICE
CERTIFICATE OF CORRECTION

PATENT NO. : 9,942,938 B2  
APPLICATION NO. : 13/871837  
DATED : April 10, 2018  
INVENTOR(S) : Pragada et al.

Page 1 of 1

It is certified that error appears in the above-identified patent and that said Letters Patent is hereby corrected as shown below:

In the Specification

At Column 18, Line 50, after the word "if", delete "there is".

At Column 20, Line 38, at the start of the line, delete "correctly".

At Column 28, Line 10, after the word "in", insert --the--.

At Column 34, Lines 3-4, after the word "coordinates,", delete "cell ID, eNB ID," and insert therefor --cell_ID, eNB_ID,--.

At Column 34, Line 48, after the word "other", delete "system" and insert therefor --systems--.

At Column 36, Line 10, after the word "ProSe", delete "supported" and insert therefor --support--.

At Column 36, Line 44, after the word "that", delete "belongs" and insert therefor --belong--.

At Column 37, Line 21, at the start of the line, delete "maybe" and insert therefor --may be--.

At Column 37, Line 21, after the word "who", delete "want to establisher" and insert therefor --wants to establish--.

At Column 37, Line 47, after the word "information", delete "maybe also be push" and insert therefor --may be also pushed--.

Signed and Sealed this  
Twenty-first Day of August, 2018

Andrei Iancu  
*Director of the United States Patent and Trademark Office*